United States Patent [19]
Farris et al.

[11] Patent Number: 5,881,131
[45] Date of Patent: Mar. 9, 1999

[54] ANALYSIS AND VALIDATION SYSTEM FOR PROVISIONING NETWORK RELATED FACILITIES

[75] Inventors: Robert D. Farris, Sterling, Va.; Myron E. Harper, Burtonsville, Md.

[73] Assignee: Bell Atlantic Network Services, Inc., Arlington, Va.

[21] Appl. No.: 884,616

[22] Filed: Jun. 27, 1997

Related U.S. Application Data

[63] Continuation-in-part of Ser. No. 467,646, Jun. 6, 1995, Pat. No. 5,644,619, and a continuation-in-part of Ser. No. 376, 201, Jan. 20, 1995, Pat. No. 5,491,742, and a continuation-in-part of Ser. No. 152,360, Nov. 16, 1993, Pat. No. 5,416, 833.

[51] Int. Cl.$^6$ .............................. H04M 1/24; H04M 3/08; H04M 3/22
[52] U.S. Cl. ........................... 379/27; 379/201; 379/207; 379/265; 370/259
[58] Field of Search ...................... 379/27, 34, 111–112, 379/115, 121, 134, 140, 196–197, 207, 219, 229, 242, 243, 265, 308, 201, 93, 211–212, 230; 370/351, 352, 389–390, 392, 259

[56] References Cited

U.S. PATENT DOCUMENTS 5,528,677  6/1996  Butler et al. .............................. 379/207
5,751,802  5/1998  Carr et al. .............................. 379/93.01

*Primary Examiner*—Curtis A. Kuntz
*Assistant Examiner*—Binh K. Tiey
*Attorney, Agent, or Firm*—McDermott, Will & Emery

[57] ABSTRACT

An administration system for a public switched telephone network (PSTN) includes a service order processing system receiving a service request from a customer requesting service for a customer location, and determining whether the service request is provisionable responsive to the service request and predetermined criteria. When the service order processing system determines that the service request is provisionable, automatically provisioning customer facilities including at least one of a domain name, a user name, a customer network address, and an electronic mail address, to execute the service request based upon information stored by the service order processing system. The information includes customer identification data and customer facility data, and the information is maintained by the service order processing system without substantially altering the customer facility data.

11 Claims, 29 Drawing Sheets

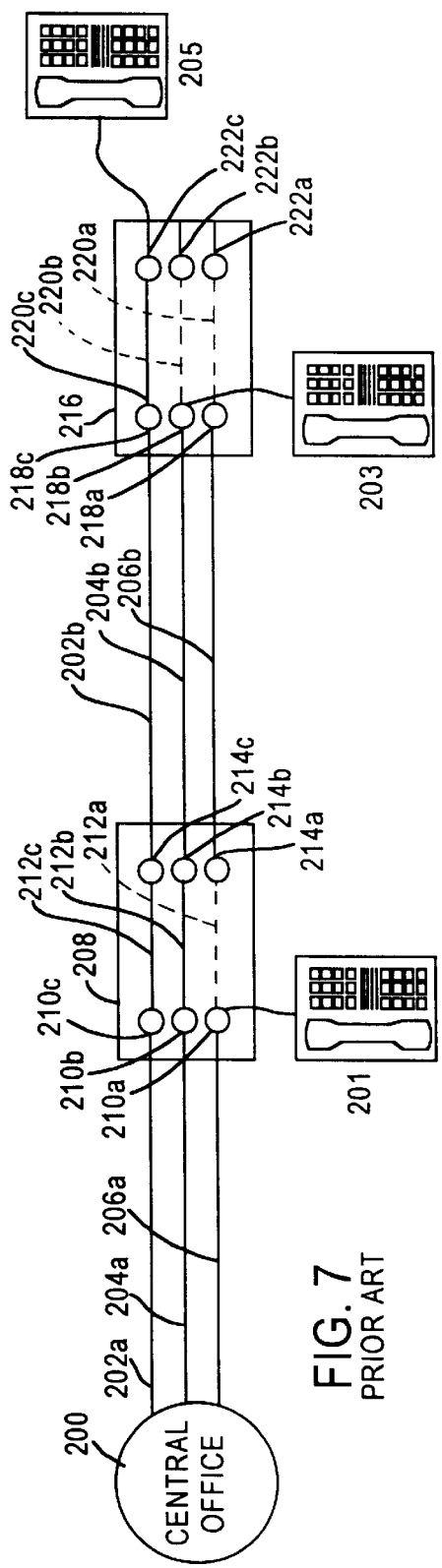
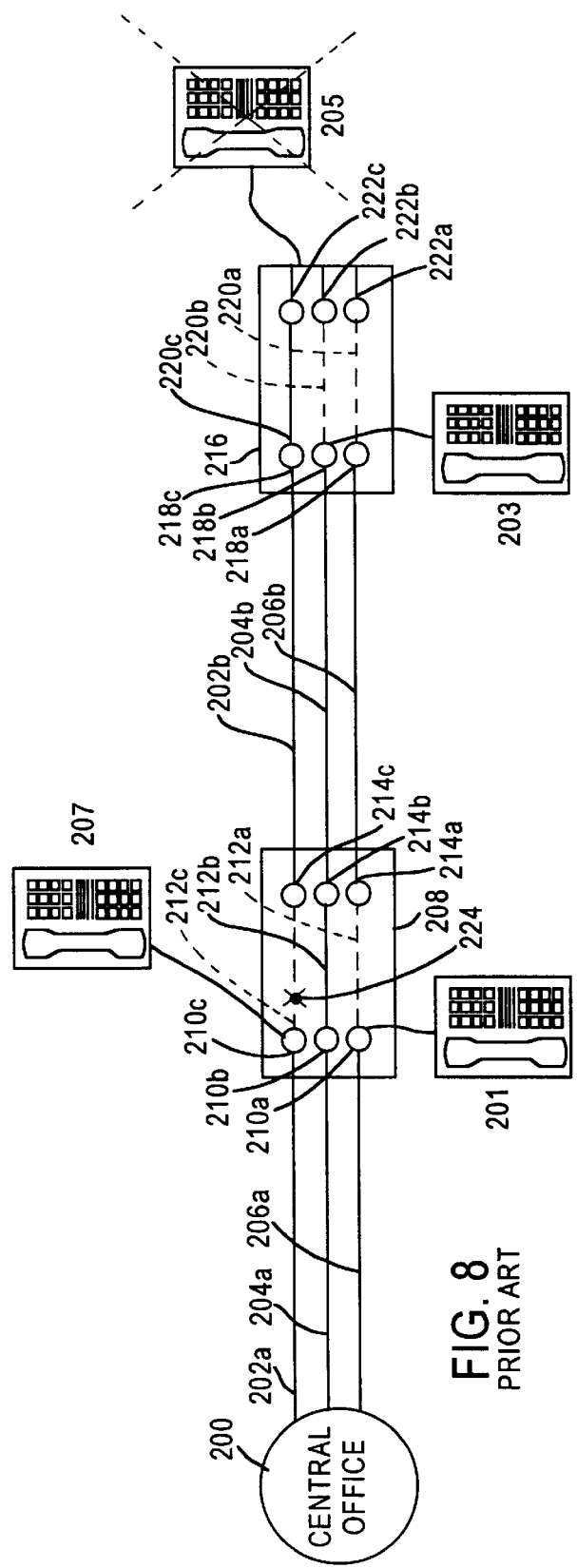
FIG. 7
PRIOR ART
FIG. 8
PRIOR ART

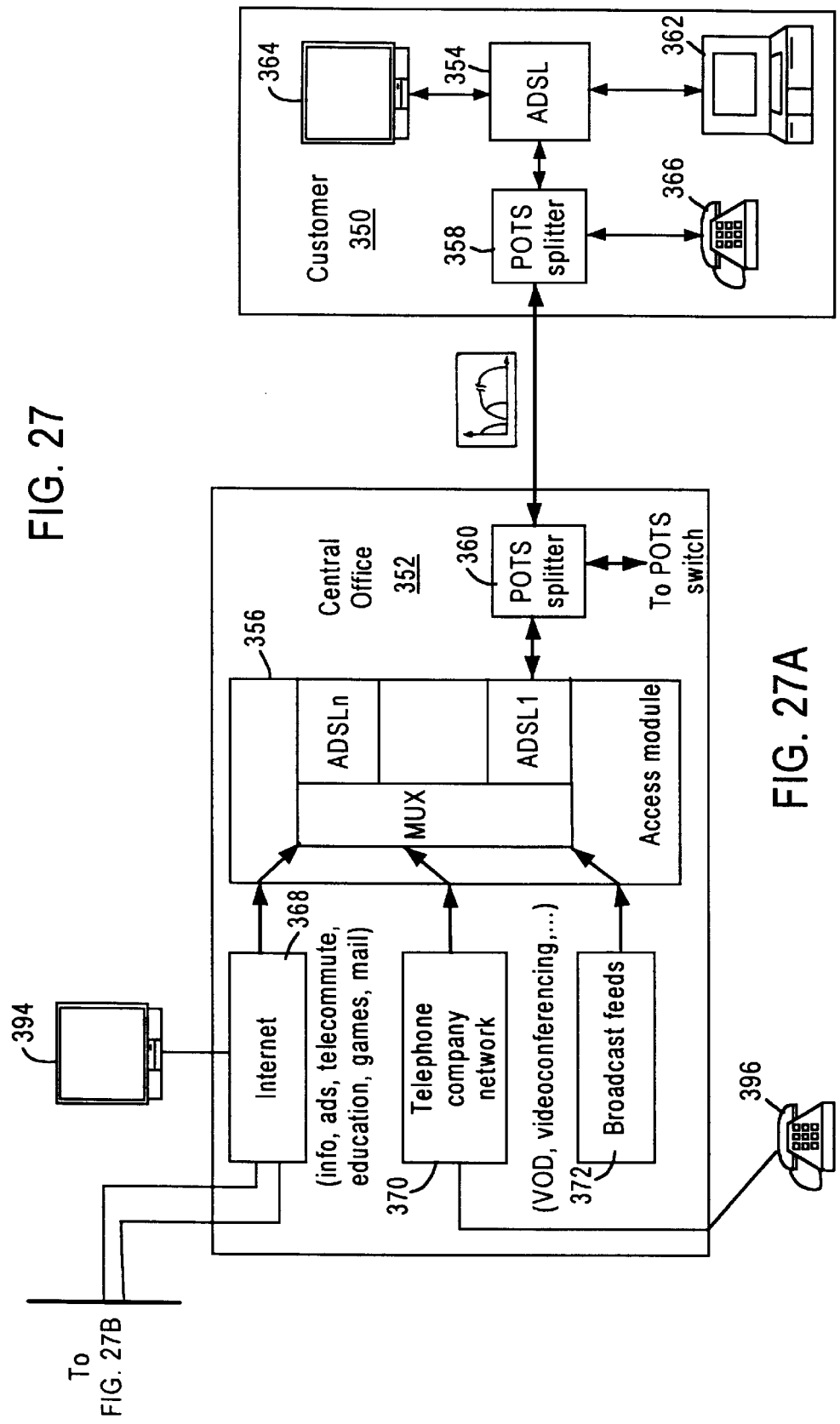

ANALYSIS AND VALIDATION SYSTEM FOR PROVISIONING NETWORK RELATED FACILITIES

RELATED APPLICATIONS

This application is a continuation-in-part application of application Ser. No. 08/467,646, filed Jun. 6, 1995, now U.S. Pat No. 5,644,619, a continuation-in-part application of application Ser. No. 08/376,201, filed Jan. 20, 1995, U.S. Pat. No. 5,491,742, and a continuation-in-part of application Ser. No. 08/152,360, filed Nov. 16, 1993, U.S. Pat. No. 5,416,833, all of which are hereby incorporated by reference.

BACKGROUND OF THE INVENTION

1. Field of the Invention

This invention relates to an analysis and validation system for provisioning or administering networks, such as, for example, activating service to a customer for a telecommunication network and/or internet administered network.

2. Description of the Background Art

The Internet is not a physical or tangible entity, but rather a giant network which interconnects innumerable smaller groups of linked computer networks. It is thus a network of networks. This is best understood if one considers what a linked group of computers—referred to here as a "network"—is, and what it does. Small networks are now ubiquitous (and are often called "local area networks"). For example, in many United States Courthouses, computers are linked to each other for the purpose of exchanging files and messages (and to share equipment such as printers) These are networks.

Some networks are "closed" networks, not linked to other computers or networks. Many networks, however, are connected to other networks, which are in turn connected to other networks in a manner which permits each computer in any network to communicate with computers on any other network in the system. This global Web of linked networks and computers is referred to as the Internet.

The nature of the Internet is such that it is very difficult, if not impossible, to determine its size at a given moment. It is indisputable, however, that the Internet has experienced extraordinary growth in recent years. In 1981, fewer than 300 computers were linked to the Internet, and by 1989, the number stood at fewer than 90,000 computers. By 1993, over 1,000,000 computers were linked. Today, over 9,400,000 host computers worldwide, of which approximately 60 percent located within the United States, are estimated to be linked to the Internet. This count does not include the personal computers people use to access the Internet using modems. In all, reasonable estimates are that as many as 40 million people around the world can and do access the enormously flexible communication Internet medium. That figure is expected to grow to 200 million Internet users by the year 1999.

Some of the computers and computer networks that make up the Internet are owned by governmental and public institutions, some are owned by non-profit organizations, and some are privately owned. The resulting whole is a decentralized, global medium of communications—or "cyberspace"—that links people, institutions, corporations, and governments around the world. The Internet is an international system. This communications medium allows any of the literally tens of millions of people with access to the Internet to exchange information. These communications can occur almost instantaneously, and can be directed either to specific individuals, to a broader group of people interested in a particular subject, or to the world as a whole.

The Internet had its origins in 1969 as an experimental project of the Advanced Research Project Agency ("ARPA"), and was called ARPANET. This network linked computers and computer networks owned by the military, defense contractors, and university laboratories conducting defense-related research. The network later allowed researchers across the country to access directly and to use extremely powerful supercomputers located at a few key universities and laboratories. As it evolved far beyond its research origins in the United States to encompass universities, corporations, and people around the world, the ARPANET came to be called the "DARPA Internet," and finally just the "Internet."

From its inception, the network was designed to be a decentralized, self-maintaining series of redundant links between computers and computer networks, capable of rapidly transmitting communications without direct human involvement or control, and with the automatic ability to re-route communications if one or more individual links were damaged or otherwise unavailable. Among other goals, this redundant system of linked computers was designed to allow vital research and communications to continue even if portions of the network were damaged, say, in a war.

To achieve this resilient nationwide (and ultimately global) communications medium, the ARPANET encouraged the creation of multiple links to and from each computer (or computer network) on the network. Thus, a computer located in Washington, D.C., might be linked (usually using dedicated telephone lines) to other computers in neighboring states or on the Eastern seaboard. Each of those computers could in turn be linked to other computers, which themselves would be linked to other computers.

A communication sent over this redundant series of linked computers could travel any of a number of routes to its destination. Thus, a message sent from a computer in Washington, D.C., to a computer in Palo Alto, Calif., might first be sent to a computer in Philadelphia, and then be forwarded to a computer in Pittsburgh, and then to Chicago, Denver, and Salt Lake City, before finally reaching Palo Alto. If the message could not travel along that path (because of military attack, simple technical malfunction, or other reason), the message would automatically (without human intervention or even knowledge) be re-routed, perhaps, from Washington, D.C. to Richmond, and then to Atlanta, New Orleans, Dallas, Albuquerque, Los Angeles, and finally to Palo Alto. This type of transmission, and re-routing, would likely occur in a matter of seconds.

Messages between computers on the Internet do not necessarily travel entirely along the same path. The Internet uses "packet switching" communication protocols that allow individual messages to be subdivided into smaller "packets" that are then sent independently to the destination, and are then automatically reassembled by the receiving computer. While all packets of a given message often travel along the same path to the destination, if computers along the route become overloaded, then packets can be re-routed to less loaded computers.

At the same time that ARPANET was maturing (it subsequently ceased to exist), similar networks developed to link universities, research facilities, businesses, and individuals around the world. These other formal or loose networks included BITNET, CSNET, FIDONET, and USENET. Eventually, each of these networks (many of which overlapped) were themselves linked together, allowing users of any computers linked to any one of the networks to transmit communications to users of computers on other networks. It is this series of linked networks (themselves linking computers and computer networks) that is today commonly known as the Internet.

No single entity—academic, corporate, governmental, or non-profit—administers the Internet. It exists and functions as a result of the fact that hundreds of thousands of separate operators of computers and computer networks independently decided to use common data transfer protocols to exchange communications and information with other computers (which in turn exchange communications and information with still other computers). There is no centralized storage location, control point, or communications channel for the Internet, and it would not be technically feasible for a single entity to control all of the information conveyed on the Internet.

As discussed below in detail, because of the Internet's inherent distributiveness with respect to, for example, implementing hardware, users and/or administering institution, there are various ways to gain access thereto. One common denominator that applies no matter how diverse the characteristics of the Internet is that all users, either direct or indirect, require some form of identification, name, telephone number and the like, to communicate with others. If a user does not have some sort of identification, others will be unable to communicate or send messages.

Thus, it is clear that users must be able to obtain or use an identification in a manner that is useful, i.e., substantially unique. To date, we are unaware of any systematic manner in provisioning these types of identifications (e.g., domain names, user names, user identifications (IDs), and the like) to facilitate the provisioning process. Rather, most attempts have been in the field of telecommunications.

For example, U.S. Pat. No. 4,782,517, issued Nov. 1, 1988 discloses a system that allows a user to provide new service to existing terminations in a telephone network. A server having program sequences for controlling its operation connects the terminations and the telephone network. The server monitors the occurrence of a request event at one of the terminations. A processor, distinct from the server, controls the server by accessing a directly accessible database to extract a state transition rule to provide control information corresponding to the response event. Information is returned to the terminations in response to the control information. The database storing the state transition rules is directly accessible by the user for changing the state transition rules to modify the services without changing the program sequences of the server.

U.S. Pat. No. 5,012,511, issued Apr. 30, 1991 discloses a system that provides special service in telephone networks, particularly with respect to call forwarding. An adjunct computer is associated with a Remote Memory Administration System (RMAS) for switches which include a facility for providing special services such as call forwarding. The adjunct computer is inserted between the RMAS and the switches which it controls and responds to a request for special services. The processor determines the identity of the subscriber station that is to receive the requested service and the nature of the service. A programming signal is generated and transmitted to the switch to which the station is connected.

U.S. Pat. No. 4,782,519, issued Nov. 1, 1988 discloses a method and apparatus for enhancing the operation of an existing central office in a telephone switching system to provide extended subscriber service. The system relates to existing central office equipment that is incapable of adequately providing "equal access" and other extended subscriber features to non-conforming central offices. The operating capabilities of these offices are enhanced so that they can offer extended subscriber features, such as equal access, without replacing or upgrading existing technology.

U.S. Pat. No. 5,086,461, issued Feb. 4, 1992 discloses a method and apparatus for providing switching equipment, such as 1ESS or 1AESS telephone switching office equipment which are stored program controlled switches, with the capability of controlling the connection management and disconnection of telephone circuits using Signaling System #7(SS7) protocols.

U.S. Pat. No. 4,232,199, issued Nov. 4, 1980 discloses a special services add-on specifically adapted for use in dial pulse activated switching offices such as a step by step office. The add-on is a stored program, processor based system that can be put on a line-by-line basis, independent of subscriber line assignments. The add-on provides special service such as incoming call alert, call conferencing, call forwarding, tone dialing abbreviated dialing, instant recall, etc.

One example of provisioning network facilities is illustrated in FIGS. 1–12. FIG. 1 is diagram illustrating the basic structure or arrangement of the customer and telephone company facilities for providing telephone service or connection between a telephone caller and a telephone receiver destination. As illustrated in FIG. 1, telephone sets 1a, 1b, 1c, 1d, 1e represent different addresses or customer locations which receive and initiate telephone calls. In order for a customer location or address to establish or receive telephone service, each location or address must be physically connected to a central switching office or central office (CO) 3a, 3b, 3c via a physical copper cable pair or fiber optic cable. The cable pair which connects customer locations 1a, 1b, 1c, 1d, 1e often require intermediary connections via cross connect devices 2a, 2b, 2c, 2d and 2e. In this situation, there may be several legs of cable pairs 5a, 5b, 5c, 5d, 5e between cross connect devices 2a, 2b, 2c, 2d, 2e. The combinations of cable pairs which connect the customer location to the serving CO is commonly referred to as "outside plant". Central offices 3a, 3b, 3c are connected together via trunk lines 7a, 7b.

Once the customer location is connected to the CO via an in-coming frame at the CO 3a, 3b, 3c, the customer location must also be allocated office equipment (OE) which may be necessary to provide digital or analog service for the features requested by the customer location. For example, the customer may request such features as call waiting or call forwarding which require different OE or different configurations of OE in CO 3a, 3b, 3c, depending on whether analog or digital equipment is required. Once the customer location is able to access the CO, the customer location may be connected via a CO to another customer location serviced by the same CO, such as customer location 1a calling customer location 1b which is connected or switched by CO 3a. Alternatively, the customer location may be connected to another customer location which is serviced by a different CO. For example, customer location 1c will be connected to customer location 1e via COs 3b and 3c, and cable trunk 7b.

The combination of outside plant and OE which is allocated or "provisioned" for a customer location is typically referred to as customer facilities which are always associated with the customer location until the customer location decides to disconnect service, e.g., the customer location moves from one calling area to another calling area. As clearly illustrated in FIG. 1, the arrangement of the outside plant and OE can become extremely complicated, particularly in view of the quantity of customer facilities which must be provisioned for each customer location. Further, the provisioning or assignment of customer facilities is further complicated with the typical or standard desire to conserve or reuse customer facilities as efficiently as possible. As will be discussed in detail below, we have discovered that this insistence on conserving customer facilities has resulted in excessive and unnecessary work which the present invention is directed at eliminating.

The current state of the art of provisioning of residential services to customers of PSTNs, i.e., customer facilities, follows a series of steps not conceptually different from the steps that were followed in a manual provisioning environment some thirty years ago. The individual work steps have been mechanized, and the mechanized steps have been connected with interfaces, but the steps have not basically changed. The common sequence of such steps is illustrated in FIG. 2. FIGS. 3–5 provide a more detailed flow chart illustration of this methodology. FIG. 6 shows system architecture.

Referring to FIG. 3 a Customer service representative of the Telco at 10 determines the reason for the call and the address of the caller or customer. The call may be for ordering service, making bill payment arrangements, registering a deposit, or calling for service maintenance. If the customer is calling for new service or a change to existing service the representative proceeds to the next step 12. Here the representative gathers the customer information such as the calling party's name, the customer's name, the service address, the billing name, and billing address. The representative determines how the customer wishes the service to be listed, the numbers and types of directories, calling cards, and any disclosures that are requested by the customer.

In the next step 14 the credit history of the customer is checked using internal and external data sources. At 16 the service representative takes the customer service address information provided and uses a PREMIS (Premis Information System) processor. PREMIS is an on-line address-based system used by service representatives for service order negotiation. It provides street address, Living Unit (LU), previous credit status, equal access carrier data, facility availability, and Telephone Number (TN) selection capabilities. PREMIS provides storage and retrieval of Street Address Guide (SAG) information, Living Unit (LU) information, Facility Assignment (FA) information, Telephone Number (TN) selection, repetitive debt customer information, and other information. At 16 the service representative uses PREMIS to verify the address, determine the working status of service at the address, and determines the serving wire center and other common address information such as community and tax codes. Based on the wire center serving the customer, the service representative is able to determine what services are available to the customer.

At 18 service is negotiated with the customer, matching the customer needs with the available products and services. The first service that is negotiated is basic service which will determine the calling plan for the customer. This is followed by the negotiation of toll services and other optional services such as touch tone, custom calling services and maintenance plans. At 20 the due date for installation is negotiated and scheduled. At 22 a Telephone Number is selected from the PREMIS or Service Order Processor (SOP) systems. This Telephone Number will be based on the wire center serving the area and the availability of the TN.

Before ending the call with the customer, the service representative at 24 recaps the service request to insure that the customer order accurately reflects the customer's requirements. The service order is then issued or released at 26 to the SOP. The SOP checks the order for format accuracy and determines what centers or systems should receive the service order. The service order is then distributed to the systems and centers at 28.

Referring to FIG. 4 the service order is next received by the Service Order Analysis and Control System (SOAC). The order is validated and checked for format accuracy 30. At 32 an initial determination is made for orders that might require manual work or testing. If the order might require work or testing a planning message is sent to the Work and Force Administration/Dispatch Out (WFA/DO) system at 33. WFA/DO system makes the final determination as to whether a dispatch or testing is required. At 34 the Service Order Control system determines if loop facilities are required for the order. This is based on Universal Service Order Codes (USOC) and Field Identifiers (FID) on the order. If a loop facility is required an assignment request (AR) is prepared and sent to the Loop Facility Assignment and Control System (LFACS). This assignment request is made at 36 and contains the address, order number, telephone number, and date due. An outside plant equivalency code (OEC) is also sent in the request that has been determined based on the type of service. The OEC designates the type of facility required for the request.

At 38 the address is first matched with addresses in the Loop Facility inventory system. If there is an address match, the status of the living unit is checked to insure that there is not already working service at the address. The terminal address is then determined. Once the address and terminal address have been verified, a network facility matching the request is selected at 40. After the facility is selected the information in the form of an assignment request response (ARR) is sent back to the Service Order Control system at 42.

The Service Order Control system determines switch equipment requirements, prepares the request and sends an assignment request to the Switch Inventory system at 44, such as SWITCH or COSMOS, discussed below in detail. The assignment request is received by the Switch Inventory system from the Service Order Control system at 46. This request will contain information as to the type of switch facilities required, the loop facility that must be connected, the telephone number, the service order number, and the date due.

At 48 the loop facility and telephone number received in the assignment request are verified with the Switch Inventory system data. The status of each is checked to insure that the request can be completed as requested.

The switch equipment is selected at 50 based on the requested switch facility, the loading of the switch and the jumper length to be connected between the OE and the outside cable facility. The selection also will determine if an existing jumper has been left in place. Based on these criteria, switch equipment is selected. The switching equipment which is typically used involves a stored program control switch (SPC) such as a 5ESS, DMS-100, or 1AESS switch.

After the selection of switch equipment, the information is sent to the Service Order Control system at 52. The Service Order Control system assembles the information received from the Loop Facility Inventory System and the Switch Inventory system at 54. This information is formatted as an assignment section and placed on the service order. The assigned Service Order (SO) is then sent to the SOP at 56. The SOP determines where the service order should be sent and distributes the service order at 58.

At 60 the Service Order Control system also sends the assigned service order to the Work and Force system. At 74 work is performed as required. That is, if other work in the field or in the central office is required, this work is completed and reported back to the appropriate center or system. Work may include placing jumpers in the central office or in the loop facilities, connecting the customer to the network and placing inside wiring and jackwiring and jacks at the customer premise.

After completion of the service request the completion information is sent to the SOP at 76. This information may include the completion time and date, any changes to the service order and any billing information that needs to be added for time and material charges.

The Service Order Control system determines if memory administration is involved in the request and if so determines if it has the required information to prepare a translation packet to send to the Memory Administration System (MAS) at 62. The translation packet is then created. If a translation packet cannot be prepared an image of the service order is prepared. The translation packet or the service order image is then sent to the Memory Administration System at 64.

The TP or SOI is received and validated in the Memory Administration System at 66. The Memory Administration System validates the TP/SOI and determines what needs to be done to complete the request.

At 68 the Memory Administration System (MAS) creates a machine readable Recent Change (RC) message specific to the switch to receive the message. The Recent Change (RC) message is created to match the vendor specific switch type and generic. The RC message is then sent to the switch at a designated time at 70 and the switch is updated at 72.

Referring to FIG. 5, the SOP receives the completion information at 78 and prepares the completed service order for distribution at 80. At 82 the SOP determines the distribution of the service order and the completed service order is distributed to all systems requiring the information. Thus, as indicated at 84, the service order is sent to a number of systems including Loop Maintenance, Billing, Directory, and E-911. The service order is also sent back to the Service Order Control system at 86 to update the status of the facilities from Pending Connect or Disconnect to Working or some idle status. At 88 the Service Order Control system receives the completed service order and validates the format of the information.

The Service Order Control system determines the network requirements at 90. In this case, since the order is completed, the requirement is to change the status of the facilities from Pending Connect to Working. If the request was for a disconnect this would change from Pending Disconnect to Disconnected.

At 92 the Assignment Request is sent to the Loop Facility system. The Loop Facility system matches information received in Assignment Request with existing facility data and at 94 updates the status of the facility from Pending Connect to Working or from Pending Disconnect to Disconnected. At 96 an Assignment Request Response is sent to the Service Order Control system. At 98 switch facility requirements are determined. In this case, the requirement is to change the status of the facility from Pending Connect to Working or from Pending Disconnect to Disconnect.

At 100 an Assignment Request to the Switch Inventory system is sent to update the status of the facility and the Telephone Number. The Assignment Request is received from the Service Order Control system at 102 and the appropriate status changes are made. The status of the facility and the Telephone Number are changed. The Status Inventory system inventories and administers the use in aging of telephone numbers. When a telephone number is disconnected, it will be aged for a specified period of time before being reused. After the status of the switch facility and telephone number have been completed, a confirmation is sent to the Service Order Control system at 104.

Referring to FIG. 6 there is shown typical architecture for carrying out the above described methodology. The Service Order Processor (SOP) is shown at 106. The SOP obtains the information from the customer calling for service and obtains the previously described information from Premis Information System (PREMIS) 108 upon the SOP initiating a request to PREMIS. That information is put on the service order which goes from the SOP to the Facility Assignment Control System (FACS) 113 which is an automated facility assignment system which automatically assigns loop facilities and office equipment to a subscriber address to provide telephone service. This assignment of loop or outside plant facilities and office equipment is in response to the provisioning request or service order generated by SOP 106.

FACS is an automated facilities assignment system which attempts to optimize the use of loop facilities and office equipment including jumper cables to minimize the amount of unused inventory and cost to the telephone service provisioning company. FACS, an on-line computer system, administers, inventories, and assigns the complete circuit from the customer's premises to the local serving office. FACS is the primary automated support for the provisioning work group since it keeps track of all interconnections and segments (working and available). FACS works by maintaining inventories of outside plant (OSP) and central office (CO) facilities and using the data to make assignments. FACS is a collection of computer systems which have been previously discussed in connection with FIGS. 4–5, and which is further discussed in greater detail with respect to FIG. 6.

The first system in FACS 113 which receives the service order is the Service Order Analysis and Control system (SOAC) 110. SOAC is the controller of service order flow within FACS and handles most of the interfaces between FACS and other systems, such as the Service Order Processor (SOP). SOAC reads the assignment affecting sections of the service order line by line and determines if FACS can process the order. If the assignment requirements can be determined, FACS automatically assigns the service order. If SOAC reads a Field Identifier (FID) or Universal Service Order Code (USOC) that is beyond FACS' capability, the service order is sent to the service provisioning work center for manual intervention using perhaps LOMS. SOAC also detects errors that are routed back to the originator for correction.

If SOAC can completely interpret the service order, it builds Assignment Requests (ARs) which are sent to LFACS and WM/COSMOS or SWITCH to request outside plant facilities and central office facility assignments, respectively. After assignments are made, SOAC receives Assignment Request Responses (ARRs) from LFACS and WM/COSMOS, merges and formats this data into a service order assignment section and automatically returns it to the Service Order Processor (SOP).

SOAC tracks all service orders and network rearrangements such as Line and Station Transfers (LSTs) through completion or cancellation. Status information is maintained on all service requests as well as the service order image and relevant data that results from processing.

SOAC also includes the capability of supporting multiple SOACs residing on the same machine, different machines, or a combination of both. This capability is called SOAC Tandem. For orders that contain wire centers supported by more than one SOAC, SOAC Tandem provides tracking of all involved SOACs and the linking of assignment data generated by all involved SOACs. Hence, the SOP only needs to communicate with one SOAC for any multi-SOAC order.

A service order is sent to the appropriate SOAC by the SOP based on the header wire centers (for non-TFS involved orders) or the Circuit Administrative Area (for TFS involved orders). Note: TFS (Trunk Facility System) is a generic term for a system such as TIRKS. The particular SOAC that receives the service order determines other potentially involved SOACs based on the wire centers and/or NPA-NXXs appearing on the order. If there is more than one potentially involved SOAC, the SOAC that receives the order in the controlling SOAC for the order and the other potentially involved SOACs are called the subordinate SOACs.

Current SOAC processing takes place in each involved SOAC to generate the necessary assignments for the wire centers involved in the SOAC. Each involved SOAC sends it SOP status and assignment data to the controlling SOAC. The controlling SOAC tracks and sequences all responses sent back by all involved SOACs. When at least all solicited responses or any subsequent unsolicited responses have been received by the controlling SOAC, the controlling SOAC analyzes the statuses and determines the appropriate response (if any) to return to the SOP. Assignment data returned by involved SOACs is linked by the controlling SOAC before it is sent to the SOP.

Besides communicating with the SOP, the controlling SOAC is also responsible for communicating with all other order level SOAC interfaces, such as TFS.

SOAC also records the pass of a service order. The pass identifies the current phase of the order as determined by the service order issuance group. There are five pass types as described below:

1. Pre-completion (PRE)—The initial issuance of a service order.
2. Correction (COR)—A change to the initial service order prior to completion in the SOP.
3. Post Completion (PCN)—Notification that the service order has been completed without corrections in the SOP.
4. Completion with Correction (CPC)—A completion notice that identifies changes made to the service order at the time it was worked. This pass also completes the service order in the SOP. If a CPC pass is sent and SOAC detects that the changes may affect assignment, SOAC sends a notice to the service provisioning work center. IF necessary, the user updates the LFACS and/or COSMOS/SWITCH databases.
5. Cancellation (CAN)—notification that the service order has been cancelled.

SOAC reads the changes on each new pass of a service order. If a COR pass is sent and changes are needed on the assignment, FACS attempts to automatically reassign the service with the necessary changes.

The service order is parsed out by SOAC and a determination is made as to whether there is a loop facility required for the order. An Assignment Request (AR) is made to the Loop Facility Assignment and Control System (LFACS) 112 where a loop facility is requested for the specified address. LFACS maintains a mechanized inventory of outside plant facilities, (e.g., facility addresses, cables, cable pairs, serving terminals, cross connection devices, loops, etc.) and assigns the outside plant facilities to ARs (Assignment Requests) received from SOAC as a result of customer service order activity. LFACS sends this assignment back to SOAC via ARRs. LFACS also generates work sheets for cable transfers and reconcentrations. These activities are updated mechanically upon notification of completion.

In addition, LFACS changes existing loop inventory with maintenance change activity and facility modifications via transactions input into the system by the user. Information once contained in Dedicated Plant Assignment Cards (DPAC) and Exchange Customer Cables Records (ECCR) for use in the manual assignment process is now maintained in an automated data base. As a consequence of assignment requests from the Service Order Analysis and Control (SOAC) system or inquiries from Loop Assignment Center (LAC) personnel, LFACS applies appropriate algorithms to information contained in the data base in order to provide appropriate responses.

The LFACS assignment process consists of two parts: the blocking function and the assignment function. The blocking function identifies the serving terminal. The automatic assignment function uses information provided by the blocking function in conjunction with an assignment algorithm appropriate for the type of service requested. The automatic assignment function can select reserved, connect-through, committed and spare pairs. Given that an assignment cannot be made in one of the above ways, a pair can be selected by breaking a connect-through which has remained idle for longer than a specified time period (averaged), performing a line and station transfer, breaking an underaged connect-through or some combination of these. The order of the selection of pairs is controlled by parameters specified at the terminal or wire center level. In addition to automatic processing, LFACS supports a capability which allows a user to manually select and assign any OSP facilities.

The LFACS administration of circuit terminations and facilities allows for single-loop single-line circuit terminations, multi-loop single-line circuit terminations, and multi-party circuit terminations with the use of appropriate bridging rules. Two or more circuit terminations may share a common facility (i.e., cross-box or field bridging).

LFACS supports the assignment and administration of multiple outside plant, dedicated outside plant, and serving area concept. This includes the specific types of hardware associated with each type of administration. The LFACS assignment function processes customer initiated inward, outward and change activity for circuit terminations.

SOAC matches the address from PREMIS to a possible address in LFACS. If a match is found it proceeds with processing by matching that to a terminal serving the address. It then begins to select a pair back to the central office. Once this is completed the Assignment Request Response (ARR) is sent back to SOAC and the loop part of the connection is fixed.

SOAC makes an assignment request to Computer System for Mainframe Operations (COSMOS) or SWITCH 114 via Work Manager (WM) 116 or SWITCH 118. The WM links COSMOS to the other FACS components. Inquiries and transactions to COSMOS are sent through the WM which controls the load level of the message delivered to COSMOS. If COSMOS fails, the WM stores the ARs (Assignment Requests) generated by SOAC during the down time and distributes them to COSMOS when it is restored.

COSMOS maintains an inventory of central office facilities (e.g., office equipment (OE), tie pairs (TP), bridge lifters (BL), telephone numbers (TN). COSMOS assists the Network Administration (NAC) and Frame Control Centers (FCC) in managing, controlling, and utilizing main distributing frame and central office equipment, facilities, and circuits. The system performs preferential assignment of line equipment, frame jumper reuse, tie pair management for Plain Old Telephone Service (POTS), frame work management and includes extensive reporting capabilities.

COSMOS receives ARs from SOAC after a successful LFACS assignment and automatically assigns line equipment and certain miscellaneous central office equipment. COSMOS responds back to SOAC with ARRs. Cable transfers and reconcentrations generated by LFACS are automatically established in COSMOS. These transactions can be manually input into COSMOS if necessary. The SWITCH system is an operations system to inventory and assign central office switching equipment and related facilities. It allows companies to provision, efficiently and economically, a network that is comprised of both digital and analog technologies. The SWITCH system provides improved computing methodology and a new database structure to support quick incorporation of new technological developments and to accommodate differences in technology between vendors. The SWITCH system will support digital and other new technologies/services in a single, integrated, flow-through provisioning system. In particular, the SWITCH system is designed to handle more sophisticated digital equipment and services, such as ISDN inventory and assignment requirements, and to facilitate ISDN flow-through provisioning. The SWITCH system is also designed to support inventory and flow-through assignment capabilities as appropriate for digital overlay networks and integrated digital facilities.

The SWITCH system will provide integrated inventory and flow-through assignment control for circuit switches, packet switches, ISDN switches, derived channel technologies, and for any associated transmission equipment and intra-office facilities (e.g., tie pairs) required to support the provisioning of these switches and technologies. SWITCH is designed to support integrated line and trunk side provisioning requirements and will ultimately replace and expand both COSMOS and TAS functionality.

COSMOS or SWITCH takes the facility that it obtained from LFACS and tries to find a match. Also PREMIS selects a Telephone Number and COSMOS attempts to match the facility, the F1 facility, and the Telephone Number. If a match is secured it assigns office equipment.

After SOAC gets the service order and determines what to do and sends the assignment request to LFACS, it sends a planning message to the Work and Force Administration/ Dispatch Out (WFA/DO) 120 and provides notification that there is a need to make a determination if there is any outside work to be done. After the assignment request response has come back from COSMOS, information is sent to Memory Administration Check System (MARCH) 122 for memory administration work and it is also sent to an outside plant memory administration system, such as the Bellcore system Outside Plant System/Intelligent Network Element System (OPS/INE), or the Remote Intelligent Distribution Element Support System (RIDES) 124 which handles the fiber electronics, if required. A Work Manager (WM) 126 is disposed between SOAC and MARCH. After the assigned service order is received at WFA/DO a mechanized loop test is initiated by the Loop Maintenance Operation System (LMOS) 128 or a similar standard facility maintenance data base system. After the service is completed, the LMOS host 130 will receive a completed service order for record maintenance. Service orders that do not automatically flow through the provisioning process fall out of automatic processing and are managed by the LAC Operations Management System (LOMS) 132. LOMS assists the Mechanized Loop Assignment Center (MLAC) in management of Requests for Manual Assistance (RMAs). The primary function of LOMS includes the creation of work packages for assignment personnel and monitoring the flow of orders through FACS and the service provisioning work group. This state of the art provisioning process may require up to two days to complete.

Two important work centers interface with FACS. These work groups are the Frame Control Center (FCC), and the Installation Control Center (ICC).

The FCC is responsible for the administrative, force control, work control, and analysis functions associated with the installation and maintenance of cross-connects of loop, special service, carrier, and message trunk circuits and their associated activities in central offices. The center is responsible or providing related order status and work completion information to the support systems, COSMOS and the TIRKS system, or to Order or Circuit Control Centers. The centers will also be responsible for the support of facility maintenance, sectionalization and/or substitution of facilities in connection with failures detected by routing testing or customer complaints.

The ICC has responsibility for and performs the administrative functions associated with work activities including:

Installation Force Management,

Order tracking,

Work assignment and dispatch,

Field-force coordination and progress tracking,

Force planning,

Prepost completion dispatch testing, and

Completion notification to the service order centers and to the customer when required.

The ICC performs these functions for installation work groups, which are the field forces responsible for installation of the service drop, protector, network channel terminating equipment, network terminating work, and network interface. The ICC interfaces with FACS through WFA/DO the Work and Force Administration/Dispatch-out system. This interface is optional and is not installed in all companies. Where WFA/DO and its interface to FACS do not exist, the ICC gets its information from FACS as a function of the normal service order flow. The WFA/DO interface speeds the process and provides additional automation to assist the work in the ICC.

As discussed above, FACS is designed to optimize the assignment or provisioning of customer facilities. Accordingly, FACS will often reuse customer facilities in order to achieve the main objectives of FACS which is to conserve customer facilities, i.e., outside plant or OE. FIG. 7 is a detailed diagram of outside plant facilities for a first combination of customer locations. As illustrated in FIG. 7, customer locations 201, 203, 205 are connected to central office 200 via different combinations of outside plant facilities including cable pairs 202a, 204a, 206a and cable pairs 202b, 204b, 204c via cross connect devices 208 and 210. Customer location 201 is connected to CO 200 via cable pair 206a and terminal 210a in cross connect device 208. Customer location 203 is connected to CO 200 via cable pair 204a and cable pair 204b by connecting cable 212b which connects terminals 210b and 214b in cross connect device 208, and terminal 218b in cross connect device 216. Finally, customer location 205 is connected to CO 200 via cable pair 202a and 202b by connecting cable 212c which connects terminals 210c and 214c in cross connect device 208, and cable 220c which connects terminals 218c and 222c in cross connect device 216. As can be seen, multiple cable pairs are installed or positioned along the area of customer locations 201, 203, 205, and not all of the cable pairs are utilized. This type of arrangement of outside plant facilitates the adaptability of outside plant to changing conditions of the various customer locations in the area of cross connect devices 208, 216.

FIG. 8 is a detailed diagram of outside plant facilities for a second combination of customer locations which has altered the first combination of customer locations. In FIG. 8, customer location 205 has been disconnected via a disconnect request executed by the Business Office and entered via a disconnect service order in the SOP. During the same relevant time period, a new service request has been initiated by customer 207 at the Business Office and entered via a new connect service order in the SOP.

Both the disconnect and new connect service orders are transmitted to SOAC which sends each of the requests to LFACS for outside plant provisioning. Since, as indicated above, LFACS will attempt to optimize outside plant facilities by minimizing the outlay of new cable pairs and reuse of existing outside plant facilities, LFACS will often break the existing connection 212c in cross connect device 208 at 224, and reassign terminal 210c to the new customer location 207. A work order is then issued for an installer to make the appropriate changes to the outside plant facilities.

FIG. 9 is a detailed diagram of office equipment facilities for a first combination of customer locations. In FIG. 9, stored programmed control switch 230 will connect incoming telephone calls to destinations by connecting the incoming call to, for example, different central office frames which will be described. For example, an incoming telephone call may arrive in the central office in frame 246c at frame location 248c. Frames 246a, 246b, 246c, 246d may be located in a first floor of the central office building 245.

The incoming call is then transferred to frame location 242c in frame 240c bearing the office equipment used to provide the specific calling features requested by the customer location. Frames 240a, 240b, 240c may be located on a separate floor 241 of the central office. The cables 244a, 244b, 244c which connect frames 246a, 246b, 246c, 246d to frames 240a, 240b, 240c are commonly referred to as "jumper" cables. Frames 240a, 240b, 240c are then connected to switch 230 at switch connections 236a, 236b, 236c via cables 238a, 238b, 238c. From switch connections 236a, 236b, 236c, the incoming call may be transferred to another customer location or to another central office via, for example, trunk frame 235 at location 234 from switch location 232. Note that frames 246a, 246b, 246c, 246d and frames 240a, 240b, 240c may be located on different floors of the central office 241, 245.

FIG. 10 is a detailed diagram of office equipment facilities for a second combination of customer locations which has altered the first combination of customer locations. In FIG. 10, a first customer location which utilized the OE on frame 246b at location 248b has been disconnected via a disconnect request executed by the Business Office and entered via a disconnect service order in the SOP. During the same relevant time period, a new service request has been initiated by another customer at the Business Office and entered via a new connect service order in the SOP. The second customer has been provisioned on frame 246b at location 254.

Both the disconnect and new connect service orders are transmitted to SOAC which sends each of the requests to COSMOS or SWITCH for office equipment provisioning, depending on the particular type of stored programmable switching equipment. Since, as indicated above, COSMOS or SWITCH will attempt to optimize office equipment facilities by minimizing the use of new office equipment, minimize the length of jumpers between frames, and reuse existing office equipment facilities, COSMOS or SWITCH will often not reuse the existing connection 244b at 250, and reassign a new jumper cable 252 for the second customer location. A work order is then issued to the central office for frame installers to make the appropriate changes to the office equipment facilities.

FIG. 11 is a detailed diagram of office equipment facilities for a first combination of customer locations. FIG. 11 illustrates the various connections within a frame at the central office. In FIG. 11, frame 254 connects three customer locations at entrance points 256a, 256b, 256c to office equipment connected to out going frame locations 260a, 260b, 260c via jumper cables 258a, 258b, 258c. Jumper cables 258a, 258b, 258c are to some extent disorganized, and longer than necessary, thereby inefficiently utilizing jumper cable facilities.

In order to correct the problem of inefficient allocation or provisioning of jumper cables, COSMOS or SWITCH in the FACS provisioning system will reorganize the jumper cables as illustrated in FIG. 12. Thus, frame 254 will connect customer entrance points 262a, 262b, 262c to office equipment accessed by cables 266a, 266b, 266c via jumpers 264a, 264b, 264c, thereby minimizing the jumper length and conserving use of the jumper cables. Accordingly, a frame installer will be dispatched to make the necessary changes to frame 254.

While the above goals of maximizing reuse of customer facilities including outside plant facilities and office equipment facilities has been a long standing and traditional objective or goal of all telephone companies for over one hundred years, we have discovered that the benefits of reusing customer facilities, including identification, are not sufficient to outweigh the disadvantages of requiring the necessary alterations to customer facilities.

In addition, we have discovered that in the overwhelming majority of situations, when a customer disconnects communication service, for example, when a customer discontinues use or is moving to a different location, another customer or the same customer will typically move into the previous customer location and request new communication service which is typically compatible with the previous customer facilities.

We have further discovered that it is more beneficial to maintain the existing connections to customer facilities and/or identification facilities for a particular customer location, since it is likely another customer will move into the disconnected customer location or the original customer will return in the near future, thereby eliminating the need to revise facilities.

We have also discovered that an important aspect of the above provisioning process is to be able to identify and handle service connection orders that might not automatically flow through the system for various problems, including, for example, data entry problems such as improper address entry. We have also discovered that it would be beneficial for service representatives to be able to access various facilities databases to verify and/or correct problems encountered relating to assigning facilities to a customer.

In addition, we have discovered that it would be beneficial for service representatives to be able to test the assigned communication facilities for which problems and/or manual assistance is required to verify whether assigned facilities are defective or operable.

We have also discovered that it is beneficial to provide the customer with a method of easily requesting the assignment of facilities, such as for example in a new connect, and have such request automatically provisioned or assigned by a facilities assignment system.

SUMMARY OF INVENTION

It is a feature and advantage of the present invention to maintain the existing connections and/or identifications to customer facilities for a particular customer location, since it is likely another customer will move into, or the original customer will return to, the disconnected customer location to reconnect services in the near future, thereby eliminating the need to dispatch installers to install outside plant or office equipment facilities.

Previous efforts to reduce provisioning costs and improve provisioning services have focused on improving the flow of work through the existing provisioning steps which have been described. This approach seeks to improve an underlying process that was developed to support provisioning in an analog copper facilities environment. In essence it seeks to improve flow-through. In contrast to this, the present invention is intended to provide an essentially no-flow paradigm where most service requests move directly from service negotiation to service activation without going through current largely unnecessary assignment processes. The system of the invention fully supports provisioning of services and also facilitates future enhancements to support provisioning of video, voice, data, broadcast video, video-on-demand (VOD), ISDN, Internet providers, and other advanced services.

The objects of the invention include reducing the operating cost of provisioning identifications and business functions, such as Install Inside and Install Outside; increasing the reliability of providing on-time, error-free service by reducing the number of orders that require manual assistance; increasing the flexibility of the provisioning process to support the activation of a new identifications, products or services quickly and inexpensively; enhancing customer service and customer retention by providing faster access to all products and services; providing a strong long-term information infrastructure that meets the needs of the existing products and provides a foundation that can handle the requirements of new products.

A further object of the present invention is the efficient identification and handling of service connection orders that might not automatically flow through the system for various problems, including data entry problems such as improper address entry. Another object of the present invention is the ability to access various facilities databases to efficiently verify and/or correct problems encountered relating to assigning identifications/facilities to a customer.

Another object of the present invention is to provide service representatives the ability to efficiently and effectively test the assigned identifications/communication facilities for which problems and/or manual assistance is required to verify whether assigned facilities are defective or operable.

Another object of the present invention is to provide the customer with a method of easily requesting identifications and/or the assignment of facilities, such as for example in a new connect, and have such request automatically provisioned or assigned by a facilities assignment system.

According to the present invention there is provided a Ready-To-Serve (RTS) Adjunct Processor (AP) and associated storage which eliminates the flow of orders through the multiple current systems described above. Because the service activation process is totally reengineered, service orders may be eliminated. This is accomplished through an integrated inventory management approach which dramatically decreases network churn. This approach permits the elimination of various databases, and allows the RTS processor to control identifications/TNs and addresses and to effect a greater degree of communication with, for example, the Memory Administration Systems and/or other Internet related systems.

According to the invention there is provided in an administration system for a communication network which includes an attendant station for receiving service requests and collecting customer information, credit verification means, service order processing (SOP) means for creating and distributing service orders for processing by downstream processing systems such as Service Order Analysis and Control (SOAC) means, a Computer System for Mainframe Operations (COSMOS) means, SWITCH means, and Loop Facility Assignment and Control System (LFACS) means; and Adjunct Processor (AP) means having storage for storing data including Living Unit (LU) data, network facility data and Telephone Number (TN) data; and using such system to provide service implementation through the steps of:

receiving at the attendant station a request for service;determining the reason for the request and customer information including customer name and service address;

checking credit;

using the customer information to determine from the AP the facility and services available;

selecting a TN from the AP;

recapping the service request with the customer;

determining if the service request is eligible for handling by the AP;

if not eligible, issuing a service order;

if eligible, initiating processing by the AP;

determining in the AP whether Work and Force Administration (WFA) action is necessary, and if so, preparing and dispatching a message to WFA;

determining in the AP whether a Memory Administration System (MAS) is involved and, if so, creating a Translation Packet (TP) and sending the TP to the MAS;

creating a Recent Change (RC) message in response to the TP and dispatching the message to the switch or other intelligent controller (IC);

updating the data in the AP in response to confirmation of completion of the WFA action and the switch translation;

generating and dispatching a completion message from the AP to the SOP; and preparing a completed service order for distribution and distributing the same.

In another aspect of the present invention, an administration system for a public switched telephone network (PSTN)

includes a first automatic service order processing system which receives a service request from a customer requesting service. When the service request is eligible, the first automatic service order processing system automatically provisions first network facilities including at least one of a domain name, a user name, a customer address, and an electronic mail address to execute the service request based upon first information stored by the first automatic service order processing system, the first information including customer identification data and customer facility data. The first information is maintained by the first automatic service order processing system without altering the network facility data when a disconnect request is received from the customer.

When the service request is not eligible, the first automatic service order processing system generates a provisioning request. The administration system also includes a second automatic service order processing system operatively connected to the first automatic service order processing system. The second automatic service order processing system receives the provisioning request from the first automatic service order processing system and automatically provisions second network facilities to execute the service request. The second automatic service order processing system is not required to maintain the network facility data when a disconnect request is received from the customer.

The present invention also features an administration method for a network including an attendant station for receiving service requests. The method includes receiving a service request from a customer at a living unit requesting service, and determining whether the living unit had previously been equipped with network facilities for service. When the living unit has not been previously equipped with the customer facilities, the method includes automatically provisioning customer equipment including at least one of a domain name, a user name, a customer network address, and an electronic mail address to execute the service request based upon information including customer identification data and network facilities. The information is maintained without altering the network facilities when a subsequent disconnect request is received from the customer.

When the living unit has been previously equipped with the network facilities, the method includes determining whether the service request corresponding to a living unit is eligible for provisioning using the network facilities previously utilized by the living unit. When the service request is eligible, the method includes automatically provisioning the network equipment to execute the service request based upon the information including the customer identification data and the network facilities previously used at the living unit.

In another aspect of the present invention, an administration system for a network includes a service order processing system receiving a service request from a customer requesting service for a customer location, and determining whether the service request is provisionable responsive to the service request and predetermined criteria. When the service order processing system determines that the service request is provisionable, automatically provisioning network facilities including at least one of a domain name, a user name, a customer network address, and an electronic mail address to execute the service request based upon information stored by the service order processing system.

The information includes customer identification data and customer facility data, and the information is maintained by the service order processing system without substantially altering the customer facility data.

The administration system also includes a verification system responsively connected to the service order processing system and verifying that the customer facilities provisioned by the service order processing system are correct.

In another aspect of the present invention, an administration system for a network includes anauxiliary database storing auxiliary data. The administration system also includes a service order processing system receiving a service request from a customer requesting service for a customer location, and determining whether the service request is provisionable responsive to the service request and predetermined criteria including whether the customer location matches a stored customer location stored by the service order processing system. When the service order processing system determines that the service request is provisionable, it automatically provisions customer facilities including at least one of a domain name, a user name, a customer network address, and an electronic mail address to execute the service request based upon information stored by the service order processing system. The information includes customer identification data and customer facility data, and the information is maintained by the service order processing system without substantially altering the customer facility data.

When the service request is determined by the service order processing system not to be provisionable, the service order processing system generates a status request for retrieving the auxiliary data associated with the information stored by the service order processing system. The service order processing system again determines whether the service request is provisionable responsive to the service request and the predetermined criteria and the auxiliary data, and provisions other facilities to execute the service request when the service request is determined to be provisionable.

The present invention also features an administration method for a network including an attendant station for receiving service requests. The method includes receiving a service request from a customer at a living unit requesting service, and determining whether the living unit had previously been equipped with customer facilities for service. When the living unit has not been previously equipped with the customer facilities, the method includes automatically provisioning customer equipment to execute the service request based upon information including customer identification data and network facilities. The information is maintained without altering the network facilities when a subsequent disconnect request is received from the customer. When the living unit has been previously equipped with the network facilities, the method includes determining whether the service request corresponding to a living unit is eligible for provisioning using the customer facilities previously utilized by the living unit. When the service request is eligible, the method includes automatically provisioning the network equipment including at least one of a domain name, a user name, a customer network address, and an electronic mail address to execute the service request based upon the information including the customer identification data and the network facilities previously used at the living unit.

BRIEF DESCRIPTION OF DRAWINGS

FIG. 7 is a detailed diagram of outside plant facilities for a first combination of customer locations.

FIG. 8 is a detailed diagram of outside plant facilities for a second combination of customer locations which has altered the first combination of customer locations.

BEST MODE FOR PRACTICING THE INVENTION

Figure 13A:
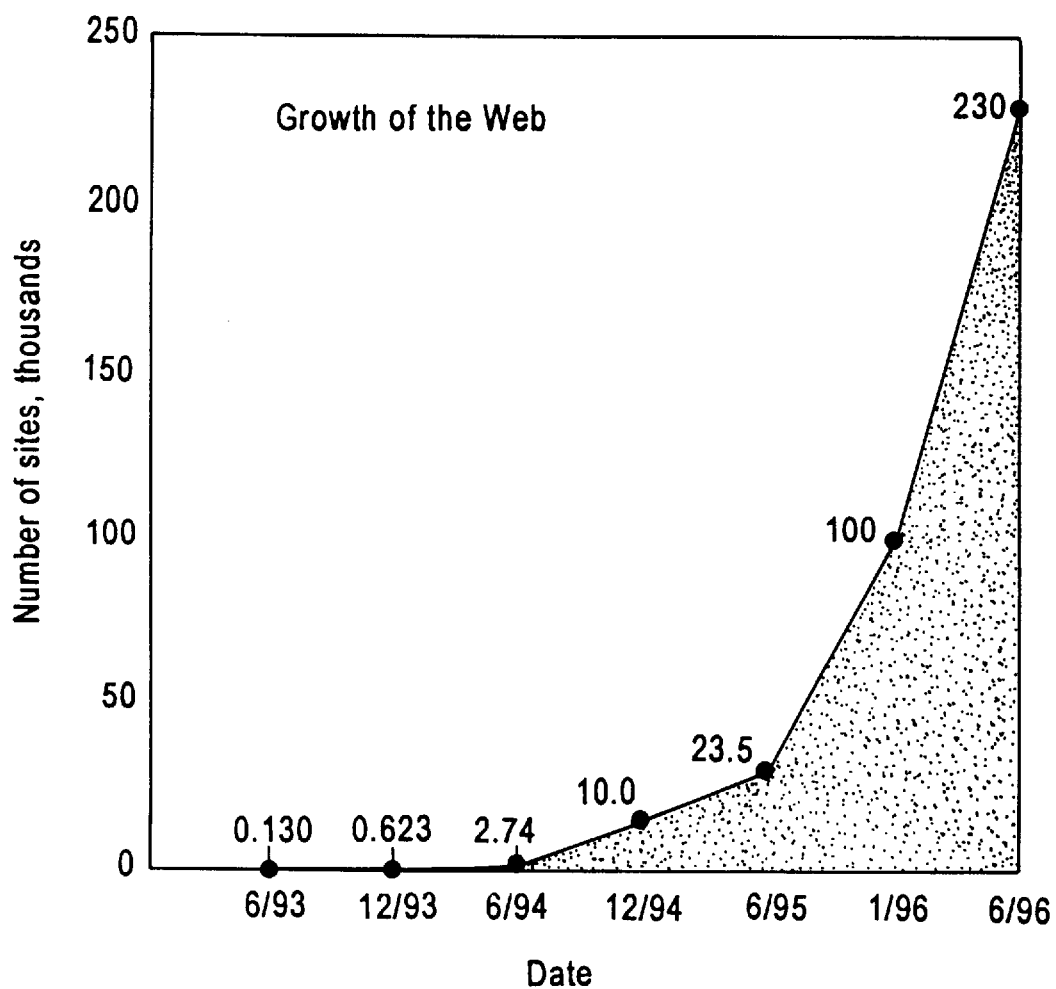
FIG. 13A is a graph illustrating increasing usage of the World Wide Web (WWW).

Several spectacular changes in the communications scene over the past few years will have a still stronger impact in 1997. Most obviously, the World Wide Web has been expanding at a rate more commonly associated with nuclear chain reactions as illustrated in FIG. 13A. An overview of the important considerations for provisioning facilities for Internet is presented below.

How Individuals Access the Internet

Individuals have a wide variety of avenues to access cyberspace in general, and the Internet in particular. In terms of physical access, there are two common methods to establish an actual link to the Internet. First, one can use a computer or computer terminal that is directly (and usually permanently) connected to a computer network that is itself directly or indirectly connected to the Internet. Second, one can use a "personal computer" with a "modem" to connect over a telephone line to a larger computer or computer network that is itself directly or indirectly connected to the Internet. As detailed below, both direct and modem connections are made available to people by a wide variety of academic, governmental, or commercial entities.

Students, faculty, researchers, and others affiliated with the vast majority of colleges and universities in the United States can access the Internet through their educational institutions. Such access is often via direct connection using computers located in campus libraries, offices, or computer centers, or may be through telephone access using a modem from a student's or professor's campus or off-campus location. Some colleges and universities install "ports" or outlets for direct network connections in each dormitory room or provide access via computers located in common areas in dormitories. Such access enables students and professors to use information and content provided by the college or university itself, and to use the vast amount of research resources and other information available on the Internet worldwide.

Similarly, Internet resources and access are sufficiently important to many corporations and other employers that those employers link their office computer networks to the Internet and provide employees with direct or modem access to the office network (and thus to the Internet). Such access might be used by, for example, a corporation involved in scientific or medical research or manufacturing to enable corporate employees to exchange information and ideas with academic researchers in their fields.

Those who lack access to the Internet through their schools or employers still have a variety of ways they can access the Internet. Many communities across the country have established "free-nets" or community networks to provide their citizens with a local link to the Internet (and to provide local-oriented content and discussion groups). The first such community network, the Cleveland Free-Net Community Computer System, was established in 1986, and free-nets now exist in scores of communities as diverse as Richmond, Va., Tallahassee, Fla., Seattle, Wash., and San Diego, Calif. Individuals typically can access free-nets at little or no cost via modem connection or by using computers available in community buildings. Free-nets are often operated by a local library, educational institution, or non-profit community group. Individuals can also access the Internet through many local libraries. Libraries often offer patrons use of computers that are linked to the Internet. In addition, some libraries offer telephone modem access to the libraries' computers, which are themselves connected to the Internet. Increasingly, patrons now use library services and resources without ever physically entering the library itself. Libraries typically provide such direct or modem access at no cost to the individual user.

Individuals can also access the Internet by patronizing an increasing number of storefront "computer coffee shops," where customers—while they drink their coffee—can use computers provided by the shop to access the Internet. Such Internet access is typically provided by the shop for a small hourly fee.

Individuals can also access the Internet through commercial and non-commercial "Internet service providers" that typically offer modem telephone access to a computer or computer network linked to the Internet. Many such providers are commercial entities offering Internet access for a monthly or hourly fee. Some Internet service providers, however, are non-profit organizations that offer free or very low cost access to the Internet. For example, the International Internet Association offers free modem access to the Internet upon request. Also, a number of trade or other non-profit associations offer Internet access as a service to members.

Another common way for individuals to access the Internet is through one of the major national commercial "online services" such as America Online, CompuServe, the Microsoft Network, or Prodigy. These online services offer nationwide computer networks (so that subscribers can dial-in to a local telephone number), and the services provide extensive and well organized content within their own proprietary computer networks. In addition to allowing access to the extensive content available within each online service, the services also allow subscribers to link to the much larger resources of the Internet. Full access to the online service (including access to the Internet) can be obtained for modest monthly or hourly fees. The major commercial online services have almost twelve million individual subscribers across the United States.

In addition to using the national commercial online services, individuals can also access the Internet using some (but not all) of the thousands of local dial-in computer services, often called "bulletin board systems" or "BBSs." With an investment of as little as $2,000.00 and the cost of a telephone line, individuals, non-profit organizations, advocacy groups, and businesses can offer their own dial-in computer "bulletin board" service where friends, members, subscribers, or customers can exchange ideas and information. BBSs range from single computers with only one telephone line into the computer (allowing only one user at a time), to single computers with many telephone lines into the computer (allowing multiple simultaneous users), to multiple linked computers each servicing multiple dial-in telephone lines (allowing multiple simultaneous users). Some (but not all) of these BBS systems offer direct or indirect links to the Internet. Some BBS systems charge users a nominal fee for access, while many others are free to the individual users.

Although commercial access to the Internet is growing rapidly, many users of the Internet—such as college students and staff—do not individually pay for access (except to the extent, for example, that the cost of computer services is a component of college tuition). These and other Internet users can access the Internet without paying for such access with a credit card or other form of payment.

Methods to Communicate Over the Internet

Once one has access to the Internet, there are a wide variety of different methods of communication and information exchange over the network. These many methods of communication and information retrieval are constantly evolving and are therefore difficult to categorize concisely. The most common methods of communications on the Internet (as well as within the major online services) can be roughly grouped into six categories:

(1) one-to-one messaging (such as "e-mail"), (2) one-to-many messaging (such as "listserv"), (3) distributed message databases (such as "USENET newsgroups"), (4) real time communication (such as "Internet Relay Chat"), (5) real time remote computer utilization (such as "telnet")

(6) remote information retrieval (such as "ftp," "gopher," and the "World Wide Web").

Most of these methods of communication can be used to transmit text, data, computer programs, sound, visual images (i.e., pictures), and moving video images.

One-to-one messaging. One method of communication on the Internet is via electronic mail, or "e-mail," comparable in principle to sending a first class letter. One can address and transmit a message to one or more other people. E-mail on the Internet is not routed through a central control point, and can take many and varying paths to the recipients. Unlike postal mail, simple e-mail generally is not "sealed" or secure, and can be accessed or viewed on intermediate computers between the sender and recipient (unless the message is encrypted).

One-to-many messaging. The Internet also contains automatic mailing list services (such as "listservs") that allow communications about particular subjects of interest to a group of people. For example, people can subscribe to a "listserv" mailing list on a particular topic of interest to them. The subscriber can submit messages on the topic to the listserv that are forwarded (via e-mail), either automatically or through a human moderator overseeing the listserv, to anyone who has subscribed to the mailing list. A recipient of such a message can reply to the message and have the reply also distributed to everyone on the mailing list. This service provides the capability to keep abreast of developments or events in a particular subject area. Most listserv-type mailing lists automatically forward all incoming messages to all mailing list subscribers. There are thousands of such mailing list services on the Internet, collectively with hundreds of thousands of subscribers. Users of "open" listservs typically can add or remove their names from the mailing list automatically, with no direct human involvement.

Listservs may also be "closed," i.e., only allowing for one's acceptance into the listserv by a human moderator.

Distributed message databases. Similar in function to listservs—but quite different in how communications are transmitted—are distributed message databases such as "USENET newsgroups." User-sponsored newsgroups are among the most popular and widespread applications of Internet services, and cover all imaginable topics of interest to users. Like listservs, newsgroups are open discussions and exchanges on particular topics. Users, however, need not subscribe to the discussion mailing is list in advance, but can instead access the database at any time. Some USENET newsgroups are "moderated" but most are open access. For the moderated newsgroups, n10 all messages to the newsgroup are forwarded to one person who can screen them for relevance to the topics under discussion. USENET newsgroups are disseminated using ad hoc, peer to peer connections between approximately 200,000 computers (called USENET "servers") around the world. For unmoderated newsgroups, when an individual user with access to a USENET server posts a message to a newsgroup, the message is automatically forwarded to all adjacent USENET servers that furnish access to the newsgroup, and it is then propagated to the servers adjacent to those servers, etc. The messages are temporarily stored on each receiving server, where they are available for review and response by individual users. The messages are automatically and periodically purged from each system after a time to make room for new messages. Responses to messages, like the original messages, are automatically distributed to all other computers receiving the newsgroup or forwarded to a moderator in the case of a moderated newsgroup. The dissemination of messages to USENET servers around the world is an automated process that does not require direct human intervention or review.

There are newsgroups on more than fifteen thousand different subjects. In 1994, approximately 70,000 messages were posted to newsgroups each day, and those messages were distributed to the approximately 190,000 computers or computer networks that participate in the USENET newsgroup system. Once the messages reach the approximately 190,000 receiving computers or computer networks, they are available to individual users of those computers or computer networks. Collectively, almost 100,000 new messages (or "articles") are posted to newsgroups each day.

Real time communication. In addition to transmitting messages that can be later read or accessed, individuals on the Internet can engage in an immediate dialog, in "real time", with other people on the Internet. In its simplest forms, "talk" allows one-to-one communications and "Internet Relay Chat" (or IRC) allows two or more to type messages to each other that almost immediately appear on the others' computer screens. IRC is analogous to a telephone party line, using a computer and keyboard rather than a telephone. With IRC, however, at any one time there are thousands of different party lines available, in which collectively tens of thousands of users are engaging in conversations on a huge range of subjects. Moreover, one can create a new party line to discuss a different topic at any time. Some IRC conversations are "moderated" or include "channel operators."

In addition, commercial online services such as America Online, CompuServe, the Microsoft Network, and Prodigy have their own "chat" systems allowing their members to converse.

Real time remote computer utilization. Another method to use information on the Internet is to access and control remote computers in "real time" using "telnet." For example, using telnet, a researcher at a university would be able to use the computing power of a supercomputer located at a different university. A student can use telnet to connect to a remote library to access the library's online card catalog program.

Remote information retrieval. The final major category of communication may be the most well known use of the Internet—the search for and retrieval of information located on remote computers. There are three primary methods to locate and retrieve information on the Internet.

A simple method uses "ftp" (or file transfer protocol) to list the names of computer files available on a remote computer, and to transfer one or more of those files to an individual's local computer.

Another approach uses a program and format named "gopher" to guide an individual's search through the resources available on a remote computer.

The World Wide Web

A third approach, and fast becoming the most well-known on the Internet, is the "World Wide Web." The Web utilizes a "hypertext" formatting language called hypertext markup language (HTML), and programs that "browse" the Web can display HTML documents containing text, images, sound, animation and moving video. Any HTML document can include links to other types of information or resources, so that while viewing an HTML document that, for example, describes resources available on the Internet, one can "click" using a computer mouse on the description of the resource and be immediately connected to the resource itself. Such "hyperlinks" allow information to be accessed and organized in very flexible ways, and allow people to locate and efficiently view related information even if the information is stored on numerous computers all around the world.

Purpose. The World Wide Web (W3C) was created to serve as the platform for a global, online store of knowledge, containing information from a diversity of sources and accessible to Internet users around the world. Though information on the Web is contained in individual computers, the fact that each of these computers is connected to the Internet through W3C protocols allows all of the information to become part of a single body of knowledge. It is currently the most advanced information system developed on the Internet, and embraces within its data model most information in previous networked information systems such as ftp, gopher, wais, and Usenet.

History. W3C was originally developed at CERN, the European Particle Physics Laboratory, and was initially used to allow information sharing within internationally dispersed teams of researchers and engineers. Originally aimed at the High Energy Physics community, it has spread to other areas and attracted much interest in user support, resource recovery, and many other areas which depend on collaborative and information sharing. The Web has extended beyond the scientific and academic community to include communications by individuals, non-profit organizations, and businesses.

Basic Operation. The World Wide Web is a series of documents stored in different computers all over the Internet. Documents contain information stored in a variety of formats, including text, still images, sounds, and video. An essential element of the Web is that any document has an address (rather like a telephone number). Most Web documents contain "links." These are short sections of text or image which refer to another document. Typically the linked text is blue or underlined when displayed, and when selected by the user, the referenced document is automatically displayed, wherever in the world it actually is stored. Links for example are used to lead from overview documents to more detailed documents, from tables of contents to particular pages, but also as cross-references, footnotes, and new forms of information structure.

Many organizations now have "home pages" on the Web. These are documents which provide a set of links designed to represent the organization, and through links from the home page, guide the user directly or indirectly to information about or relevant to that organization. As an example of the use of links a home page might contain links such as those:

THE NATURE OF CYBERSPACE
CREATION OF THE INTERNET AND THE DEVELOPMENT OF CYBERSPACE
HOW PEOPLE ACCESS THE INTERNET
METHODS TO COMMUNICATE OVER THE INTERNET

Links may take the user from the original Web site to another Web site on another computer connected to the Internet. These links from one computer to another, from one document to another across the Internet, are what unify the Web into a single body of knowledge, and what makes the Web unique. The Web was designed with a maximum target time to follow a link of one tenth of a second.

Publishing. The World Wide Web exists fundamentally as a platform through which people and organizations can communicate through shared information. When information is made available, it is said to be "published" on the Web. Publishing on the Web simply requires that the "publisher" has a computer connected to the Internet and that the computer is running W3C server software. The computer can be as simple as a small personal computer costing less than $1500 dollars or as complex as a multi-million dollar mainframe computer. Many Web publishers choose instead to lease disk storage space from someone else who has the necessary computer facilities, eliminating the need for actually owning any equipment oneself.

The Web, as a universe of network accessible information, contains a variety of documents prepared with quite varying degrees of care, from the hastily typed idea, to the professionally executed corporate profile. The power of the Web stems from the ability of a link to point to any document, regardless of its status or physical location.

Information to be published on the Web must also be formatted according to the rules of the Web standards. These standardized formats assure that all Web users who want to read the material will be able to view it. Web standards are sophisticated and flexible enough that they have grown to meet the publishing needs of many large corporations, banks, brokerage houses, newspapers and magazines which now publish "online" editions of their material, as well as government agencies, and even courts, which use the Web to disseminate information to the public. At the same time, Web publishing is simple enough that thousands of individual users and small community organizations are using the Web to publish their own personal "home pages," the equivalent of individualized newsletters about that person or organization, which are available to everyone on the Web.

Web publishers have a choice to make their Web sites open to the general pool of all Internet users, or close them, thus making the information accessible only to those with advance authorization. Many publishers choose to keep their sites open to all in order to give their information the widest potential audience. In the event that the publishers choose to maintain restrictions on access, this may be accomplished by assigning specific user names and passwords as a prerequisite to access to the site. Or, in the case of Web sites maintained for internal use of one organization, access will only be allowed from other computers within that organization's local network.

Searching the Web. A variety of systems have developed that allow users of the Web to search particular information among all of the public sites that are part of the Web. Services such as Yahoo, Magellan, Altavista, Webcrawler, and Lycos are all services known as "search engines" which allow users to search for Web sites that contain certain categories of information, or to search for key words. For example, a Web user looking for the text of Supreme Court opinions would type the words "Supreme Court" into a search engine, and then be presented with a list of World Wide Web sites that contain Supreme Court information. This list would actually be a series of links to those sites. Having searched out a number of sites that might contain the desired information, the user would then follow individual links, browsing through the information on each site, until the desired material is found. For many content providers on the Web, the ability to be found by these search engines is very important.

Common standards. The Web links together disparate information on an ever-growing number of Internet-linked computers by setting common information storage formats (HTML) and a common language for the exchange of Web documents (HTTP). Although the information itself may be in many different formats, and stored on computers which are not otherwise compatible, the basic Web standards provide a basic set of standards which allow communication and exchange of information. Despite the fact that many types of computers are used on the Web, and the fact that many of these machines are otherwise incompatible, those who "publish" information on the Web are able to communicate with those who seek to access information with little difficulty because of these basic technical standards.

A distributed system with no centralized control.

Running on tens of thousands of individual computers on the Internet, the Web is what is known as a distributed system. The Web was designed so that organizations with computers containing information can become part of the Web simply by attaching their computers to the Internet and running appropriate World Wide Web software. No single organization controls any membership in the Web, nor is there any single centralized point from which individual Web sites or services can be blocked from the Web. From a user's perspective, it may appear to be a single, integrated system, but in reality it has no centralized control point.

Contrast to closed databases. The Web's open, distributed, decentralized nature stands in sharp contrast to most information systems that have come before it. Private information services such as Westlaw, Lexis/Nexis, and Dialog, have contained large storehouses of knowledge, and can be accessed from the Internet with the appropriate passwords and access software. However, these databases are not linked together into a single whole, as is the World Wide Web.

Success of the Web in research, education, and political activities. The World Wide Web has become so popular because of its open, distributed, and easy-to-use nature. Rather than requiring those who seek information to purchase new software or hardware, and to learn a new kind of system for each new database of information they seek to access, the Web environment makes it easy for users to jump from one set of information to another. By the same token, the open nature of the Web makes it easy for publishers to reach their intended audiences without having to know in advance what kind of computer each potential reader has, and what kind of software they will be using.

The Internet is not exclusively, or even primarily, a means of commercial communication. Many commercial entities maintain Web sites to inform potential consumers about their goods and services, or to solicit purchases, but many other Web sites exist solely for the dissemination of non-commercial information. The other forms of Internet communication—e-mail, bulletin boards, newsgroups, and chat rooms—frequently have non-commercial goals. For the economic and technical reasons set forth in the following paragraphs, the Internet is an especially attractive means for not-for-profit entities or public interest groups to reach their desired audiences. Human Rights Watch, Inc., offers information on its Internet site regarding reported human rights abuses around the world. National Writers Union provides a forum for writers on issues of concern to them. Stop Prisoner Rape, Inc., posts text, graphics, and statistics regarding the incidence and prevention of rape in prisons. Critical Path AIDS Project, Inc., offers information on safer sex, the transmission of HIV, and the treatment of AIDS.

Such diversity of content on the Internet is possible because the Internet provides an easy and inexpensive way for a speaker to reach a large audience, potentially of millions. The start-up and operating costs entailed by communication on the Internet are significantly lower than those associated with use of other forms of mass communication, such as television, radio, newspapers, and magazines. This enables operation of their own Web sites not only by large companies, such as Microsoft and Time Warner, but also by small, not-for-profit groups, such as Stop Prisoner Rape and Critical Path AIDS Project. Commercial online services such as America Online allow subscribers to create Web pages free of charge. Any Internet user can communicate by posting a message to one of the thousands of newsgroups and bulletin boards or by engaging in an on-line "chat", and thereby reach an audience worldwide that shares an interest in a particular topic.

The ease of communication through the Internet is facilitated by the use of hypertext markup language (HTML), which allows for the creation of "hyperlinks" or "links". HTML enables a user to jump from one source to other related sources by clicking on the link. A link might take the user from Web site to Web site, or to other files within a particular Web site. Similarly, by typing a request into a search engine, a user can retrieve many different sources of content related to the search that the creators of the engine have collected.

Through the use of HTML, for example, Critical Path and Stop Prisoner Rape link their Web sites to several related databases, and a user can immediately jump from the home pages of these organizations to the related databases simply by clicking on a link. America Online creates chat rooms for particular discussions but also allows subscribers to create their own chat rooms. Similarly, a newsgroup gathers postings on a particular topic and distributes them to the newsgroup's subscribers. Users of the Carnegie Library can read on-line versions of Vanity Fair and Playboy, and America Online's subscribers can peruse the New York Times, Boating, and other periodicals. Critical Path, Stop Prisoner Rape, America Online and the Carnegie Library all make available content of other speakers over whom they have little or no editorial control.

Because of the different forms of Internet communication, a user of the Internet may speak or listen interchangeably, blurring the distinction between "speakers" and "listeners" on the Internet. Chat rooms, e-mail, and newsgroups are interactive forms of communication, providing the user with the opportunity both to speak and to listen.

It follows that unlike traditional media, the barriers to entry as a speaker on the Internet do not differ significantly from the barriers to entry as a listener. Once one has entered cyberspace, one may engage in the dialogue that occurs there. In the argot of the medium, the receiver can and does become the content provider, and vice-versa. The Internet is therefore a unique and wholly new medium of worldwide human communication.

Once a provider posts content on the Internet, it is available to all other Internet users worldwide. Similarly, once a user posts a message to a newsgroup or bulletin board, that message becomes available to all subscribers to that newsgroup or bulletin board. Once a provider posts its content on the Internet, it cannot prevent that content from entering any community. Unlike the newspaper, broadcast station, or cable system, Internet technology necessarily gives a speaker a potential worldwide audience. Because the Internet is a network of networks any network connected to the Internet has the capacity to send and receive information to any other network. Hotwired ventures, for example, cannot prevent its materials on mixology from entering communities that have no interest in that topic.

It takes several steps to enter cyberspace. At the most fundamental level, a user must have access to a computer with the ability to reach the Internet (typically by way of a modem). A user must then direct the computer to connect with the access provider, enter a password, and enter the appropriate commands to find particular data. On the World Wide Web, a user must normally use a search engine or enter an appropriate address. Similarly, accessing newsgroups, bulletin boards, and chat rooms requires several steps.

Unlike other forms of communication on the Internet, there is technology by which an operator of a World Wide Web server may interrogate a user of a Web site. An HTML document can include a fill-in-the-blank "form" to request information from a visitor to a Web site, and this information can be transmitted back to the Web server and be processed by a computer program, usually a Common Gateway Interface (cgi) script. The Web server could then grant or deny access to the information sought. The cgi script is the means by which a Web site can process a fill-in form and thereby screen visitors by requesting a credit card number or adult password.

A large percentage, perhaps 40% or more, of content on the Internet originates outside the United States. An Internet user could access a Web site of London (which presumably is on a server in England), and then link to other sites of interest in England. A user can sometimes discern from a URL that content is coming from overseas, since InterNIC allows a content provider to imbed a country code in a domain name. Foreign content is otherwise indistinguishable from domestic content (as long as it is in English), since foreign speech is created, named, and posted in the same manner as domestic speech. There is no requirement that foreign speech contain a country code in its URL.

The use of "caching" makes it difficult to determine whether the material originated from foreign or domestic sources. Because of the high cost of using the trans-Atlantic and trans-Pacific cables, and because the high demand on those cables leads to bottleneck delays, content is often "cached", or temporarily stored, on servers in the United States. Material from a foreign source in Europe can travel over the trans-Atlantic cable to the receiver in the United States, and pass through a domestic caching server which then stores a copy for subsequent retrieval. This domestic caching server, rather than the original foreign server, will send the material from the cache to the subsequent receivers, without placing a demand on the trans-oceanic cables. This shortcut effectively eliminates most of the distance for both the request and the information and, hence, most of the delay. The caching server discards the stored information according to its configuration (e.g., after a certain time or as the demand for the information diminishes). Caching therefore advances core Internet values: the cheap and speedy retrieval of information.

Caching is not merely an international phenomenon. Domestic content providers store popular domestic material on their caching servers to avoid the delay of successive searches for the same material and to decrease the demand on their Internet connection. America Online can cache the home page of the New York Times on its servers when a subscriber first requests it, so that subsequent subscribers who make the same request will receive the same home page, but from America Online's caching service rather than from the New York Times's server.

Related Legal Issues on the Internet

Even though the Internet was the created or conceived by universities, research organizations and the like, the Internet has been discovered by the "dog-eat-dog" world of commerce. Many are predicting that the Internet will be the trading hub of the future.

World Wide Web (WWW) sites are being established by companies to promote their products and services. WWW sites provide accessors or users of the address with news, data, software programs, multimedia information, and the like. Companies interested in establishing their presence on the Internet by opening such sites are often engulfed with various business procedures and business strategies. Oftentimes, companies may neglect to consider legal issues associated with offering products and services on the Internet. The following briefly describes some of the more important legal issues that relate to the offering of goods/services via a web site on the Internet.

Web Site Page Design.

After obtaining a domain name that is acceptable to both the company and U.S. trademark laws, the Web site page (or user interface) needs to be designed. Unfortunately, companies tend to ignore or downplay the potential importance of the Web site page. For example, companies tend to include snappy audio and video presentations that they do not own or have the right to use.

Accordingly, Web site page owners should be very cautious since they also might be required to redesign their Web page. Therefore, when designing the Web page, care should be taken to avoid using graphic, pictures, music, and the like that are not in the public domain and that might be protected by U.S. copyright laws.

Companies should also contemplate obtaining business insurance for copyright and/or trademark infringement actions. Even though a company may be insured against monetary damages, the company may nevertheless be required to re-design its Web page. Therefore, the recommended approach is to perform the necessary clearance searches prior to the launching of the Web page.

Ownership of Web Site Page Design

A company may have its own employees or individuals outside the company design its Web page. Specialized graphics design, and computer-programming skills may be required for the design of the Web page.

To avoid questions about the rightful ownership of the resulting intellectual property in the Web page, Web site owners should contractually retain all ownership in the Web page design. Failure to properly organize ownership may result in a subsequent litigation that takes much time and expense to resolve.

Downloading of Information by Others and the Company

Downloads of information are permitted in many interactive sites. Due to the worldwide nature of the Internet, if a company permits content downloads on its Web page, it is critical that the any contracts that might be provided with the download specifically address or consider the relevant export laws that might apply.

On the other hand, a company should advise and/or warn its employees against the indiscriminate downloading of software information. The reason is that many times software that is provided for free on the Internet for downloading includes specific restrictions and/or limitations that should be avoided, if at all possible.

Contests

To stimulate sales of products and services, many companies establish interactive contests on a Web site. The interactive contest encourages active participation in the Web page, and therefore, provides a company with the opportunity to attract potential new customers as well as providing an excellent advertising tool. Companies, however, should be warned that such contests must comply with applicable state and federal laws and regulations. For example, there are specific US and foreign gaming laws and regulations that must be complied with when offering a contest via the Internet. Failure to consider such laws and regulations could create significant complications.

Product Sales Via the Web Site

If a company is selling its own products via the Internet, the company should ensure that the product sales include appropriate terms and conditions that address issues raised by the worldwide electronic nature of the Internet. For example, in the US, software is generally licensed on specific terms, including the prohibition of reverse engineering, servicing of the software. The company should also determine whether its product liability insurance applies to these types of "on-line" sales.

The company that intends to permit others to sell or distribute its products from its Web site should additionally execute agreements that clearly define the distributors responsibilities. For example, appropriate warranties and indemnification provisions that protect the company from product liability, tax and related third-party claims should be considered.

Distributors Preferred Over Publishers

A company that is in the business of distributing information should generally attempt to be classified as a distributor, not a publisher. The reason is that current US law generally imposes greater liability on publishers than distributors in connection with slanderous or libelous statements transmitted through via Web site. To increase the likelihood of not being considered a publisher, many courts have suggested that companies should not edit the content of the messages that are being transmitted through its Web site.

Customer Desire for Privacy

Companies should also not ignore the importance of keeping the identity of their subscribers/customers private. Customer privacy can be important since Internet users can be contacted at little or no cost once their e-mail addresses have been obtained. Accordingly, a companies' intended use of e-mail addresses should be reviewed to confirm that its intended uses of the e-mail addresses is proper.

Trademark Clearance

Even though InterNIC clears domain names for use on the Internet, a search of trademarks and trade names used in the United States should also be performed. The results of a trademark search may save a company from the surprisingly familiar ordeal of expending time and effort promoting its products recognized by a domain name that infringes another's trademark rights. In this situation, the company may be forced to rename existing products and invest heavily in new advertising campaigns.

Obtaining a Domain Name

For users of the Internet, a unique address or "domain name" is required for each site on the computer network. A domain name is the address through which users access the site. A domain name on the Internet is analogous to an individual phone number for telephone users. Each site must have a domain name.

A trademark owner does not have the proprietary rights to contest the use of its mark as a domain name on the Internet, where domain names are given on a "first come, first serve" basis. On the Internet, no trademark searches are done, and unlike other computer networks, such as America On-Line®, CompuServe®, and Prodigy®, no central authority exists. Due to recent trademark infringement controversies, applications for domain names now require applicants to state that they have a commercial right to use the applied for name.

The assignment of domain names is administered by the Internet National Information Center (InterNIC), an organization that voluntarily screens domain names for the information superhighway. InterNIC generally registers domain names on a first-come, first-serve basis.

InterNic has recently issued a "Domain Dispute Resolution Policy Statement" in response to the large number of trademark disputes involving domain. The new policy requires applicants to defend, indemnify and hold harmless InterNic for any liability arising from certain claims related to the use or registration of the domain name. These claims include trademark of service mark infringement, tortious interference with contract or prospective business advantage and unfair competition.

The policy provides that if a third party, without a federally registered trademark or service mark, claims that a domain name infringes its trademark or service marks, the owner of the domain name will be allowed to continue to use the domain name unless a court or arbitrator issues an order to the contrary. InterNic reserves the right to withdraw a domain name if it receives such an order stating that the domain name belongs to a third party.

If InterNic, however, receives evidence that a registered domain name is identical to that of a third party's registered trademark or service mark, the owner of the domain name must provide InterNic with a certified copy of its own federal trademark or service mark registration for the mark being used as the domain name. In the event the owner of the domain name cannot do so, InterNic will aid in finding a new domain name and will provide a 90-day transition period during which both domain names will be used simultaneously. After the 90 days, the disputed name will be put on hold status until the dispute is resolved.

In the event the domain name owner can provide InterNic with federal registration, then the domain name owner can continue to use the domain name until InterNic receives a court or arbitration order providing otherwise. The domain name owner must agree to indemnify InterNic from any liability and post a bond in an amount that will satisfy the third party's claim. Failure to do so allows InterNic to place the domain name on hold status until the dispute is resolved.

For more information concerning the process for requesting and registering a domain name, call InterNIC at (703) 742–4777, or send an e-mail message to: admin.@ds.internic.net.

Domain names are generally designed to be catchy or snappy to facilitate use of the site. In fact, many times these domain names correspond to a company's trademarks or trade names. Entrepreneurs (some might call them gold diggers) have attempted to cash-in on this latest craze and have attempted to obtain or register popular names as domain names. Some of the best-known companies have been dismayed to learn that a growing number of people are registering domain names that mimic such popular names.

For instance, McDonalds, the fast food chain, was astonished to learn that the domain name "mcdonalds.com" had already been claimed by a magazine writer whose e-mail address is "ronald@mcdonalds.com." Similarly, according to published accounts, the domain names "hertz.com," "coke.com," "nasdaq.com," and "cbs.com" were not registered by the entities utilizing or marketing such names.

Another illustrative case on the fight over domain names involved a well-publicized fight over cyber-identify between two well-known competitors. Stanley H. Kaplan Educational Center, Ltd., a company well-known for its standardized test review programs, sued the Princeton Review Management Corp., based on Princeton's reservation and use of the Internet domain name "kaplan.com." Kaplan alleged claims of trademark infringement, tortious interference with prospective business relations, and unfair competition.

Princeton Review offered to sell the domain name to Kaplan for "a case of beer," but Kaplan refused, believing it was entitled to damages and attorneys' fees. An arbitration panel ordered Princeton Review to transfer all rights to the "kaplan.com" domain name to Stanley Kaplan, but refused to award damages or attorneys' fees to Kaplan.

Another example of possible lawsuits that can arise over use of domain names involved MTV Networks. MTV Networks sued Adam Curry, a former "veejay" employee, alleging that Curry's commercial use of the Internet domain address "MTV.COM" was unlawful. MTV Networks moved to enjoin Curry from infringing its trademarks and engaging in unfair competition.

As is clearly evident from the above, the assignment and management of identifiers, for example, domain names, is extremely important. Efficient methods of implementing a process for the assignment of domain names is of paramount importance.

Figure 13B:
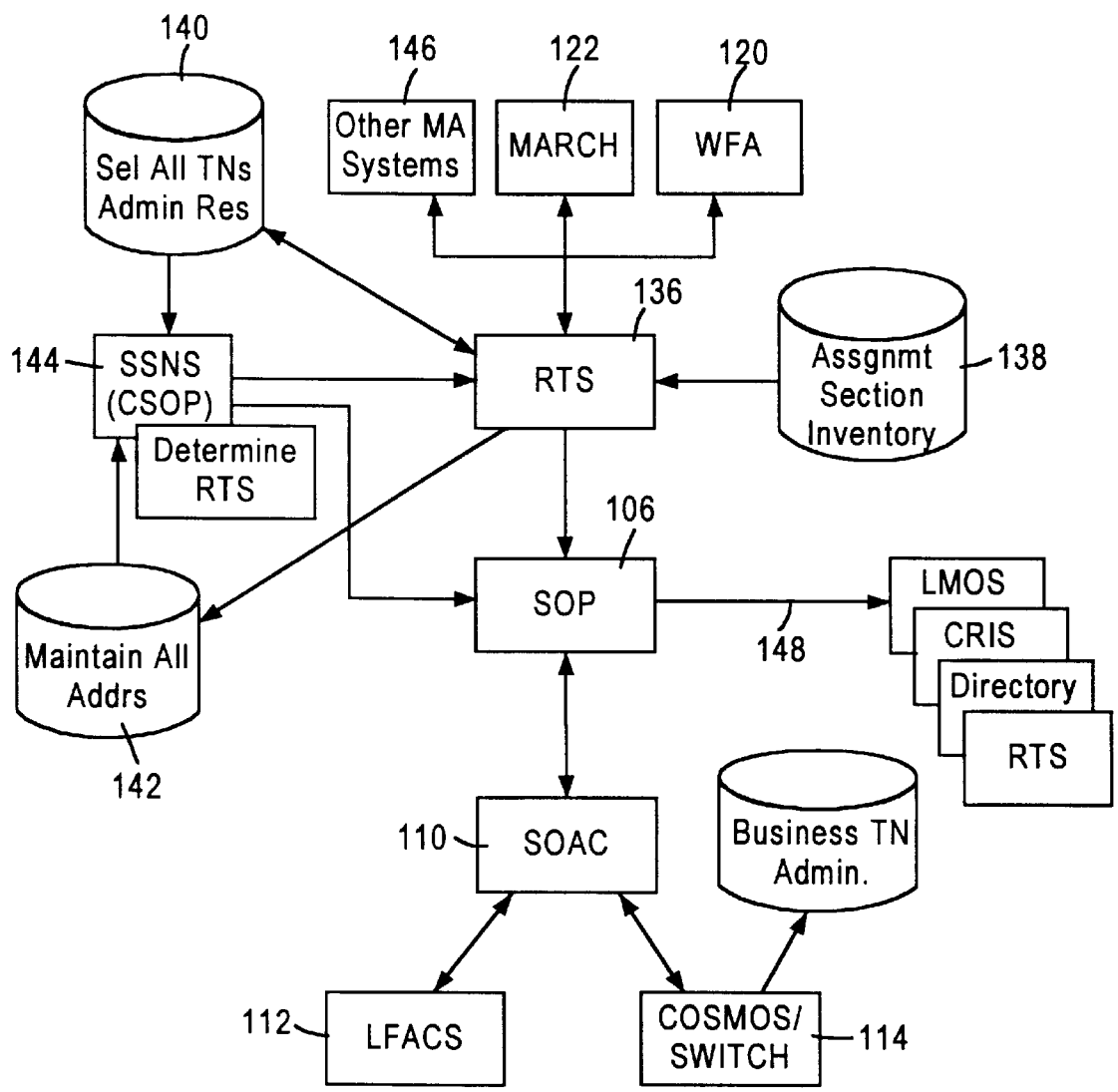
FIG. 13B is a block diagram illustrating the architecture of the preferred embodiment of the invention for administration of a PSTN.

Referring to FIG. 13 there is shown a block diagram of the architecture of the system used in implementing the invention according to a first embodiment. The Ready-To-Serve (RTS) Adjunct Processor (AP) is indicated at 136 and includes storages or memories 138, 140 and 142. While these memories are illustrated as separate items it will be understood that a single storage may be utilized and is preferred. The RTS is connected, for example, to the Sales Service Negotiation System (SSNS) and Common Service order Processor (CSOP) 144. The SSNS comprises a graphical user interface system that presents information to service representatives from a variety of systems and platforms in a window format to assist negotiation of services, inquiries, network facilities, telephone numbers, identifiers, user names, domain names, and the like.

The CSOP translates service requests from SSNS into service order format and reverts. The RTS processor and its storage or memories store an inventory of data which includes address information, network facility data, identification data, user name data, domain name data, and Telephone Number data. Addresses, user names, domain names, and the like, are associated with specific network facility data that will serve the address. Customers are associated with the address, user name, domain name, and the like, being served by the network. Included in the customer information is the Telephone Number, identifier means, user name, and/or domain name, of the customer and the type of service which is provided. Customer data also includes information concerning the current and previous customers, service, and status of each.

In general the RTS builds, maintains, and deletes information about the Living Unit (LU) address. The living unit address information may represent a physical living unit and/or location, or a logical living unit and/or location (e.g., domain name, electronic mail address, user name, and the like). This information is provided as required for the service negotiation process and is used in the processing of service activation requests. The customer information associated with the LU address supports access to customer data which includes existing and former customer names, class of service, telephone number, status of the line, and disconnect reason.

The RTS validates address information provided by the customer at the time of service negotiation for a service request and provides all LU information associated with the address to the service negotiator. RTS provides capability to search by partial or full address, customer name, and telephone number. RTS contains all LU addresses regardless of the existing service type including both residential and business addresses. RTS LU databases are initially compiled from a combination of available data sources including PREMIS, LFACS, CRIS (Customer Records Information System), LMOS, and 911.

In general RTS builds, maintains, and deletes information common to a range of addresses. These ranges are modifiable for specific addresses within an area. This information is provided as required for the service negotiation process along with LU information and is used in the processing of service activation requests. The information is currently referred to as Street Address Guide (SAG) information and is contained in the existing PREMIS database. The RTS also builds, maintains, and deletes information about the Facility Information serving a LU address. This information is provided as required to the service negotiation process for use in the processing of service activation requests and in providing assignment data to other downstream systems.

The RTS Facility Information includes living units specific facility information. This facility information includes outside and central office facility data normally listed on the service order, such as: Outside facility data-cable and pair for F1, F2, FN; terminal addresses for distribution and feeder; status; and central office facility data; F1 cable and pair location; Office Equipment (OE) and location and status. Other types of living unit information are also contemplated such as routing preferences, electronic mail routing information, preferred routing information, and various other internet related data, electronic mail data, and the,like.

The RTS provides capability to search by facility, address, identification data and provides facility information and status. The RTS maintains a real-time view of the network facilities inventoried in LFACS and COSMOS and/or SWITCH. RTS performs updates to the facility data resulting in activity from the facility inventory systems including LFACS and COSMOS/SWITCH. These may result from network rearrangements in the form of Engineering Work Orders, maintenance changes, database reconciliations and other service order activity.

RTS also stores and maintains telephone numbers for all residential services and small business services. These are administered in RTS which controls the status and aging of such telephone numbers. Telephone numbers will be provided as required to the service negotiation process, for use in the processing of service activation requests, and in providing to other downstream systems. RTS has the capability to define, assign and change the status of a telephone number and will age residential and small business telephone numbers and make them available for reassignment after proper aging. RTS updates the telephone number database as a result of customer service requests, database reconciliations with other systems, and changes initiated by other inventory systems. The telephone number database is built from existing sources including COSMOS/SWITCH, LFACS, and Customer Records Information System (CRIS), which is the billing system for exchange services.

RTS stores and maintains an association for the Access Path. This association relates a specific LU address to a specific outside facility and office equipment and has a related customer and telephone number. RTS maintains a real-time view of the network facilities inventoried in LFACS and COSMOS. RTS performs updates to the Access Path data due to changes in LFACS and COSMOS/SWITCH.

While RTS has the capabilities to alter various data associated with a customer address, it is the goal of RTS to maintain the network or customer facility assignments (e.g., cable, OE, physical address, logical address, telephone number, electronic address, domain name, user name, and the like, depending on the specific goals and/or circumstances of the provisioning environment) in tact, under all circumstances for which RTS is applicable.

Accordingly, the service request is first transmitted to RTS to determine whether the same facilities can be provisioned to the customer, without optimizing outside plant and office equipment facilities which would be performed by LFACS, SWITCH and COSMOS. RTS, therefore, eliminates, for example, the potential re-working or re-assignment of customer facilities under most circumstances which LFACS, COSMOS and SWITCH will attempt for each service order request. Thus, RTS minimizes, for example, the amount of unnecessary installation work with the realization that the customer facility assignments may not be optimal. In addition, RTS minimizes, for example, the amount of re-assignment of identification information such as telephone number data, user name data, domain name data, electronic address data, and the like.

In service request processing, RTS has the ability to search by address, telephone number, customer name or SSN. RTS assigns a unique identifier to each service request which allows users and other systems to track and inquire about specific service requests. RTS also extracts service request data relevant to RTS processing and determines if a service request is RTS eligible or if the request must be sent to a Service Order Processor for processing.

RTS provides an interface to implement interaction between facilities and the Service Request. Thus, RTS determines if the service request requires dispatch for customer premises work and, if so, creates data packets containing service request information which are sent to WFA/DO.

RTS determines if an Activation Message is required for the Service Request and the Memory Administration Systems involved. RTS then creates and distributes activation messages to the various Memory Administration Systems. RTS also interfaces with MARCH to send activation messages and receive acknowledgement of work completed or error in processing.

RTS receives requests from other systems both in real time and batch modes. These systems include SSNS (Sales Service Negotiation System), SOP, EAMI (Exchange Access Mechanized Input) for processing Primary Interexchange Carrier (PIC) orders, and ASTR (Automatic Suspension Termination Referral) for processing Suspension, Denial, Restoral and Disconnect orders.

RTS has the functionality to alter and manage distributions depending on the type of service request. Thus, RTS transmits data to SOP, WFA/DO, MARCH and the other Memory Administration Systems as required. RTS receives facility status requests from inventory systems and transmits the facility status back to the requesting system.

RTS provides reports of various types including reports detailing information regarding the RTS data inventory, the volume of information processed by RTS, capacity available, time of processing requests of different types, and number of requests processed.

In order for RTS to accomplish the foregoing certain existing elements in the system are modified. Thus, SSNS is modified to interface with RTS for address, TN, customer, and service request information. LFACS and COSMOS/SWITCH status facilities as RTS, LFACS and COSMOS/SWITCH work without the current working/idle facility status. COSMOS/SWITCH loads business TNs into RTS. WFA/DO interfaces with RTS for dispatch requests and confirmations. RTS interfaces with MARCH for activation messages and configurations. RTS distributes to the other MA systems. SOP accepts an order from SSNS. SOP must also be able to accept the completion trigger from RTS and match it with a service order in its pending files.

As seen in FIG. 13, RTS 136 is also linked to other elements of the system including MARCH 122, WFA 120, SOP 106, SOAC 110, LFACS 112, COSMOS 114, and other MA systems 146. A link to a third net and its connected elements is provided at 148. SOP 106 is linked to SOAC at 110 for handling those requests which are not RTS eligible.

Figure 14:
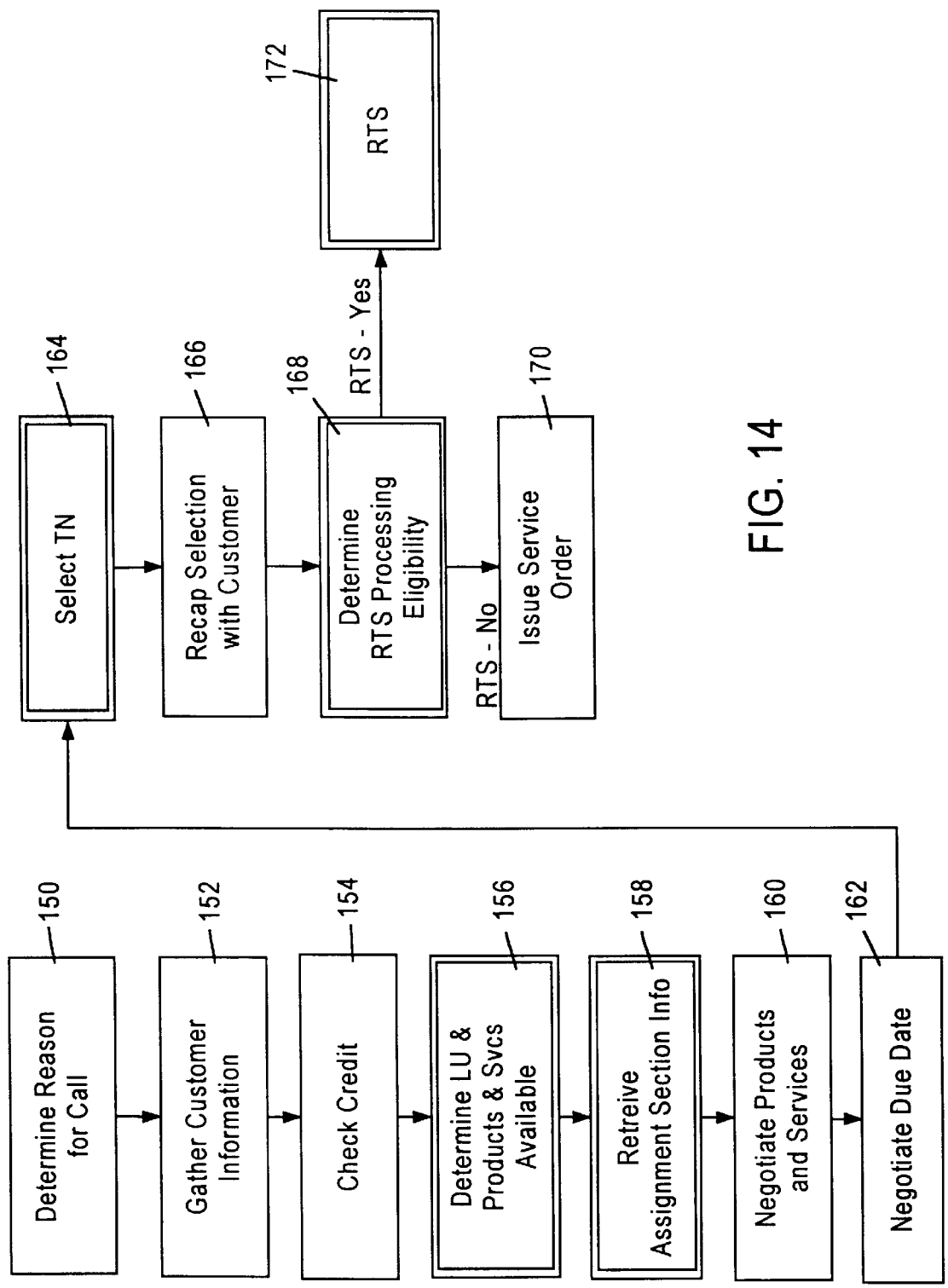
FIGS. 14 and 15 are flow-charts illustrating the methodology of the system of the invention in performing service activation.
Figure 15:
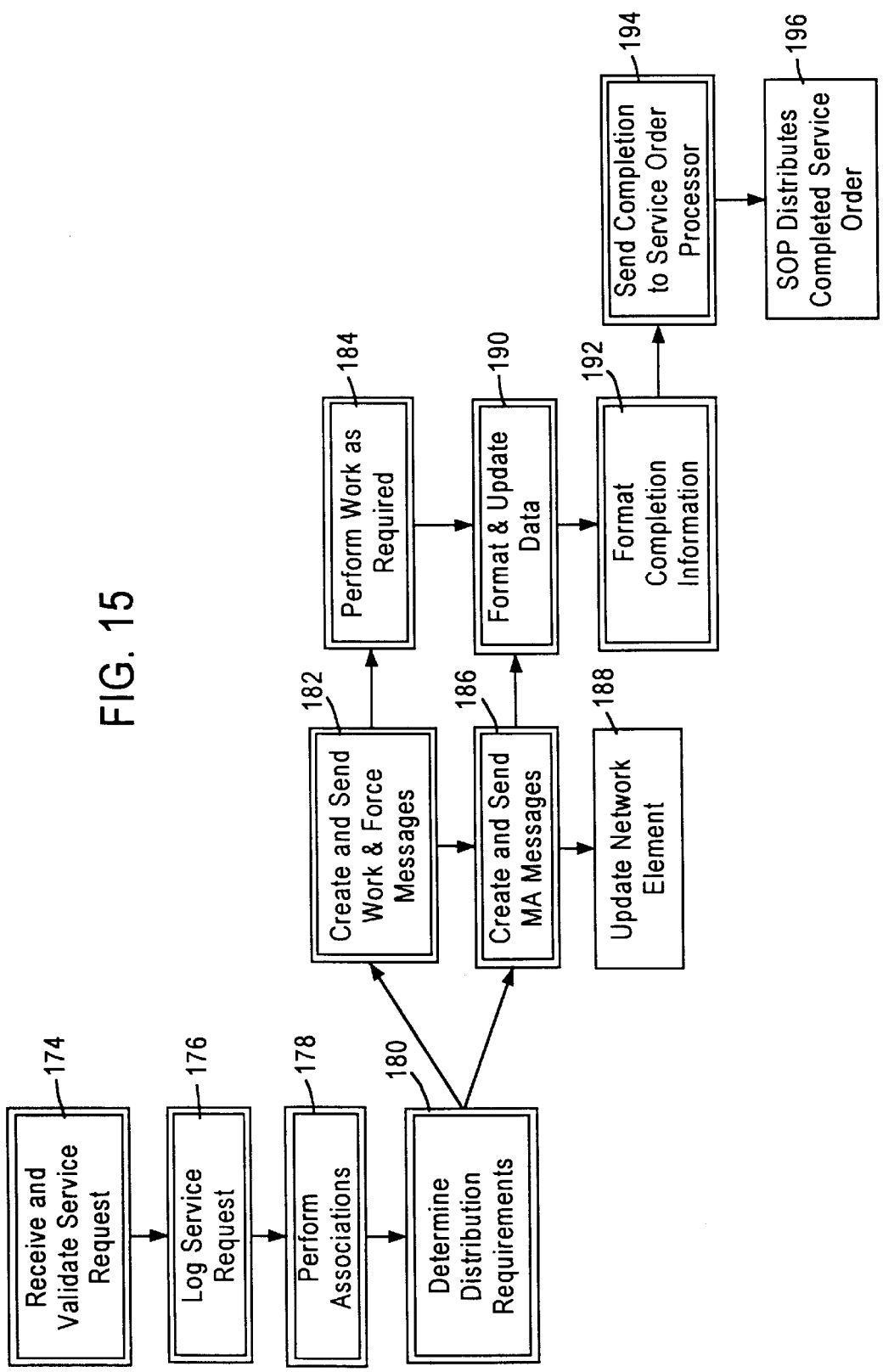

The method of operation of this preferred embodiment of the invention is now described in connection with the flow chart in FIGS. 14 and 15. Referring to FIG. 14, at 150 the customer service representative determines the customer's address and the reason for the call. This may be for ordering, for example, service, user name, electronic mail address, domain name, making bill payment arrangements, registering a deposit, or calling for service maintenance. The call is handled or transferred according to need. If the customer is calling for new service or a change to existing service, the process proceeds to 152.

At 152 the customer service representative gathers the necessary information including the name of the calling party, the name of the customer, and the service address. If this is a new customer, the service representative may also obtain employment history, date of birth, SSN, and previous address information. The billing name and address is determined if different from the service address. The representative also ascertains how the customer wishes there service to be listed, the numbers and types of directories, calling cards, and any disclosures that are required.

Figure 1:
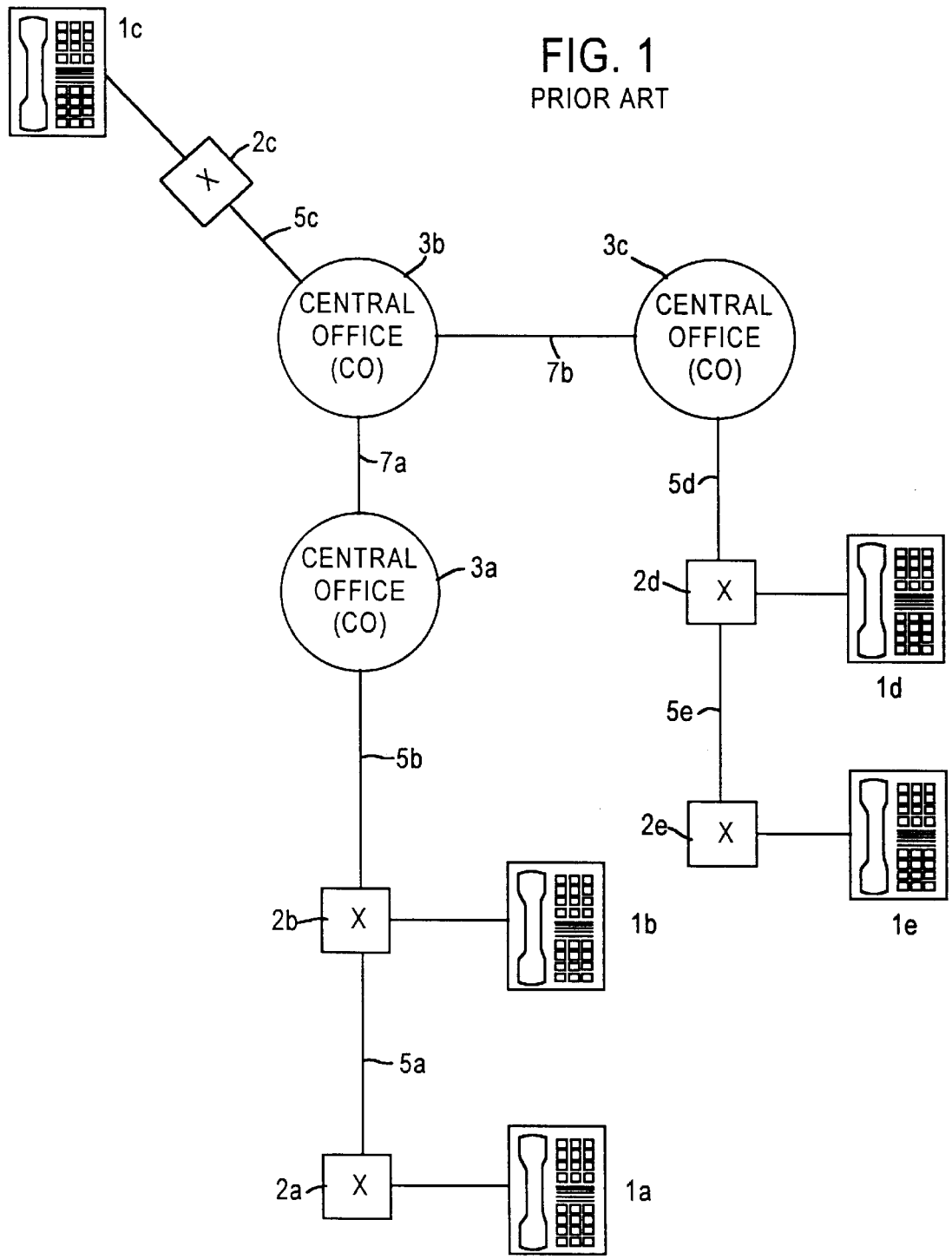
FIG. 1 is diagram illustrating the basic structure or arrangement of the customer and telephone company facilities for providing telephone service or connection between a telephone caller and a telephone receiver destination.
Figure 2:
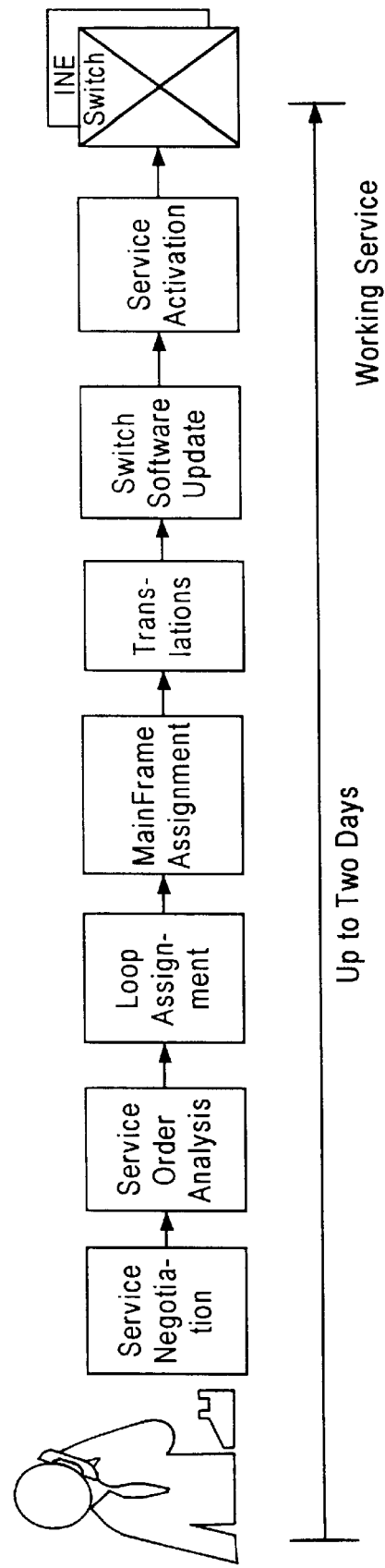
FIG. 2 is a simplified block diagram showing current (prior art) Public Switched Telephone Network (PSTN) provisioning.
Figure 5:
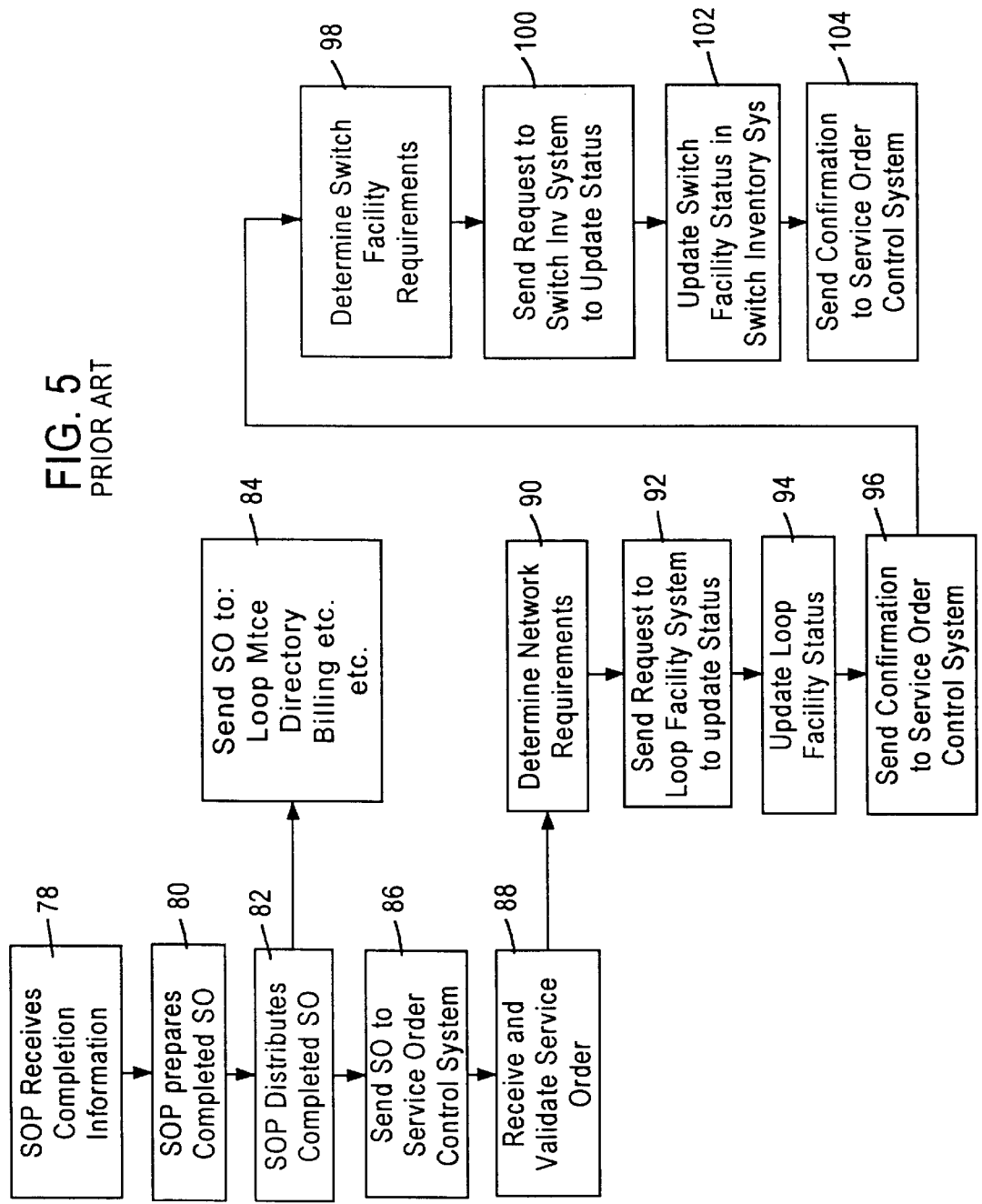
Figure 6:
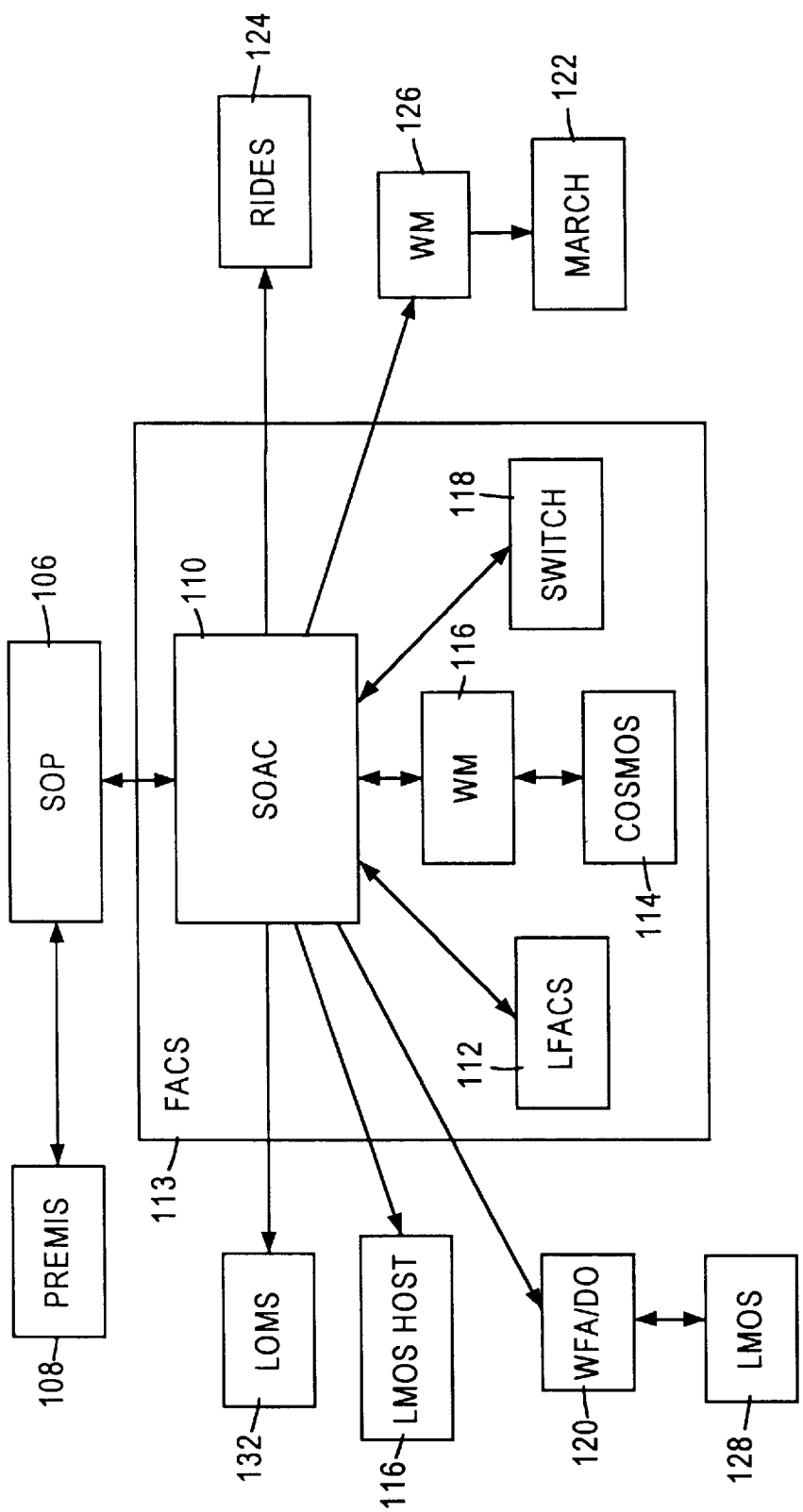
FIG. 6 is a block diagram illustrating the architecture of the current (prior art) PSTN administration system.
Figure 9:
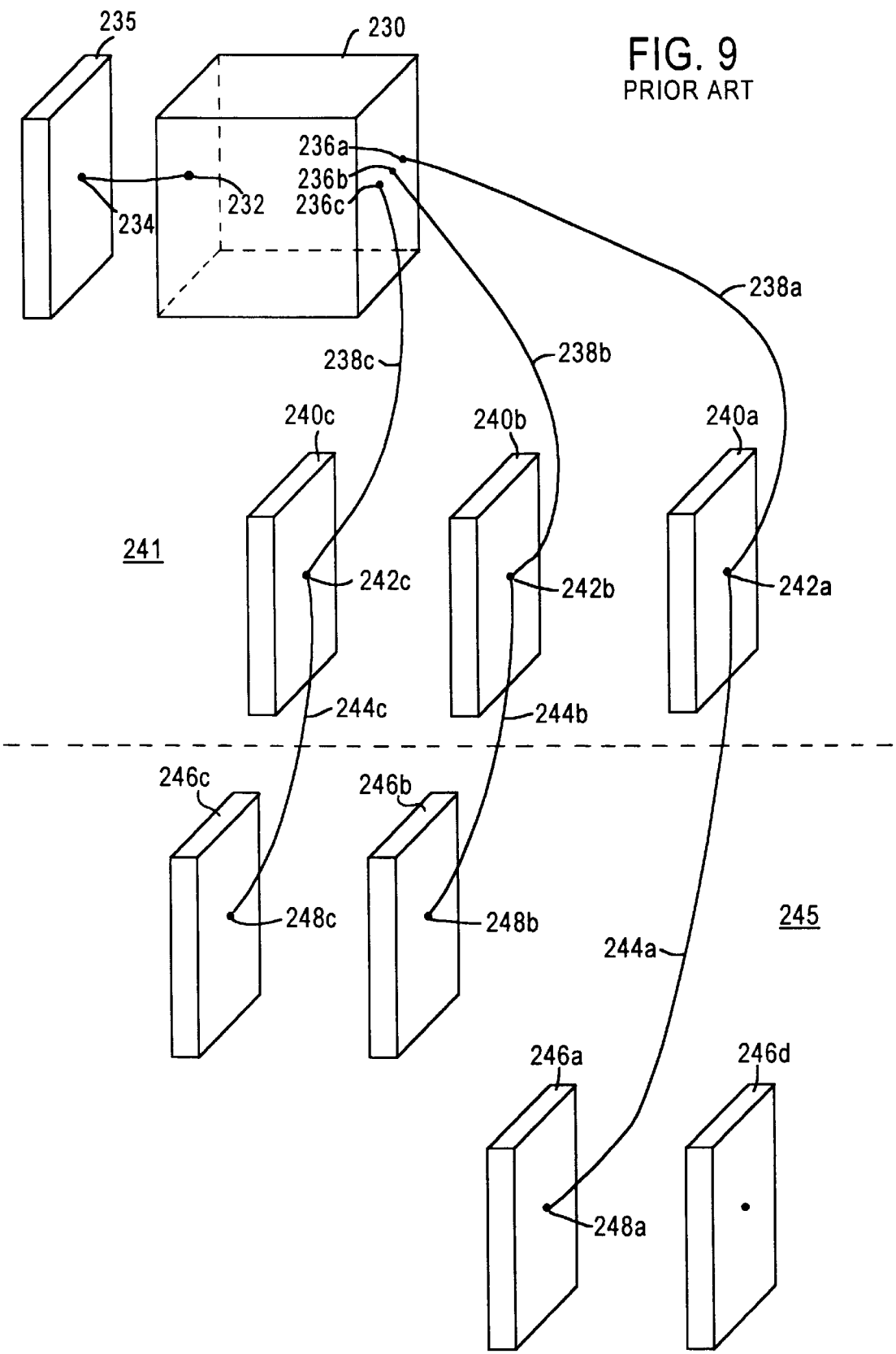
FIG. 9 is a detailed diagram of office equipment facilities for a first combination of customer locations.
Figure 10:
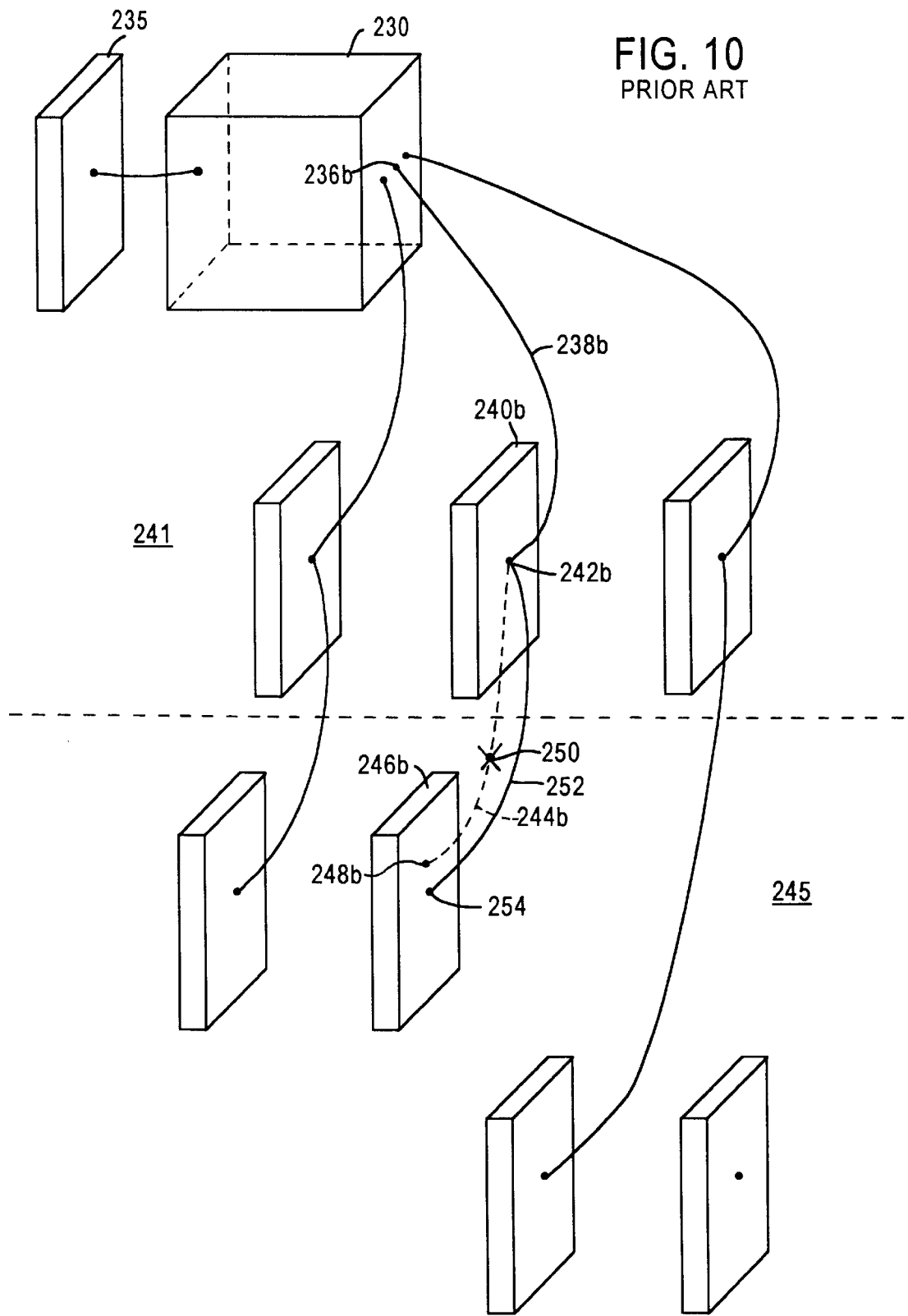
FIG. 10 is a detailed diagram of office equipment facilities for a second combination of customer locations which has altered the first combination of customer locations.
Figure 11:
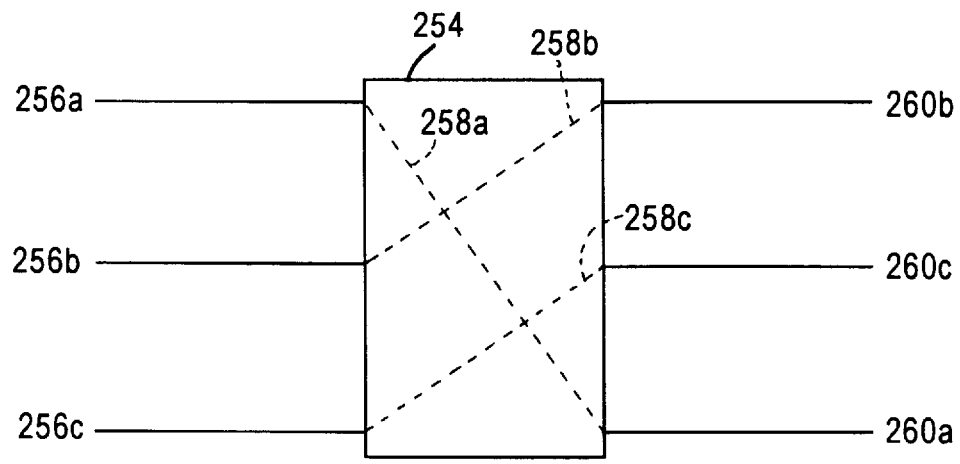
FIG. 11 is a detailed diagram of office equipment facilities for a first combination of customer locations illustrating inefficient use of jumper cables.
Figure 12:
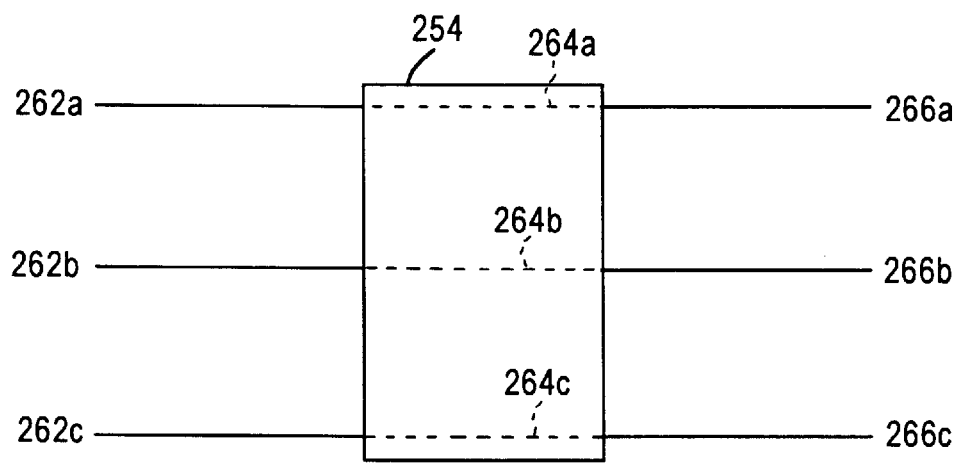
FIG. 12 is a detailed diagram of office equipment facilities for a first combination of customer locations illustrating efficient use of jumper cables by altering existing central office facilities.

At 154 the customer's credit history is checked using internal and external data sources. Through this step at 154 the process has been the same as that described in the current system illustrated in FIGS. 2 and 5. At 156 the service representative takes the customer service address information provided and uses the adjunct processor referred to as "RTS" 136 in FIG. 13 to verify the address, determine the working status of the address and determine the serving wire center and other common address information such as community and tax codes. Based on the wire center serving the customer, the service representative is able to determine what services are available to the customer. At step 158, the Assignment Section Information is retrieved from RTS including the network address such as cable, pair, binding post, time slot identification, electronic address, domain address, user name, and the like. From this information, a determination can be made whether the address is RTS eligible, what services may be offered to the customer, and whether the requested service may be provided over the existing network.

Figure 3:
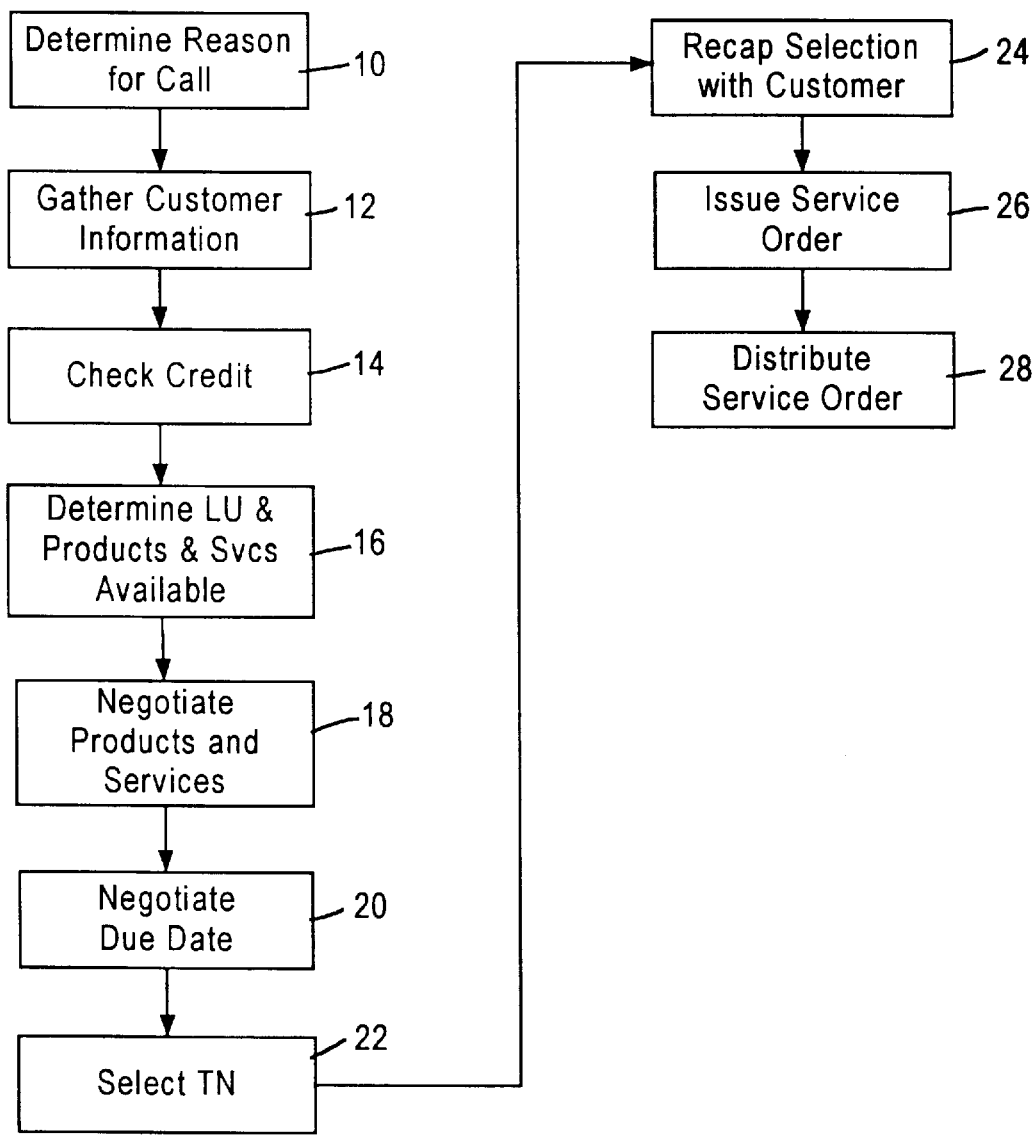
FIGS. 3, 4 and 5 are flow-charts illustrating current (prior art) service activation flow.
Figure 4:
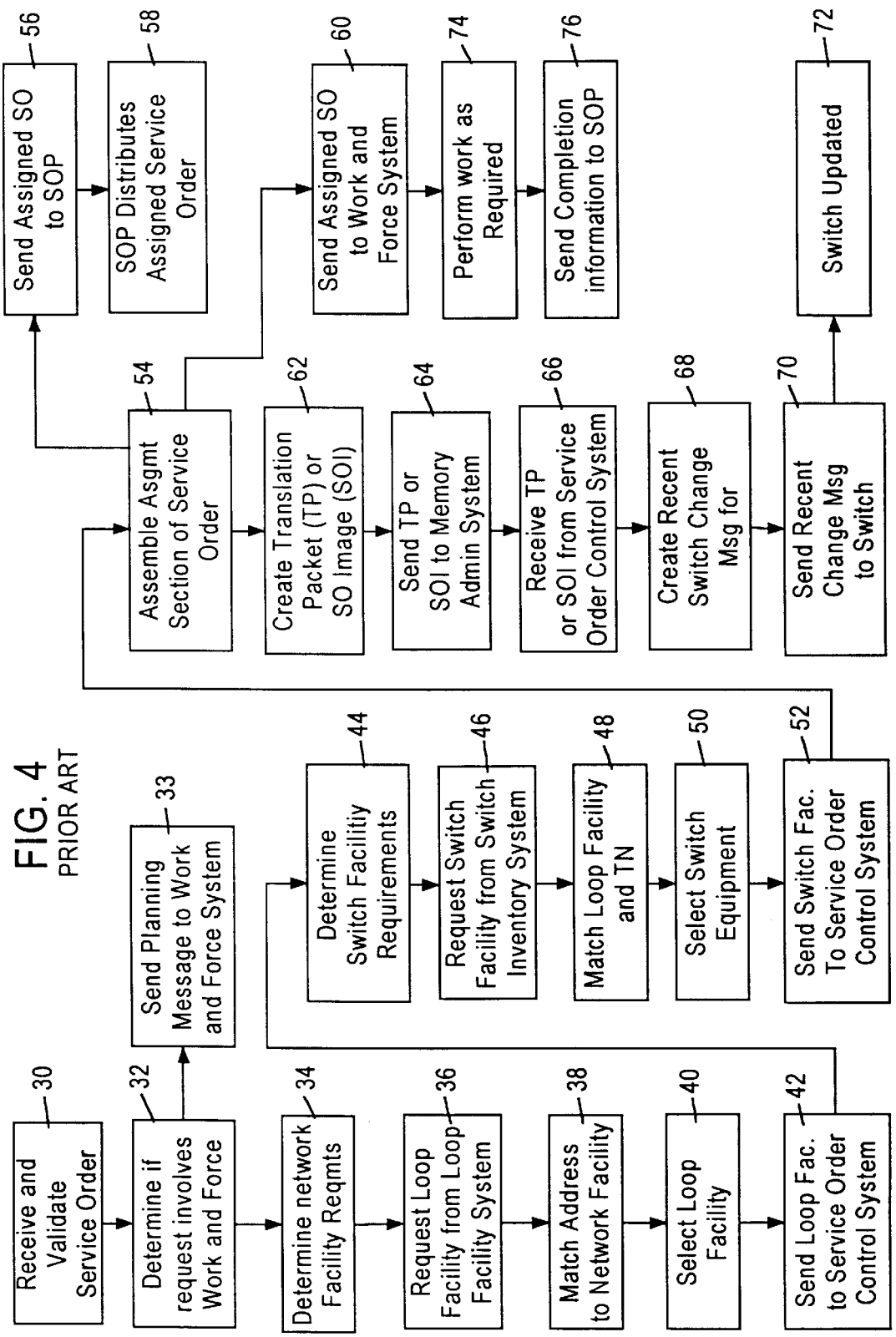

At 160 service is negotiated with the customer, matching the customer needs with the available services as at 18 in FIG. 3. At 162 the installation time is scheduled and due date for service negotiated as in step 20 in FIG. 3.

At 164 the selection of Telephone Number, or other identification data, is now made from RTS which contains all TNs/identification data and also assists in administration of those numbers. Administration of TNs includes the categories, status and availability of the TN. The TN, for example, is based on the wire center serving the area and the availability of the TN. RTS supports the selection of a preferred or special TN and/or identification data by the customer. At 166 the service representative recaps the service request to insure that the customer order accurately reflects the customer requirements as in step 24 in FIG. 3.

At 168 a determination is made to identify the service request as RTS eligible. This eligibility is based on the address (physical or logical) being served, the status of network facilities and the services requested. If the service request is RTS eligible, the request is sent to RTS 136 in FIG. 13 for processing. If the service request is not RTS eligible, the request may be processed in the current service activation process environment. This is indicated at 170 where a conventional service order is issued followed by the remainder of the current service order processing steps.

If the service request can be processed by RTS, it is received by RTS at 172 in FIG. 14. The service request is received by RTS and validated and checked for format accuracy and RTS eligibility at 174 in FIG. 15.

At 176 RTS places the service request in a log for further use and identification. This permits a check of the status of the request at any point during RTS processing.

At 178, RTS associates service request types as appropriate before processing them through the RTS environment. This includes but is not limited to: sequencing "in" and "out" service requests, associating corrected service requests with the original request or processing supplemental changes of a service request in process. At 180 a determination is made as to where the request needs to be processed and in what sequence. Processing includes the Memory Administration System (MAS) that must receive an activation message based on the requested products and services. A determination is also made as to whether or not a dispatch or test is required.

If a dispatch or a test is required, a message is created and sent to the Work and Force system at 182. This message includes all necessary information to complete the work request including assignment data. If other work in the field or in the central office is required this is completed and reported back to the appropriate center or system as indicated at 184.

At 180 RTS also determines if a Memory Administration System (MAS) is involved in the request and, if so, determines if it has the required information to prepare a translation packet to send to the MAS. The translation packet (TP) is then created and sent to the MAS. The TP is received and validated in the Memory Administration System and the MAS determines what needs to be done to complete the request. The MAS creates a machine readable message (RC message) specific to the switch to receive the message. The Recent Change (RC) message is created to match the vendor's specific switch type and generic at 186. If the RC message is accepted by the switch, the switch updates the information associated with the switch equipment and telephone number on the RC message at 188.

When the Work and Force system completes a job a completion confirmation is dispatched to the RTS from the Work and Force system and from the Memory Administration System and RTS then updates the inventory facilities, telephone numbers and LU addresses at 190 to reflect the completed service request. The Service Request Order Trail is updated when each task associated with a service request is completed. When all tasks associated with a service request have been completed in the RTS processing environment, completion information is formatted for transmission to the service order processor at 192.

After completion of the service request, the completion information is sent to the SOP at 194. This information may include the completion time and date, any changes to the service order and any billing information that needs added time and material charges. At 196 the SOP receives the completion information and prepares the completed service order for distribution and determines the distribution list. The completed service order is then distributed to all systems requiring the information.

As a result of the new system and method it is possible to reduce the time between request and activation of service (e.g., telephone, electronic mail, internet account, domain name, user name, and the like) from up to two days to a matter of minutes. In many instances it is possible to activate the service prior to ending the service request call. As a result of the new system and method it is possible to reduce the operating cost of provisioning business functions such as Install Inside and Install Outside, increase the reliability of providing on time, error-free service by reducing the number of orders that require manual assistance thereby increasing the flexibility of the provisioning process to support the activation of a new product or service quickly and inexpensively, enhance customer services and customer retention by providing faster access to all products and services, and provide a strong long-term information infra structure that meets the needs of the existing products and provides a foundation that can handle the requirements of new products.

In addition, the new system and method support SSNS negotiation by providing information that is currently provided by PREMIS using an address/telephone number database system. RTS provides telephone numbers for selection, address verification and suggestions, and RTS eligibility information. RTS stores and maintains all address information including common and living unit address information for both business and residential addresses. All telephone numbers are selected from RTS. However, the administration (classification and maintenance of status) of telephone numbers are split. RTS administers all residential telephone numbers and COSMOS continues to administer business telephone numbers.

RTS does not provision facilities but instead maintains the status of a fixed assembly from the central office to the living unit. As service requests are processed by RTS the facilities remain fixed and only the customer information and services are updated. RTS creates activation messages for other MARCH and other memory administration systems, such as VMAP (Voice Mail Adjunct Processor) and MSP (Multi-Services Platform) required to produce recent change messages which update switch memory.

Figure 16:
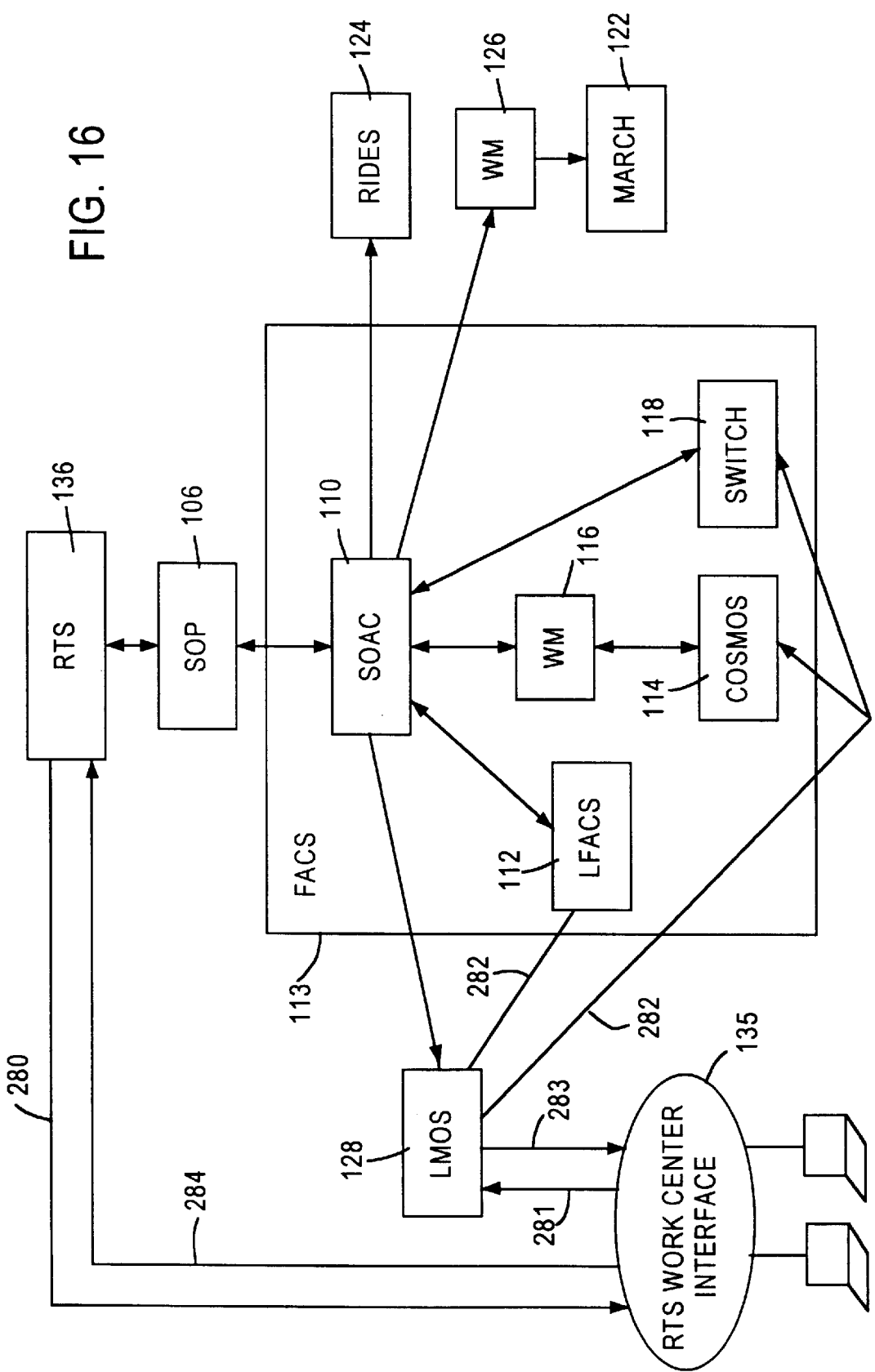
FIG. 16 is a block diagram illustrating the architecture of another embodiment of the invention for administration of a PSTN.

FIG. 16 is a block diagram illustrating the architecture of another embodiment of the invention for administration of network facilities for a PSTN or other network facilities, such as user identifiers including telephone numbers, serial numbers, electronic mail addresses, domain names, and the like. In FIG. 16, RTS assignment system is configured to detect standard processing failures resulting from manual entry errors, or other errors to the original facility assignment request.

These processing failures prevent RTS system 136 from readily assigning facilities (e.g., network facilities, user name, domain name, identification information, and the like) to the service request, and readily determining whether the RTS system 136 can provide such assignments or whether the assignment request must be passed on to the standard reassignment system via service order processor (SOP) 106. Since the basic operation of the RTS system 136 and the combination of the SOP system 106 and FACS system 113 is essentially the same, only those functions and tasks which are different will be discussed herein.

When RTS system 136 determines that a service request contains specific errors which require manual or other assistance, RTS system 136 will route the service request to RTS work center interface system 135 as illustrated by reference numeral 280. The RTS work center interface system 135 will interact with work center personnel in order to activate a request to the LMOS system 128 as identified by reference numeral 281. The LMOS system may, for example, be requested to verify the consistency of the facility data which is stored in the facility databases in the FACS system 113.

In particular, LMOS 128 will automatically access the LFACS 112, COSMOS 114 and/or SWITCH 118 data bases to retrieve the appropriate facility data for comparison as shown by reference numeral 282. This data may then be compared internally in LMOS 128, and the response then transmitted to the RTS work center personnel via RTS work center interface system 135 as shown by reference numeral 283. If inconsistencies still exist, work center personnel can further modify the facility data for acceptability by LMOS 128 for another attempt to verify facility assignments (e.g., domain name, identification data, user name, and the like), or can respond to the RTS system 136 with the correct information.

RTS work center interface 135 will transmit a response to the RTS system 136 indicating whether the RTS system can identify the service request for assignment via the RTS system 136 or assignment via FACS system 113 as shown by reference numeral 284. Accordingly, in this manner, service orders may be efficiently and effectively corrected in order to maximize the amount of service requests that may be provisioned by, preferably the RTS system 136, and if not, the FACS system 113.

Figure 17:
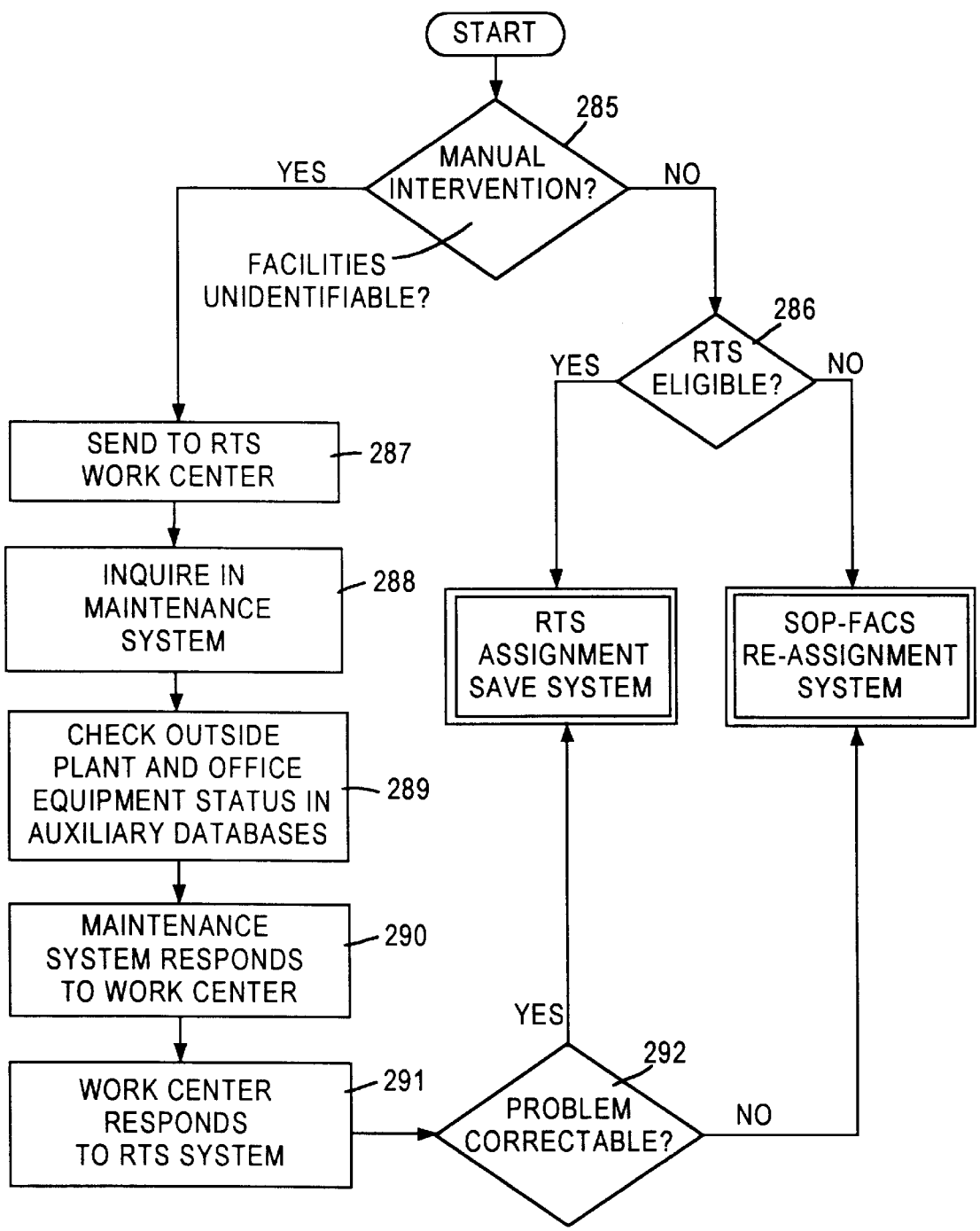
FIG. 17 is a flow-chart illustrating the methodology of the system of the invention in performing service activation in accordance with the architecture of FIG. 16.

FIG. 17 is a flow chart illustrating the methodology of the system of the invention in performing service activation in accordance with the architecture of FIG. 16. As illustrated in FIG. 17, a service request (e.g., telephone number, network communication, user name, domain name, electronic address, and the like) is received by the RTS system, and the RTS system will determine whether manual intervention is necessary in step 285. Such manual intervention may be, for example, that the facilities being requested are unidentifiable in the RTS system database. If no manual intervention is necessary, the RTS system will then determine whether the service request is eligible for RTS assignment in step 286. If the service request is eligible for RTS provisioning, then the RTS system will assign the facilities to the service request as described above. If the service request is not RTS eligible, the standard SOP-FACS reassignment system will assign the facilities to the service request.

If manual intervention is determined to be necessary in step 285, the RTS system will send the manual intervention request to the RTS work center via the work center interface system in step 287. Work center personnel will then inquire into the LMOS system in step 288 for further clarification regarding the service request. The LMOS system will then check one or more of the outside plant and office equipment facilities in the auxiliary databases in step 289.

Responsive to the status check in step 289, the LMOS system will respond to the work center personnel indicating the status of such facilities in step 290. Work center personnel will then evaluate the response received from the LMOS system and determine whether the service request can be assigned via the RTS system and respond to the RTS system in step 291. If the problem is correctable as determined by the work center personnel or the RTS system in step 292, the RTS system will then assign the facilities for the service request. If the problem is not correctable and cannot be assigned by the RTS system, the service request will then be transmitted to the SOP-FACS reassignment for the assignment of facilities therein.

Figure 18:
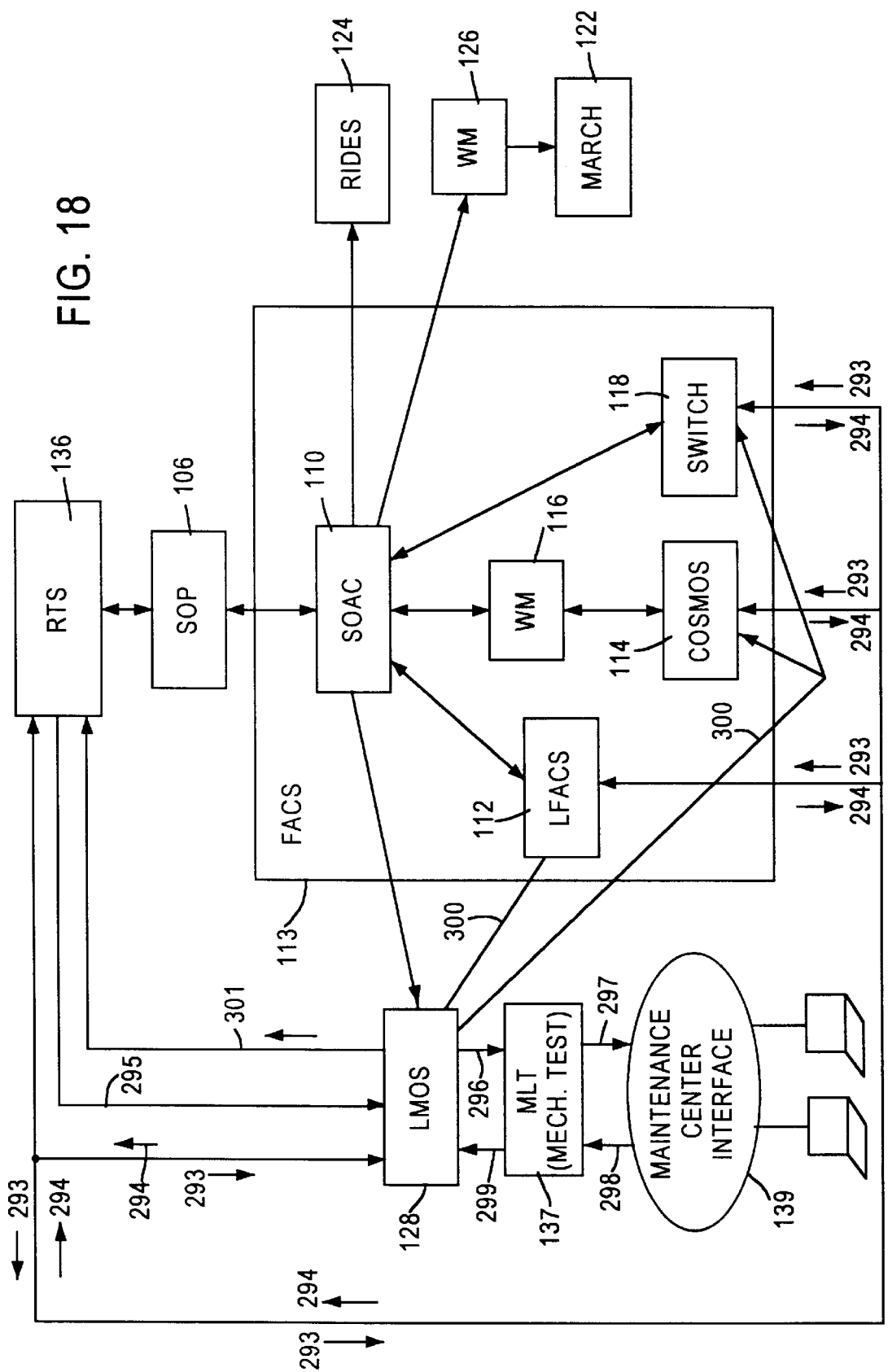
FIG. 18 is a block diagram illustrating the architecture of another embodiment of the invention for administration of a PSTN.

FIG. 18 is a block diagram illustrating the architecture of another embodiment of the invention for administration of a PSTN. In FIG. 18, RTS system 136 includes the capability of determining the consistency of the data being stored in the various data bases relating to facility assignment or service request subject matter, including, for example. In accordance with this embodiment, RTS system 136 will query one or more of the data bases stored in LMOS 128, LFACS 112, COSMOS 114, and/or SWITCH 118 as shown by reference numeral 293, as well as an auxiliary data base used to store, for example, domain name data, identification data, user name data, and the like.

One or more of the systems then responds to the RTS system 136 with the requested data as shown by reference numeral 294. RTS system 136 will then verify and/or evaluate the received data to determine whether the service request can be automatically corrected for assignment by the RTS system 136. If the data received from the RTS system 136 does not conclusively solve the problem, the RTS system 136 will then request LMOS 128 to further evaluate the problem shown by reference numeral 295. LMOS 128 will then request a mechanized loop test via MLT system 137 as shown by reference numeral 296. This mechanized loop test may or may not require the interaction of the maintenance personnel via the maintenance interface system 139 which is shown by reference numerals 297 and 298.

The mechanized loop system 137 will then test the facilities which are to be assigned to verify whether the assigned facilities have encountered failures (i.e., physical and/or logical failures) preventing the customer from establishing telephone service. The MLT system 137 will then perform the actual testing of the facilities with the assistance, in some situations of LMOS 128 as illustrated by reference numerals 299 and 300. The results of the facilities test are then transmitted from LMOS 128 to the RTS system 136 shown by reference numeral 301. In this manner, the RTS system can verify the facility data stored in its own data base as well as insure database consistency among the various other databases in this distributed database system.

Figure 19:
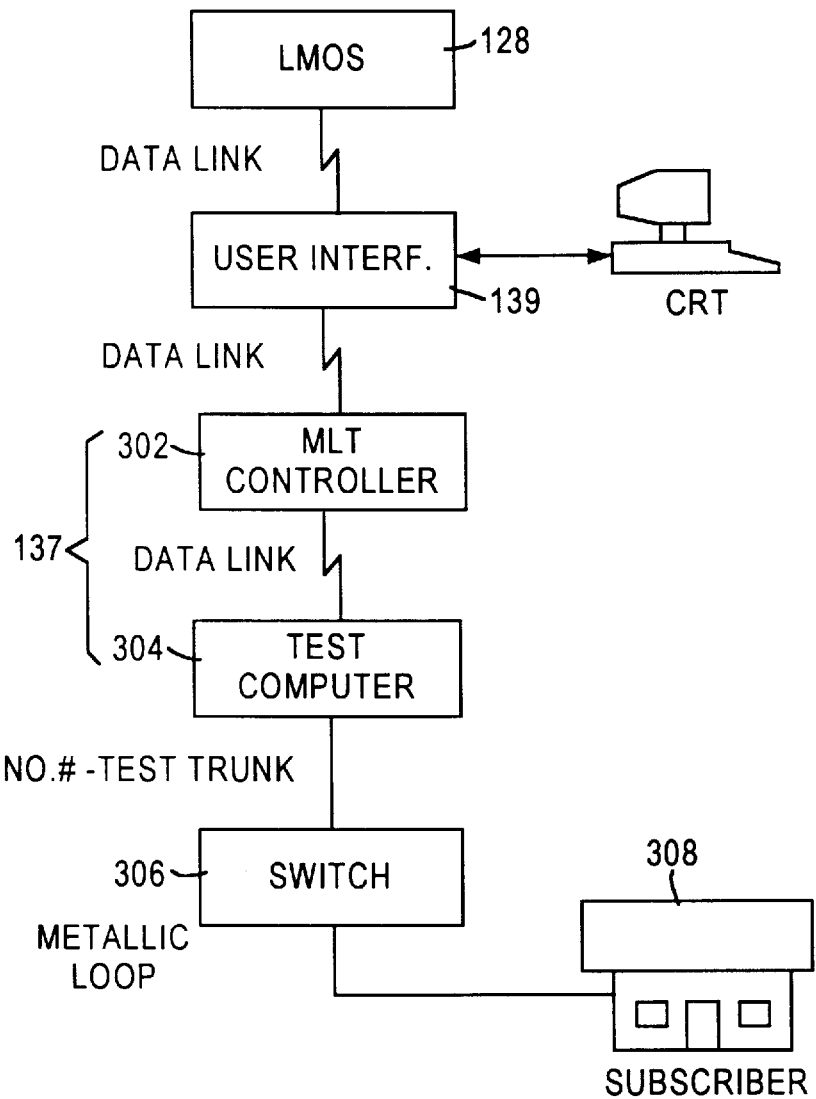
FIG. 19 is a block diagram illustrating the architecture of a standard mechanized loop test (MLT) system.

FIG. 19 is a block diagram illustrating the architecture of a standard mechanized loop test system. FIG. 19 illustrates the data link between LMOS 128 and MLT system 137 via user interface 139. The user interface 139 is connected to the MLT controller 302 which is a software implemented system which performs test sequences, loop access, loop tests, communications and diagnostics for the physical and logical network facilities. The MLT controller then transmits the various sequences and tests to test computer 304 which accesses the particular hardware to be tested and performs access, monitoring, loop test and diagnostics with the standard telephone central office switch 306 which is connected to subscriber 308.

The following brief discussion is provided regarding the specifics of the mechanized loop tests (MLT). MLT uses AC resistance to see if there is a telephone or other termination on the line. It makes three AC resistance measurements: T-R, T-G, and R-G. These measurements are called the "signature" of a telephone termination. A telephone causes a low AC resistance value. So, if the telephone is connected between the tip and ring, as on a POTS line, the T-R AC resistance value should be low. Since there is usually no phone on the tip side or ring side of the line, the AC resistance T-G and R-G should be higher. If either of the T-G or R-G values is low and the T-R value is high, the telephone may be connected improperly. If none of the values is low, then there is probably an open fault. Different types of terminations (2-party lines, PBXs) have different signatures. Both AC and DC resistance values are used to identify these different signatures. MLT includes a list of DC and AC values that correspond to certain line conditions. This list specifies what a short looks like in terms of DC resistance and what a Key Set looks like in terms of AC resistance. MLT compares the measurements it gets to the ones on this list. For example, MLT expects a standard POTS line to have a certain AC resistance. After it runs the AC Signature Test on a line, it checks to see if the results match the standard values. If they do, MLT decides that there are no AC problems and moves on to the next test in the sequence. If they do not match, MLT decides that there is a problem and does a special test for an open circuit. MLT makes decisions by comparing the test result values to the list of AC and DC values it retains.

The MLT standalone testing load is divided into two categories: rapid tests and interactive tests. Rapid tests are characterized by short trunk holding times (averaging about 20 seconds) with the release of test trunks and test equipment under the control of the MLT Control Software. Typical rapid tests include initial test series, pre-dispatch tests, pre-installation tests and tests to verify cable transfers.

Interactive tests are characterized by longer test trunk holding times (2–5 minutes) under the control of the user, and typically require both a test and talk connection to the subscriber's line. Typical tests include interactive talk and test with a repair technician (e.g., identifying a faulty pair in the field) or with a customer (e.g., TOUCH-TONE frequency test).

All rapid and interactive tests, with the exception of the double-sided fault sectionalization test, require one test trunk. The double-sided fault sectionalization test requires a test trunk connection to the faulted pair and a simultaneous separate test trunk connection to a good reference pair.

Individual MLT tests are described below. The first set below is run when you request a full series of tests on a line. They are initiated by the FULL request from an MLT test mask. The other MLT requests run a subset of these tests.

An access test is the test that MLT runs when it first connects a test trunk to the subscriber's line. First it checks for hazardous potential, which is defined as extremely high voltage on the line. That much voltage is dangerous, so MLT quickly drops access to the line, putting a halt to any further testing. If there's no hazardous potential, MLT connects a busy detector to the line. The busy detector, as you might expect, checks to see if there is speech on the line. If there is, MLT drops access immediately so that the customer is not disturbed. Otherwise, MLT remains connected to the line over the test trunk and moves on to the next test in the sequence.

A foreign electromotive force (FEMF) test perform a second check for excess AC or DC voltage. If there is a lot of excess voltage, MLT drops access to the line during the Access Tests discussed above. The FEMF tests look for high (but not necessarily hazardous) voltage. Because high voltage would adversely affect the results of later MLT tests, MLT stops testing if the FEMF tests reveal voltage exceeding a certain level. It does not drop access to the line in this case, however, permitting the ability to monitor or talk on the line.

A line in use test expects that the line to be tested is NOT being used at the time of the test. It expects that the telephone is on-hook. To make sure of this, it does a few checks to make sure that this is the case.

The first question MLT determines is whether the receiver is off-hook. Each type of central office switch indicates an off-hook condition in a different way. Each has its own off-hook "signature." MLT figures out which type of switch is connected to the subscriber's line and then looks for this signature. If it finds what looks like an off-hook condition, it checks for conversation. Otherwise, MLT moves to the next test in the sequence—the intercept test. MLT then determines whether the receiver is off-hook because the subscriber is talking on the line. Conversation for all switch types is usually indicated by a T-R short, grounds on both sides of the line and battery on the ring side. If it looks like conversation, MLT stops testing immediately to avoid disturbing the customer. Basically, MLT is double-checking to make sure that the busy detector in the Access Tests didn't make a mistake. If there is no conversation, MLT tries to figure out whether the receiver is really off-hook or if there is a fault that makes it look like that's the case. It does that by running a receiver-off-hook (ROH) test.

MLT next determines whether the receiver is really off-hook. The ROH test distinguishes between a T-R short and an actual off-hook condition. It does this by placing current on the line and waiting for a signal that the current passed through the telephone. If there is a short fault, this signal will never come and MLT decides there is a T-R short. If the signal comes, MLT decides that the receiver is indeed off-hook.

The intercept test identifies lines that are out-of-service. Out-of-service lines are often called "lines on intercept". Such lines also have characteristic signatures. In ESS offices, for example, an intercept tone is placed on the line. So, MLT compares what it sees in the intercept test to the standard intercept signature and makes a decision. If it sees an intercept, it stops testing. If not, it moves on to the next test in the sequence.

The next step is the direct current (DC) test. By now, MLT is satisfied that the line is not in use or on intercept. So, it starts the DC and AC tests. An important thing to remember is that MLT removes the line circuit from the line at this point. The customer is out-of-service—THE LINE IS DEAD. The DC tests measure DC resistance and voltage.

Resistance values are used to identify shorts and/or grounds. A short fault means that current is taking an alternate route between the tip and ring. A ground fault means that current is escaping from the loop on either the tip or the ring side. MLT next moves on to the next test in the sequence if it identifies a short or ground fault, unless the fault is a major one. MLT stops testing if it discovers a major fault.

DC voltage values are used to identify a cross to a working pair, among other things. On a good POTS line, there should be no voltage T-G and R-G. That's because MLT removed the line circuit, which is where DC voltage comes from on a telephone line. A cross to a working pair means that the line is touching another telephone line and drawing battery from that pair—so there should be voltage on whichever side is crossed with the working pair.

DC resistances are also used to validate non-POTS telephone signatures. Usually, AC resistances are used to identify telephones on the line, but some terminations (for example, a 756 PBX system) are recognized by their DC resistances. MLT compares the DC values it measures to those it expects for that particular telephone. If MLT measured these values and the line record indicated the presence of a 756 PBX, then MLT would report a valid PBX signature. And, because it validated a PBX, it would skip the AC Signature, Longitudinal Balance, Thermistor, and Opens tests since the presence of a PBX on the line leads to inaccurate results from these tests.

An alternating current (AC) signature test then is performed which uses AC resistance measurements to identify POTS and other termination equipment. Other terminations (2 party, Key Systems) will have different AC signatures. On a two-party line, one ringer is connected tip-to-ground and the other is connected ring-to-ground. If MLT sees high AC resistance values (doesn't see a valid signature), it suspects that there is an open fault and it initiates an opens test.

Next, a longitudinal balance test is performed that measures how likely it is that the line is noisy. The results are expressed in decibels (dB). A thermistor test is also performed which checks for the presence of a thermistor on the line. A thermistor is a part in some PBX and Key System telephones. It causes the telephone line's resistance to decrease as its temperature increases. By applying voltage to the line, MLT heats the thermistor and measures changes in resistance. The resistances are compared to expected values for the termination (for example, PBX) listed in the line record. For example, a tip-to-ring thermistor would be expected if the line record lists 701 PBX as the termination.

The thermistor test is performed if the line record indicates that there should be a thermistor on the line, or if the AC resistance on the part of the loop that is supposed to have a ringer (T-G, for example) is between a predetermined range. This leads MLT to suspect that a thermistor is part of that ringer.

The opens test is also performed which uses AC capacitance measurements to analyze the location and type of open on a line. If MLT decides that a line is open, it then determines whether the open is in or out of the central office. AC capacitance is a measure of how long a wire is. So, if the length of either the tip or ring wire (for example, the distance from the CO to the open) is short, MLT decides that the open is in the central office and reports OPEN IN; if those lengths are long, MLT decides that it is outside of the central office. In the latter case, it also reports the distance (in feet) from the central office to the open. The opens test is performed whenever an open is suspected based on results from the DC tests, AC signature test, or thermistor test.

A capacitive balance measurement test is performed that also uses AC capacitance to compute a percentage called capacitive balance. Basically, it compares the capacitance of the tip wire to the capacitance of the ring wire. Because capacitance is used to measure the length of a wire, the balance measurement is the same as comparing the lengths of the tip and ring wires. Capacitive balance is important when there is an open fault. If the lengths from the central office to the open on both sides of the loop are equal, the balance will be about 100% and MLT will report a balanced open. This means that both sides of the loop are open at the same place. If the lengths are not equal, and the balance is less than 95% (for example, 150 feet/167 feet=0.90=90%), MLT will not report a balanced open. This means that the open is probably only on one side—the shorter one. MLT determines which side is shorter and reports either OPEN TIP or OPEN RING.

A line circuit test checks for the proper arrangement of the battery and ground in the central office line circuit. The line circuit is the equipment that 1) detects that the phone has been taken off-hook, 2) connects the loop to the switching equipment and battery, 3) accepts dialed digits, and 4)

provides dial tone. All of the tests described so far are conducted without the line circuit present since MLT removes the line circuit at the start of the DC Tests. Now, MLT has to re-connect the line circuit to the subscriber's line.

A draw and break dial tone test attempts to draw and break dial tone. MLT electrically simulates a telephone going off-hook and checks for the presence or absence of dial tone. Then, it removes the simulated off-hook condition and checks to see if the dial tone breaks or stops.

A soak test may also be performed that measures DC resistance over time to determine if a ground is "swinging" and if it may be "dried out." Voltage is applied to the line and a series of six resistance measurements are made over a short period of time. The highest resistance value of these six is compared to resistance value seen in the initial DC test to determine whether the fault is "swinging."

A ringer test may also be used to determine the location of standard ringers on a particular line. It checks for the presence of ringers T-R, T-G, and R-G. It then determines whether the results are consistent with what was expected from the line record information. If the line record says that it is a two-party line with only one party assigned, MLT expects to see one or more ringers on either the tip or ring side (remember that 2 party ringers are hooked up T-G and R-G, not T-R like POTS lines). So, it looks for low AC resistance on either the tip or ring side.

A length of loop measurement may also be performed uses AC capacitance to measure the length of a good pair. It functions similarly to the opens test and reports the distance from the central office to the telephone. This test is run only on single party POTS and coin lines that have already been deemed TEST OK.

MLT also performs specialized, sometimes requiring interaction with a subscriber or repair technician. For example, a dial test checks the subscriber's rotary dial. It requires the assistance of someone at the telephone in question. When that person dials a "0," MLT measures the dial speed and percent break of the rotary dial. This test is run when a problem with the dial is suspected (for example, the subscriber can't call out).

A touch-tone test checks the condition of the subscriber's touch-tone pad by analyzing the tones that are produced when the subscriber presses a certain sequence of buttons on the pad. This test is run whenever a problem is suspected with the touch-tone pad (for example, the subscriber gets a lot of wrong numbers).

A resistive fault sectionalization test may be performed which measures the distance between a fault on a line and the repair technician's location along that line. To do this, the repair technician has to tell MLT where he or she is located. This is done by putting an intentional short on the telephone line. Then, MLT measures the distance from the fault to the repair technician's short. This distance helps the repair technician find the exact location of the fault.

Coin tests may be used that check for potential problems in a coin telephone set. Basically, it checks the two primary mechanisms in the coin set—the totalizer and the coin relay. The totalizer counts the coins that a customer puts in. It must be in a certain starting position when the coins are dropped in. When it is in this position, the totalizer is "homed." Each coin deposited causes the totalizer to send tones to the central office. When the central office hears enough tones, the customer is allowed to make a call. When a coin test is run, MLT first looks for a T-R short. If it finds one, it suspects that the totalizer is not homed. So, it (a) tries to home the totalizer, (b) listens for tones put out when the totalizer is homed, and (c) measures how much current it took to home the totalizer. If MLT doesn't find a T-R short, it checks the coin relay. The coin relay is the mechanism that returns or collects the coins deposited by the customer. It sends the coin to either the coin box or the return slot. If MLT sees a T-G fault, it suspects a problem with the relay. So, it (a) tries to operate the relay, (b) measures the relay's timing, and (c) measures how much current was needed to operate the relay.

On the other hand, MLT is also advantageously designed to implement testing of logical data such as electronic mail, user name, domain name, identification data, and the like. MLT performs automated testing of this network identification data and other identification data to determine or assist in the determination of working status of customer network facilities.

Figure 20:
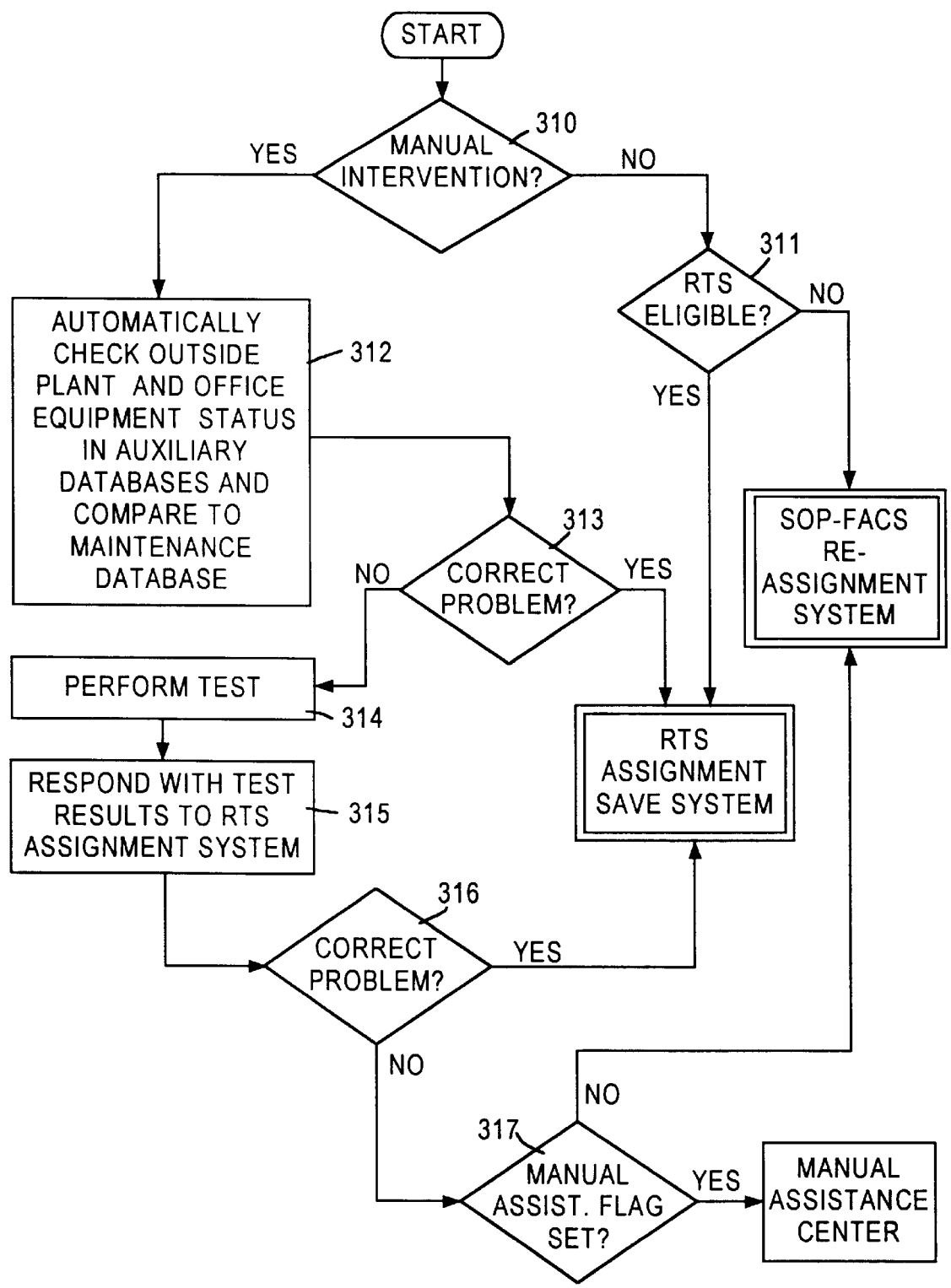
FIG. 20 is a flow-chart illustrating the methodology of the system of the invention in performing service activation in accordance with the architecture of FIG. 18.

FIG. 20 is a flow-chart illustrating the methodology of the system of the invention in performing service activation in accordance with the architecture of FIG. 18. In FIG. 20, the RTS system determines whether a service request (e.g., new telephone service, new electronic mail, domain name, user name, identification information, and the like) requires manual intervention in step 310.

If no manual intervention is necessary, the RTS system will determine whether the service request is eligible for assignment for the RTS system in step 311. If it is determined that the service request can be assigned via the RTS system, the service request will then be assigned by the RTS system, and if not, the service request will be assigned by the SOP-FACS reassignment system.

If manual intervention is determined to be necessary in step 310, the RTS system will automatically check the various data stored in auxiliary databases of the assignment system to compare its own data for verification and consistency in step 312. If the problem is correctable via retrieving of this additional information as determined in step 313, the service request will then be assigned by the RTS system. If, however, the problem is unable to be corrected in step 313, a physical test will be performed on the existing facilities in step 314 in order to further verify whether the facilities are defective or have encountered some type of failure. The results will then be returned to the RTS system in step 315, and responsive thereto, the RTS system will determine if the problem associated with the service request was corrected in step 316. If the problem was corrected, then the RTS system will assign facilities for telephone service. If, however, the problem was not corrected as determined in step 316, the RTS system will either route the service request to the SOP-FACS reassignment system for another attempt at provisioning the service request, or route the service request to a manual assistance center, depending on whether a particular flag or indication has been set in the RTS system for the routing of such service request in step 317.

Figure 21:
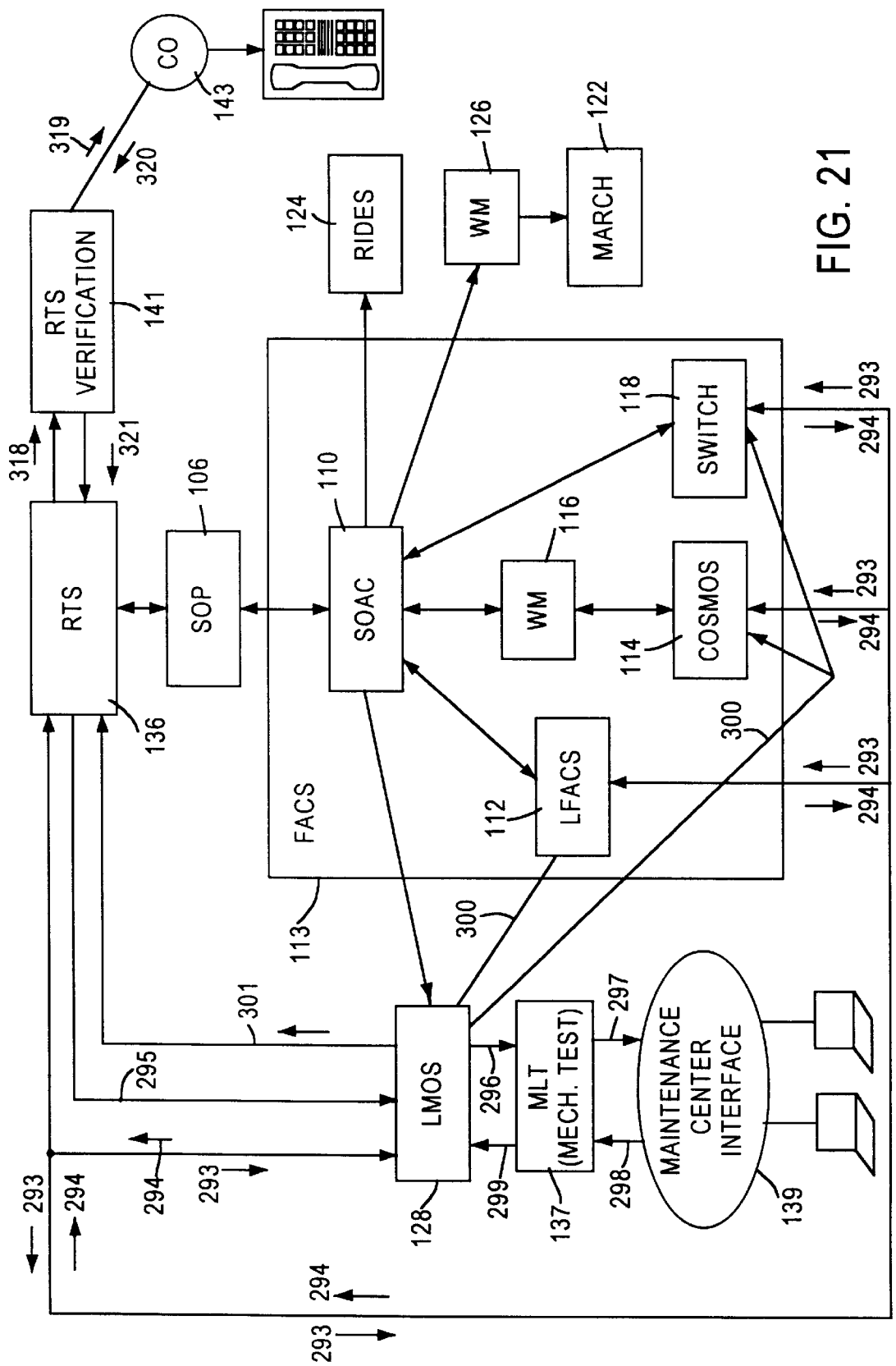
FIG. 21 is a block diagram illustrating the architecture of another embodiment of the invention for administration of a PSTN.

FIG. 21 is a block diagram illustrating the architecture of another embodiment of the invention for the administration of a PSTN. FIG. 21, is similar to the embodiment described in connection with FIG. 18, however, FIG. 21 includes some additional verification steps for verifying the assigned facilities (e.g., telephone related equipment, internet related equipment, electronic mail related equipment, software related to the above, and the like) have in fact been assigned.

As shown in FIG. 21, RTS system 136 will, after assigning the facilities, request verification by RTS verification system 141 as shown by reference numeral 318. RTS verification system 141 will then, for example, test the facilities of the central office 143 and outside plant as illustrated by reference numeral 319. In addition, RTS verification system 141 will also test other types of equipment, such as electronic address, domain name, user name, identification data, and the like. Test results are then collected by RTS verification system 141 as illustrated by reference numeral 320. RTS verification system 141 will then respond to the RTS system 136 to indicate whether the service request is in a working status as illustrated by numeral 321. The RTS verification system can be, for example, an automated service assurance system.

The automated service assurance system includes an Advanced Service Assurance Verification Platform (ASAVP) in conjunction with a Service Assurance Voice System (SAVS). THE ASAVP and SAVS are connected to multiple data networks (e.g., the Internet, and the like) in the existing Public Switched Telecommunications Network (PSTN) to efficiently effectuate correct installation, activation and customer satisfaction with the new service. The ASAVP system includes the functions of the existing Central Office Verification System (COVS), which may be, by way of example, a product marketed by CSC/Intellicom, formerly Intellicom of Englewood, Colo.

The Recent Change Memory Administration Center (RCMAC) takes service orders from the business office via the RTS system as customers call in and populates those service orders with the services requested by the customers and sends this downstream over a service order network to the RCMAC where the RCMAC implements the recent change software for provisioning the services in the switch. Similar provisioning data is then fed to the multi-services platform switch, such as the switch and platform used to provide voice messaging services. The provisioning in the two switches may be in either of the two possible sequences depending upon the service involved as will be understood by those skilled in the art.

The COVS system and the improved ASAVP system receives from the business office via the data network, such as the Datakit Network, a copy of the service order and strips away the desired installation information from that order. On the designated installation date the installation data or information is inputted to the existing Public Switched Telephone Network (PSTN) data network here called the Datakit Network. The Datakit Network is a high speed data network used primarily to maintain switches. It permits gaining access to switches from remote locations for provisioning and maintenance. This information in the Datakit Network initiates dialing into the Central Office (CO) switch and to a multi-purpose platform switch to ascertain whether or not the ordered service has been installed. The ASAVP processor system performs multiple verifications at the CO switch as well as at the multi-services platform, using the existing Datakit Network.

By way of example, if an order is issued on Wednesday for installation on Friday it is loaded into recent memory administration system (RMAS) and it is held in RMAS until early in the morning on Friday, perhaps 2 a.m. At 2 a.m. the information is released and installed into the switch. The ASAVP processor gets the same order information, strips off the necessary data, and holds it in the database. If the installation is set for 2 a.m. the ASAVP processor will hold it for a pre-determined time before it tests for verification. Thus the ASAVP processor may wait for four hours to make certain that the new service is on line and then queries the switch over the Datakit Network to ensure that the installation was made. The ASAVP processor takes this information regarding the customer's telephone number and the service installed and sends it to the Service Assurance Voice System (SAVS) processor. The Service Assurance Voice System processor may be a CSC/Intellicom product or the like providing Integrated Voice Response (IVR) functions which are, per se, known and provided by processors sometimes called Voice Processing Units (VPUs). The SAVS platform calls the customer and waits for an utterance.

Upon detecting an utterance such as "Hello" it delivers a programmed message such as "The Call Waiting that you ordered from C&P Telephone Company has now been activated on your line." It may repeat this announcement 3 times. This constitutes a verification to the customer that their newly ordered service is installed, i.e., service provisioning verification.

The SAVS platform then continues the announcement in the following manner: "If you would like instructions on how to use Call Waiting, push 1. If you would like information on other Telco products and services, push 2. If you are thinking about having a small business at your home, push 3. If you would like to order something, push 4. If you would like to know more about Maryland's new Area Codes, push 5." The announcement could go on to deal with multiple additional subjects.

One of the key features of the new system is to allow the customer at any time to push a key and go to a predesignated office where the Telco maintains a large Service Solution Center (SSC) staffed by over 100 people trained to pleasantly explain how features operate. Such a Service Solution Center installed by one regional Telco can be made available to other regional operating companies offering the opportunity to permit those companies to access the pre-existing Telco Solutions Center for pre-designated functions. If the customer pushes key 4 to order something, he/she is connected to the Network Center which has been set up to activate features on lines. This center performs an internal selling function and can add features to the customer's line immediately while the customer is on the line.

The SAVS platform may also be utilized in similar cooperation with the ASAVP to provide service assurance verification. Thus, following a customer complaint and after the problem has been repaired a call back to the subscriber is automatically initiated to report that the trouble has been repaired. This may be followed by the same options as described in connection with the service provisioning call. Thus, the same architecture is used to effectuate the two different services. In the first instance the IVR functions of the SAVS processor interface with the SOAC system to confirm service provisioning. In the second instance the IVR functions of the same SAVS processor interface with a module of the LMOS system to confirm service repair or give service assurance. Additional details are described in commonly assigned and copending U.S. Ser. No. 08/035, 769, filed Mar. 23, 1993, incorporated herein by reference.

As described above, the IVR functions may be utilized to confirm service provisioning of identification related data, such as electronic mail, user name, serial number, domain name, and the like. The IVR functions are also used to confirm successful installation of the software associated with the identification related data, such as electronic mail, user name, serial number, domain name, and the like.

Figure 22:
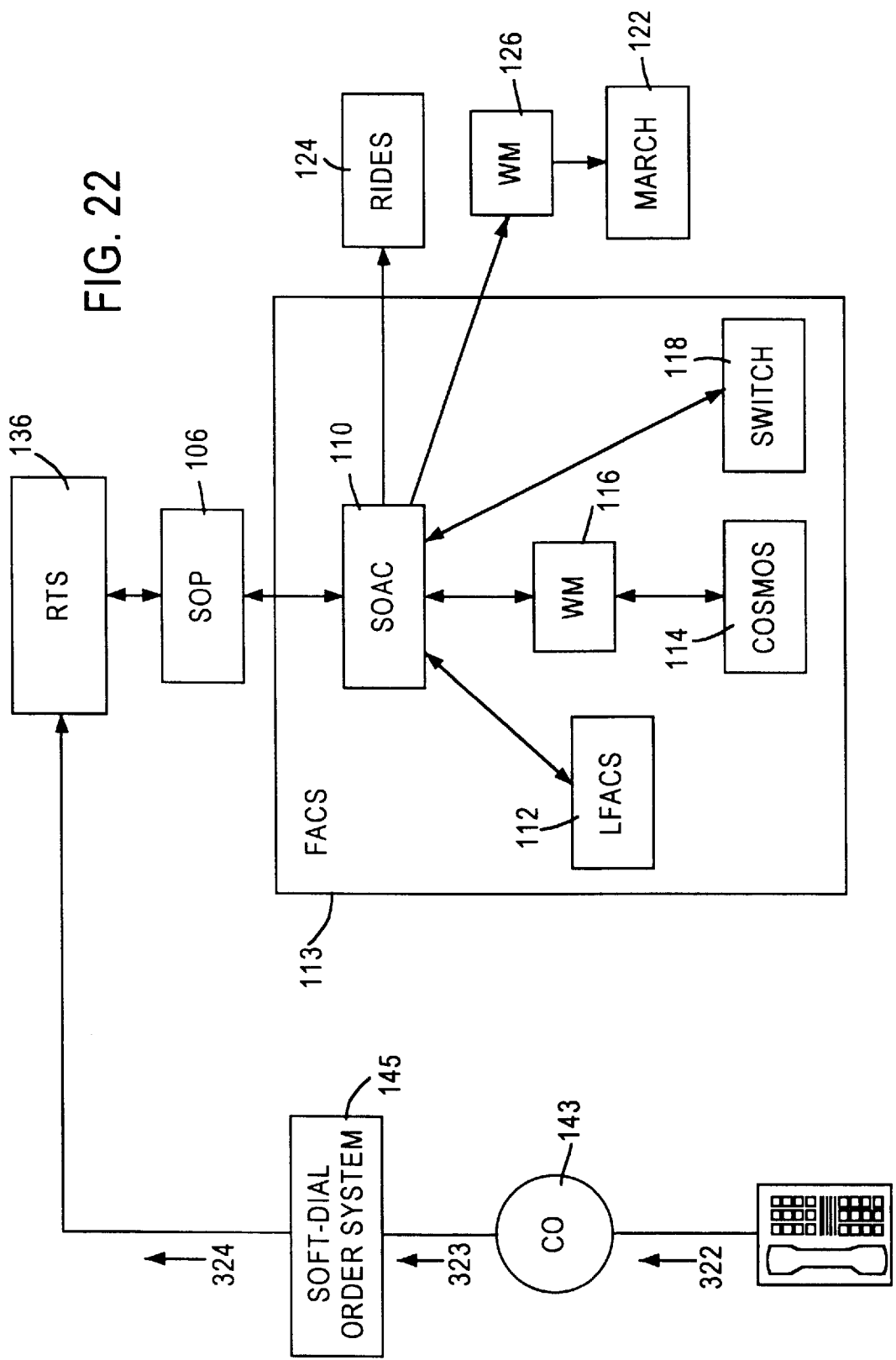
FIG. 22 is a block diagram illustrating the architecture of another embodiment of the invention for administration of a PSTN.

FIG. 22 is a block diagram illustrating the architecture of another embodiment of the invention for administration of a PSTN and/or other network with users. In FIG. 22, the RTS system 136 provides the capability of receiving service requests including identification related data, such as electronic mail, user name, serial number, domain name, and the like, from soft-dial order system 145 as indicated by reference numeral 324. Soft-dial order system 145 provides limited dial tone capability for the subscriber via central office 143 as shown by reference numerals 322 and 323. According to this arrangement, the customer picks up a phone which is provided with soft dial tone service (which may also be called "disconnected service" or "restricted service") and if the customer is utilizing a phone which has been "disconnected", the customer may only call the business office or 911. Since the "disconnected" phone has soft dial tone capabilities, the customer's line is connected to originating equipment on the switch. This originating equipment has an advanced intelligent network (AIN) originating trigger set on it.

Given the trigger, control of the call is passed, for example, to the AIN platform. The originating equipment number and the signaling point code (SPC) are sent to the AIN Service Control Point (SCP) in the transportation capabilities application part (TCAP) payload within an SS7 message. SS7 refers to a common channel signaling network as per specifications issued by the CCITT. The AIN SCP initiates a standard Send Data transaction to the call server. The Send Data transaction includes the identity of the office equipment number and the SPC. Given these items of data, the Operations System, a computer system supporting network operations, can uniquely identify a particular switch port and retrieve information about that port. The AIN waits for a response from the call server.

In response to the Send Data message from the SCP, the call server places the office equipment number and the SPC inside an OS contract. An OS contract is essentially a formatted request, based on a client server model, to the Operations System. The contract is sent to a Sales Service Negotiation System (SSNS, which is part of the Operations System) in order to retrieve information about the last customer who had that office equipment number. That information includes house address, serving central office, cable plant facilities and other relevant data.

The contract is sent over a supporting network to the SSNS where it is utilized to retrieve the address and other data and return them to the call server with the contract response required to populate an agent's work station with the information required for the transaction involved. The call server will store the response in memory until the time the automatic call distribution (ACD) system completes the call to an available Business Office Representative. The call server informs the SCP that the Send Data has been completed.

Once Send Data has been successfully completed, the AIN-SCP instructs the switch to transfer the call to the telephone number of an ACD queue. This queue serves agents within a business office and will likely reside on another switch. The ACD automatically monitors all calls waiting in the queue. As calls are connected to an agent, the ACD sends call completion information (such as the telephone number of the agent to which the call is connected) to the caller server. The call server determines the appropriate work station identifier for the agent based on a table containing the agents' telephone numbers and their corresponding work station identifiers.

The call server then places the work station address into the service negotiation screen which has been stored earlier. The modified terminal session transaction involving the service negotiation screen will then be placed back on the network and sent to the agent. The service negotiation system (SSNS) will receive the transaction and place the screen on the agent's work station.

Thus, the agent has at his disposal all relevant information available about the caller and the type of transaction desired. This will facilitate a reduction in the interaction time with the caller and in the time needed to service the caller's business. Additional details regarding the soft-dial order system 145 are described in commonly assigned copending application Ser. No. 08/264,166, incorporated herein by reference.

As described above, the soft-dial functions may be utilized to confirm service provisioning of identification related data, such as electronic mail, user name, serial number, domain name, and the like. The soft-dial functions are also used to confirm successful installation of the software associated with the identification related data, such as electronic mail, user name, serial number, domain name, and the like.

Figure 23:
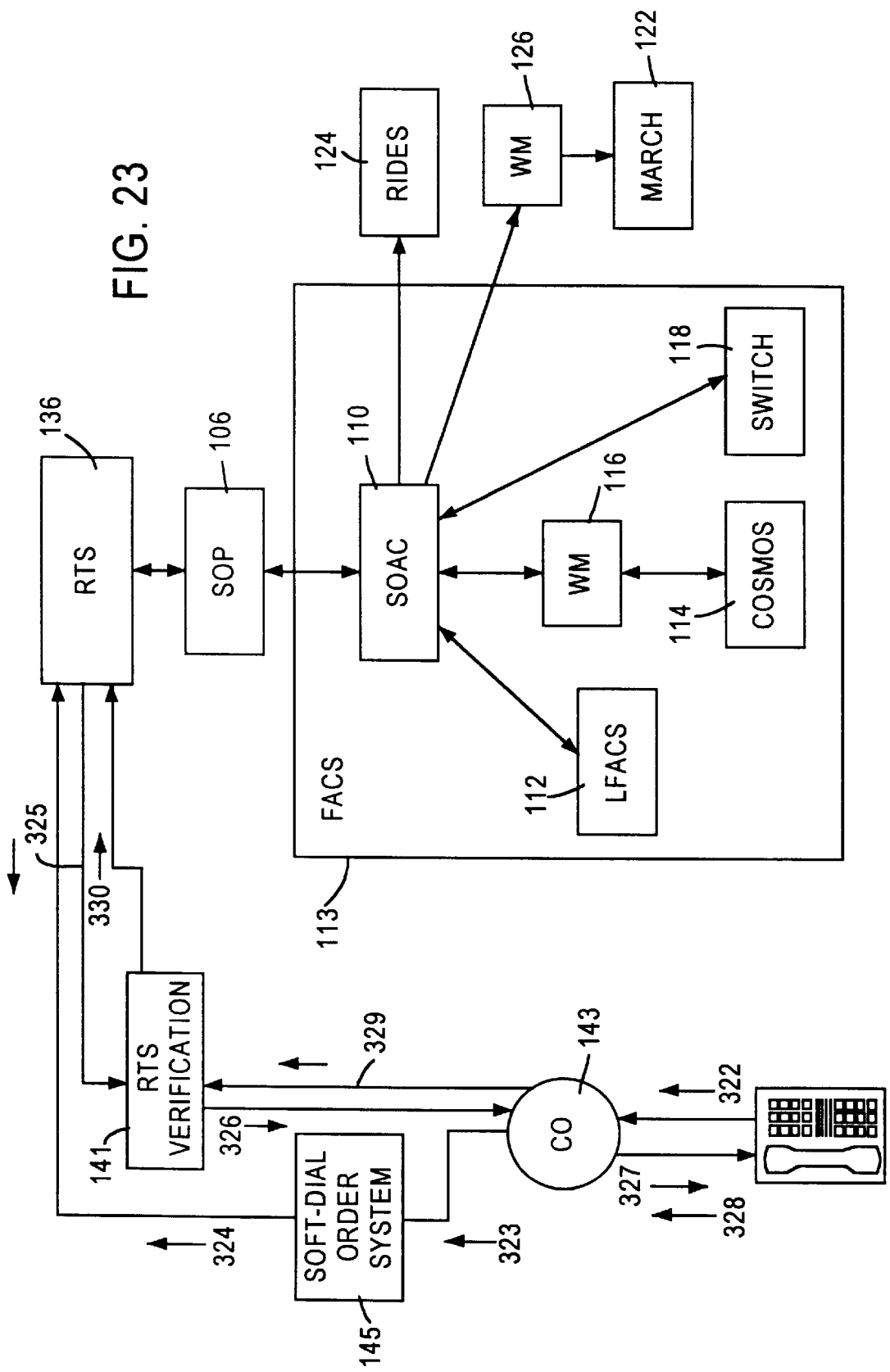
FIG. 23 is a block diagram illustrating the architecture of another embodiment of the invention for administration of a PSTN.

FIG. 23 is a block diagram illustrating the architecture of another embodiment of the invention for administration of a PSTN and/or other network with users. FIG. 23 is the combination of the verification system in FIG. 21 and the soft-dial system in FIG. 22. Accordingly, no additional discussion is considered necessary.

We have also realized that a major contributing factor to the growth of the WWW is the ability for users to obtain access thereto in increasingly different ways. For example, showing a nice mixture of optimism and concern, the telecommunications establishment is mulling how best to exploit the Web commercially while deploying such packet-switched networks as the integrated services digital network (ISDN) and such subscriber access technologies as asymmetric digital subscriber line (ADSL) to keep the telecom infrastructure from being overwhelmed.

With the growing WWW and other Internet traffic plus multimedia services such as video-on-demand on the horizon, revamping local-network access has become a top priority. The problem posed by Internet traffic is that its traffic dynamics (burstiness and long holding times) are radically different from voice telephone service (many calls of comparatively short duration). Local exchange carriers (LECs) are challenged to upgrade the infrastructure in their switching centers to handle all the new traffic. The need to upgrade has provoked a fierce public debate as to whether the upgrade costs are just a normal cost of doing business, or an extraordinary expenditure that justifies rate increases.

The special problem posed by the WWW is that it encourages lengthy surfing sessions, lasting hours and even days, in some cases. The result is that LECs find their interoffice trunks operating near capacity and ports on their expensive switches are being tied up for lengthy periods while producing no more revenue than a two-minute voice call. (Most local calls, in the United Sates at least, are not timed.) Thus, LECs are loath to invest in additional infrastructure that is unlikely to generate additional revenue. Moreover, although replacing copper with optical fiber may make sense in the long run, it is no solution for the immediate future: the Geneva-based International Telecommunication Union estimates that the world is now using more than 600 million copper telephone lines.

Several technologies offer quick ways to increase the capacity of copper loops. Among the most promising is the asymmetric digital subscriber line (ADSL), which greatly increases the capacity of existing subscriber loops—up to rates of about 6 Mb/s—without requiring the installation of new cable. Moreover, it accomplishes that feat without affecting the existing plain old telephone service (POTS).

Figure 24:
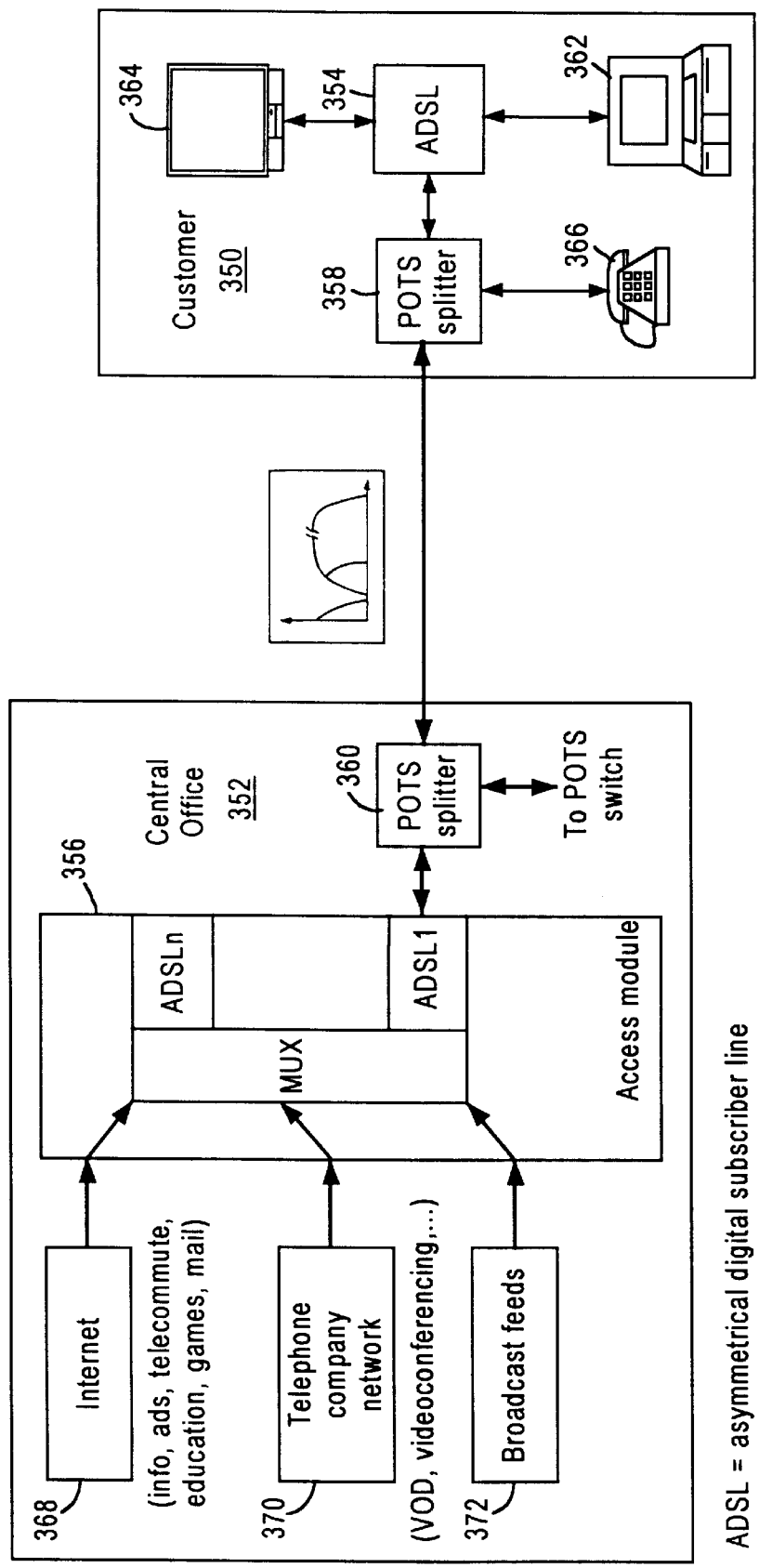
FIG. 24 is a block diagram of a standard ADSL arrangement.

FIG. 24 is a block diagram of a standard ADSL arrangement. To preserve POTS and to prevent a fault in the ADSL equipment 354, 356 from compromising analog voice traffic 366, the voice part of the spectrum (the lowest 4 kHz) is separated from the rest by a passive filter, called a POTS splitter 358, 360. The rest of the available bandwidth—from about 10 kHz to 1 MHz—carries data at rates up to 6 bits per second for every hertz of bandwidth from data equipment 362, 364. The ADSL equipment 356 then has access to a number of destinations including significantly the Internet 368, and other destinations 370, 372.

To exploit the higher frequencies, ADSL makes use of advanced modulation techniques, of which the best known is the discrete multitone (DMT) technology. DMT was pioneered by Stanford University, California, and Amati Communications Corp., San Jose, Calif., and endorsed by the American National Standards Institute (ANSI), New York City, and the European Telecommunications Standards Institute (ETSI), Sophia Antipolis, France.

DMT divides the bandwidth from about 10 kHz into a set of 265 independent subchannels, each 4 kHz wide. By measuring the quality of the subchannels and then assigning a bit-rate to each based on its quality, DMT customizes the transmit signal for every line. In doing so, it automatically avoids regions of the frequency spectrum that are too noisy or too attenuated to support reliable communications. If the quality of a subchannel degrades enough to affect a system's error performance, the data rate on that subchannel is lowered and the excess traffic moves to a subchannel capable of supporting it. The result is robust communications over single twisted pairs.

As its name implies, ADSL transmits data asymmetrically—at different rates upstream toward the central office 352 and downstream toward the subscriber 350. Such a technology makes sense for two practical reasons. For one, the typical WWW surfer is more interested in downloading large files than in uploading them, and therefore needs more capacity in the downstream (network-to-subscriber) direction.

The second reason is technical: when many wire pairs are squeezed together in a cable, cross talk is inevitable. Signals traveling downstream from the central office 352 are not much affected, because they are all of approximately the same amplitude. On the other hand, upstream traffic originates in subscriber premises 350, and these buildings may be at different distances from the points at which lines come together in a cable; accordingly, upstream signals can vary greatly in amplitude. If a wire pair carrying a strong signal shares a cable with another wire pair carrying a weak one, cross talk can be all too evident. But since cross talk increases with frequency, the problem can be made tractable by limiting the upstream data rate and keeping it near the low-frequency end of the spectrum.

Meanwhile, cable television providers are not sitting by idly. They want to provide Internet service to PC users over their TV cable systems by means of special cable modems. Such modems are capable of transmitting up to 30 Mb/s over hybrid fiber/coax systems (which use fiber to bring signals to a neighborhood and coax to distribute it to individual subscribers. Further, they are available, and they work.

Cable modems come in many forms. Most create a downstream data stream out of one of the 6-MHz TV channels that occupy spectrum above 50 MHz (and more likely 550 MHz) and carve an upstream channel out of the 5–50-MHz band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The downstream channel is continuous, but, like Ethernet, divided into packets, with addresses in each packet indicating for which subscriber each is intended. The upstream channel has a media access control that slots user packets or cells into a single channel.

To avoid collisions, in some cable systems, upstream packets are gated onto the network via control signals embedded in the downstream information. Other approaches divide the upstream path into frequency channels and allocate a channel to each user. Still others combine these two multiplexing methods. A few modem companies are proposing techniques like spectrum spreading or code-division multiplexing to reduce susceptibility to interference from antennas and other sources of electromagnetic radiation outside the system. Called ingress noise, it is the biggest difficulty on hybrid fiber/coax networks.

Variation in the capacity of cable systems depends less on cable length than on ingress noise and on the number of users seeking simultaneous access to a shared line. (Cable data rates are not particularly sensitive to the length of the coaxial cable; amplifiers in the cable network keep signal power high enough to make length a minor consideration.)

Because cable TV systems use a shared-bus architecture, they may be less expensive to implement than ADSL. But that shared architecture is a double-edged sword. As with any shared medium, as more users go on-line, the capacity available to any one user inevitably falls.

At present, the point is somewhat academic since the top speeds of both ADSL and cable systems will not be usable for years anyway. Internet server speeds, network delays, and personal computer limitations will hold usable rates at or below 2 Mb/s for the foreseeable future. So far, ADSL offers higher security and reliability. Cable modems may offer a less expensive network solution because of the cable plant's shared architecture, but that differential is more than offset by infrastructure costs required to upgrade existing coaxial cable networks to hybrid fiber/coax. The technologies for both ADSL and cable modems are at about the same state of maturity and integration.

ADSL's greatest advantage is that it can make use of existing twisted copper pairs, which are numerous indeed compared with the number of hybrid fiver/coax lines that exist in upgraded cable systems. Today the global ratio is on the order of 600 million to 6 million, or about 100:1. In the United Sates, it is about 20:1. Even with aggressive cable upgrades, the numbers are not likely to reach parity over the next five or six years. Additional details regarding the above communication trends can be found in "Communications," IEEE Spectrum, p.27, January 1997, incorporated herein by reference.

We have also realized that there is yet another communication network and network design emerging. That is, to relieve the problem of poor performance for the Internet, about 100 U.S. researcher universities have joined forces to develop an ultrafast Internet—Internet 2 (see htpp://www.internet2.edu, incorporated herein by reference). However, Internet 2 is not designed just to create a fast network. Instead, it will also let researchers design the types of applications that could be used on fast networks.

Many universities already have network connections that will let them participate in Internet 2. Meanwhile, the North Carolina Giganet is already operating with Internet 2 architecture. This ultrafast network serves Duke University, North Carolina State University, and the University of North Carolina, Chapel Hill.

Internet 2 is decentralized. The participating institutions will decide many issues for themselves, such as the way they will connect to Internet 2 as the way they will connect to Internet 2 and who at their institutions will have access to the system. Some of the applications that will be developed on internet 2 may be ready by October 1997, although the program's target date for having applications online is October 1998.

Developers expect that Internet 2 will operate at 2.5 Gbps. Most of the current Internet runs at 45 Mbps, although some privately operated segments run at 155 Mbps. Developers will build Internet 2 on existing equipment and networks as much as possible. The single most expensive element, the core fiber-optic backbone, already exists as vBNS, the very-high-speed Backbone Network Service.

vBNS currently serves the five U.S. supercomputer centers and several universities that have recently connected to it. vBNS uses ATM networking over Sonet (the high-speed, fiber-optic switched synchronous optical network). Sonet uses gallium arsenide microelectronics to achieve high-speed, heavily loaded switching. vBNS originally was capable of 155 Mbps but since February has been capable of 2.5 Gbps.

Figure 25:
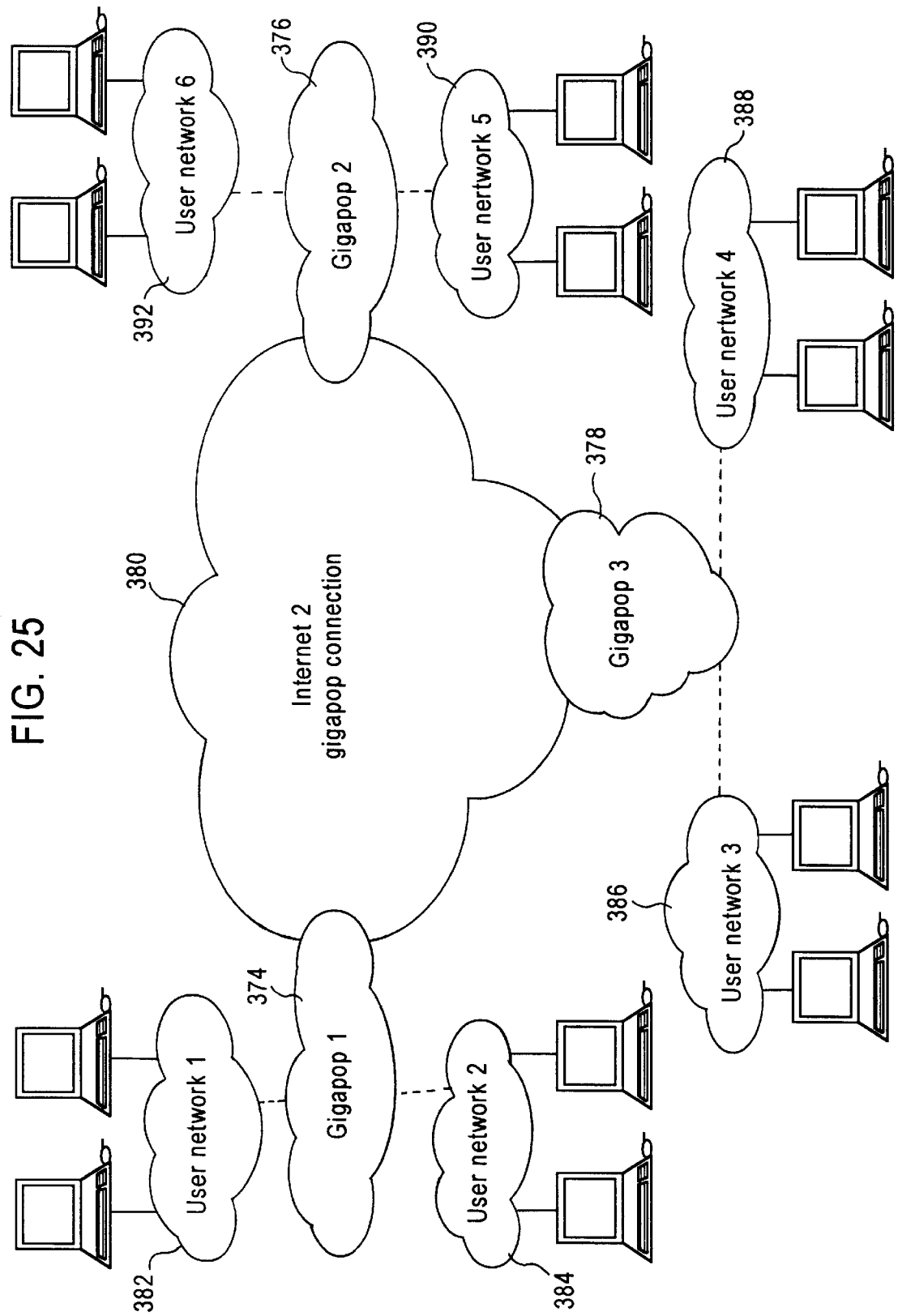
FIG. 25 is a diagram of Internet 2 architecture.

As shown in FIG. 25, Internet 2's 380 major nodes will be secure, specialized, high-speed network connection points called gigapops 374, 376, 378 (gigabit-capacity points of presence). The gigapops will provide all the equipment necessary to connect a set of universities 382, 384, 386, 388, 390, 392 to the vBNS backbone.

The set of users who hook up to each gigapop will determine exactly what form it will take, including the type of equipment it will use. Initially, the gigapops will be connected to each other by vBNS, through which they will receive fast network services. However, Internet 2 participants may develop their own central connection system in several years.

The basic network line level, ATM, will permit the broadband communication of everything from multimedia applications to TCP/IP applications. Internet 2 will use RSVP (resource reservation protocol) to manage the quality of service of real-time, data-intensive multimedia applications. At the network layer level, Internet 2 will support the current Internet Protocol version 4 and IPv6 (IP Next Generation), which is still under development. In fact, Internet 2 will be the testbed for many IPv6 concepts. Internet 2's design focuses heavily on maintaining predictable and dependable broadband, high-speed throughput by strictly controlling who uses the system, what they may use it for, and how they transmit data. For additional discussion on Internet 2, see "Tomorrow's Internet is Here Today," IEEE COMPUTER, p.22, April 1997, incorporated herein by reference.

Figures 26, 26A:
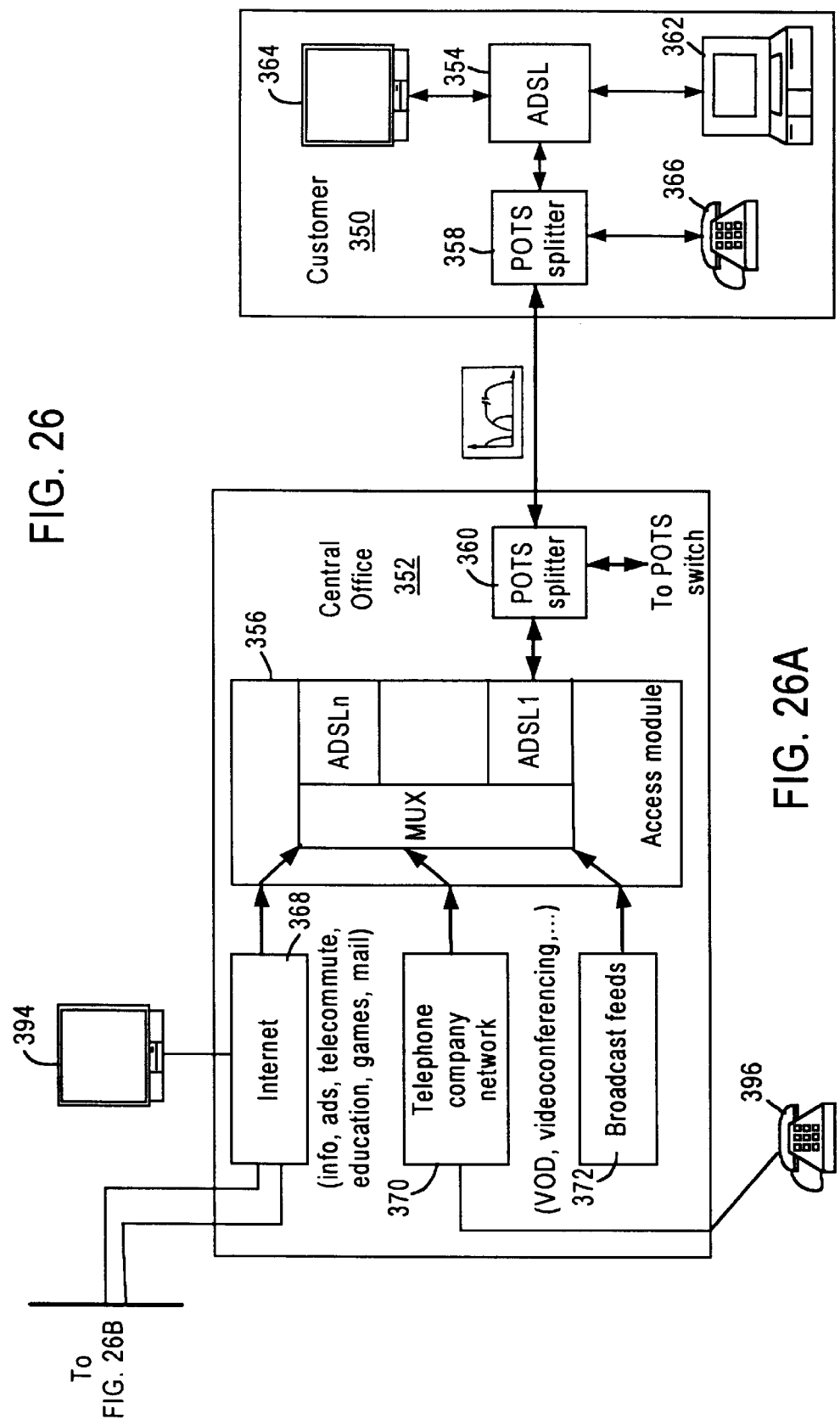
FIG. 26 is an illustration of the architecture of the combined internet, internet 2, POTS, and ADSL architecture.
Figure 26B:
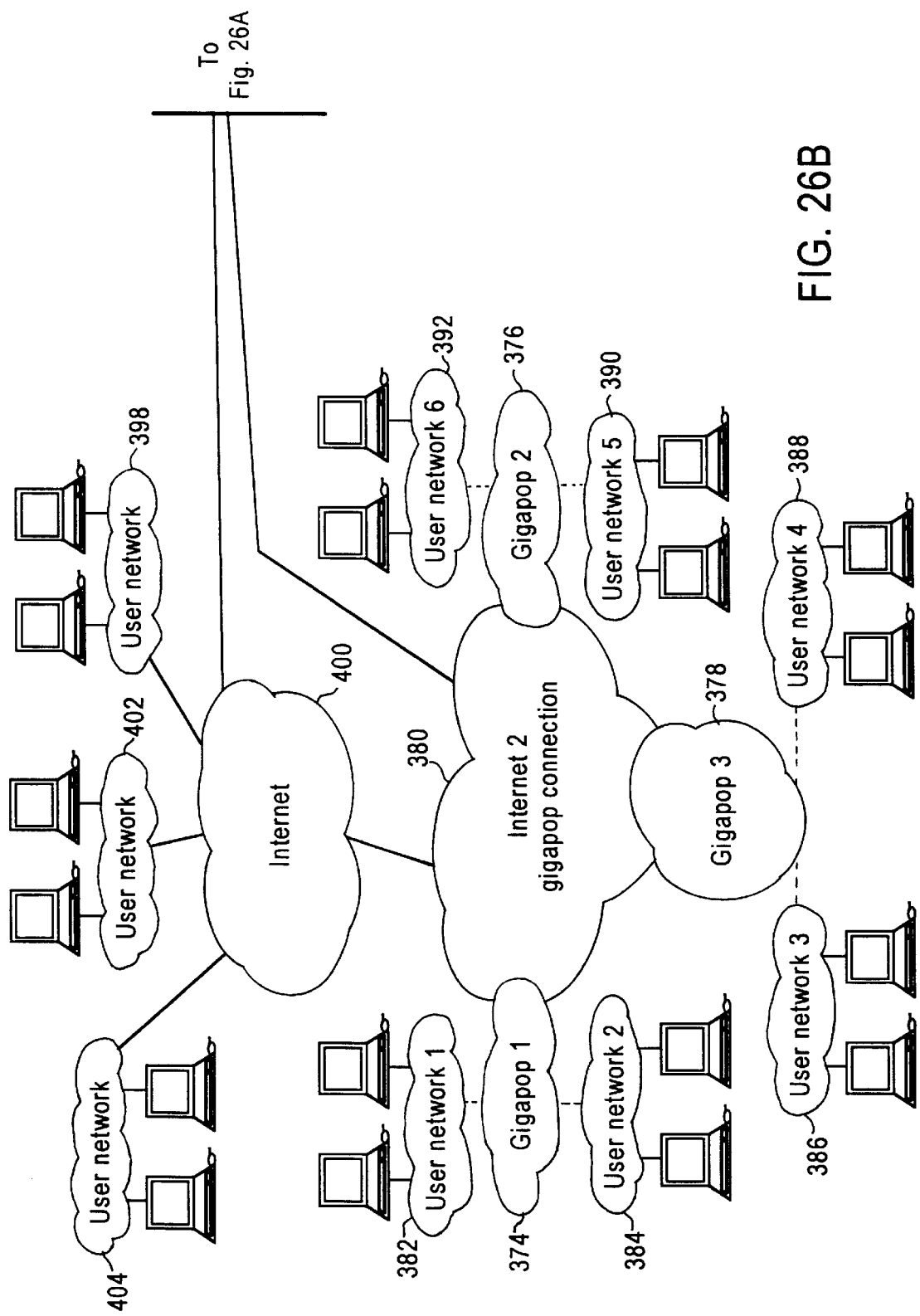
Figure 27B:
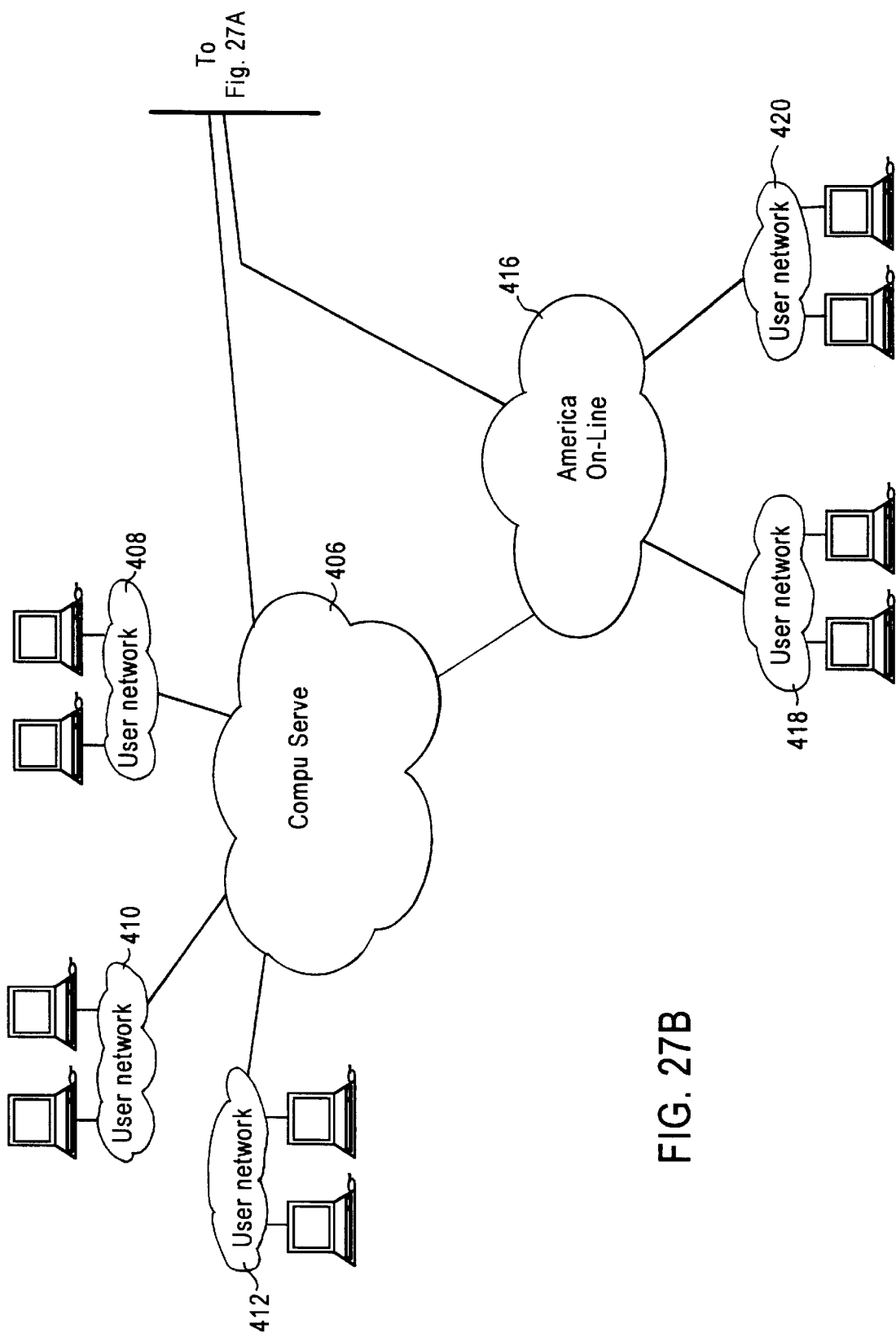
FIG. 27 is an illustration of the architecture of the combined internet provider architecture.

FIG. 26 is an illustration of the architecture of the combined internet, internet 2, POTS, and ADSL architecture. The internet 2 architecture 380 and ADSL architecture 354, 356 is combined with the standard internet architecture 400 with user networks 398, 402, and 404. FIG. 27 is an illustration of the architecture of the combined internet provider architecture. The compuserve network 406 (with user networks 408, 410, 412), ADSL architecture 354, 356, and the America On-Line network 416 (with user networks 418, 420) is combined in a standard manner.

Figure 28:
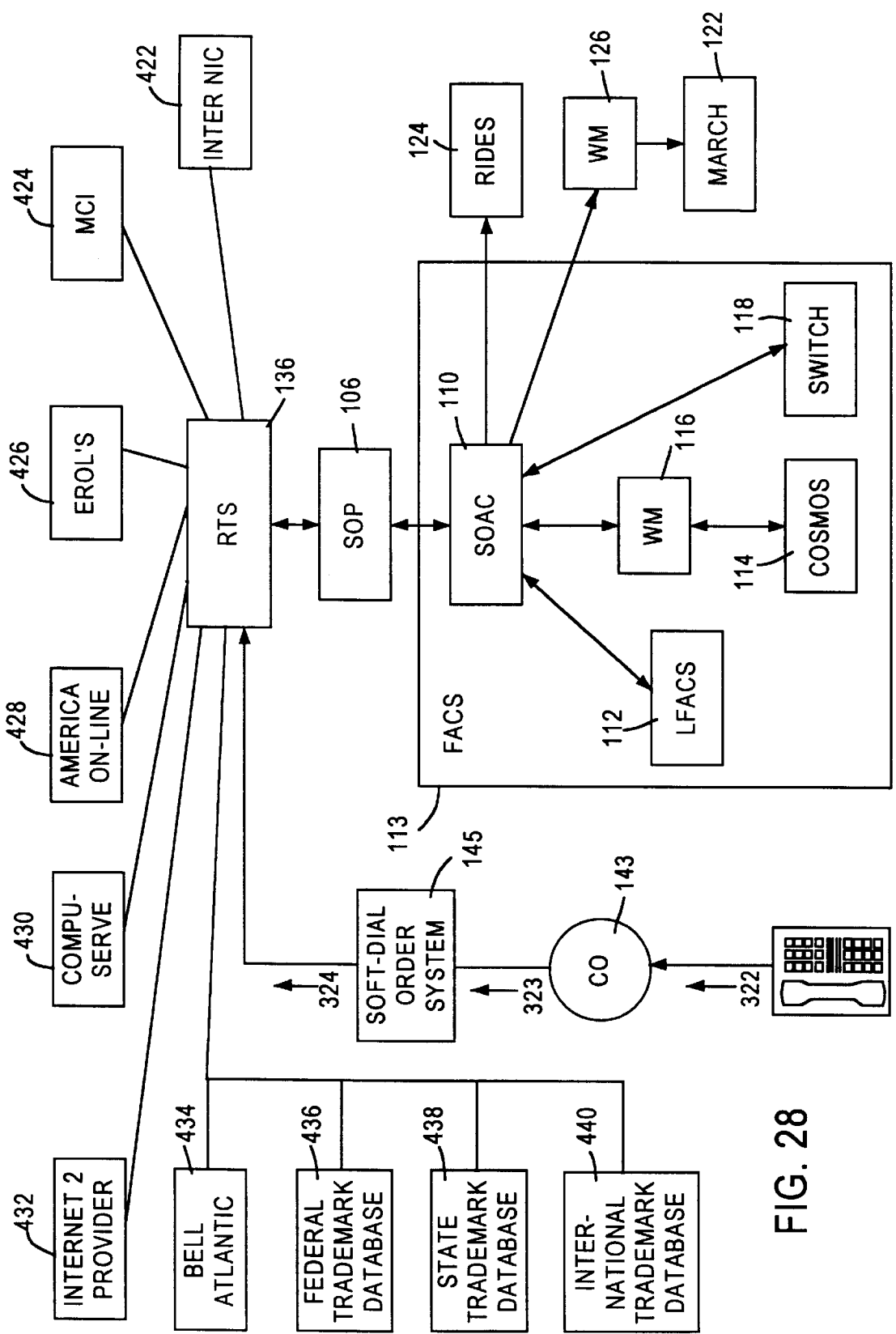
FIG. 28 is an illustration of the ready-to-serve (RTS) architecture used to provision various physical and logical network architectures.

FIG. 28 is an illustration of the ready-to-serve (RTS) architecture used to provision various physical and logical network architectures. As illustrated in FIG. 28, RTS 136 has access to various related systems 422–434 that utilize electronic mail and related communication systems and which identify the user. RTS 136 also has access to various trademark/tradename databases for verification of user name availability. In this architecture, RTS 136 is used to provision physical network facilities as well as logical network facilities, such as identification related data, electronic mail, user name, serial number, domain name, and the like. Note that this architecture allows RTS 136 to assign/provision identification related, as discussed above in detail. In addition, the above configurations can also be applied to the various different embodiments described herein.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

GLOSSARY/ACRONYMS

AHN—Assigned House Number—Used to identify living units in provisioning systems for non-addressed areas.

AIN—Advanced Intelligent Network.

AIRS—Automatic Inventory Record System—A system used to create and maintain telephone numbers. This system is being replaced by COSMOS.

AR—Assignment Request—Message sent from SOAC to LFACS to request an outside loop facility. Also sent from SOAC to COSMOS requesting an inside central office facility.

ARR—Assignment Request Response—The message sent in response to the Assignment Request from LFACS and COSMOS.

ASTR—Automatic Suspension Termination Restoral—ASTR generates requests to terminate or restore residential service for nonpayment.

ARS—Automated Records System—Engineering design system.

CUS—CUstomer Service System—billing system.

SOP/DOE—Service Order Processor/Direct Order Entry.

BOSS—Billing Order Support System—Used by Residence and Business Service Centers to assist service representatives with billing inquiries and services. Interfaces with CRIS and provides: 1) current monthly bill; 2) previous bill; 3) payments; 4) audit trail of account history (i.e., payment arrangements, discussions regarding service, record of contacts).

BSC—Business Service Center.

CCF—Custom Calling Feature—Defines a particular feature which is part of a customer's service. It can be identified by either a USOC or a FID.

CDDS—Customer Director Delivery System.

CF—Connected Facilities—A provisioning description of a facility that connects cable and pair from the central office to the living unit but is not considered the primary service.

CLASS—Custom Local Area Signaling Service—CLASS services including Caller ID, Repeat Call, Return Call, Call Block and Call Trace.

CNF—Connected Facility—A CNF's loop is a non-working loop that has continuity between the LU and either the Central Office or a Remote Switching Unit. It does not qualify for CT administration but is given preference for assignment at a living unit over spare facilities.

COF—Central Office Facilities.

COSMOS—Computer System for Mainframe OperationS—Manages the central office facility inventory including OE and TNs.

CP—Cable Pair.

CRIS—Customer Records Information System—The billing system for exchange services.

Cross-connect—A cross-connect refers to either a physical jumper cable or an electronic connection which connects two cable pair segments together. For example, a specific F1 cable pair may be cross-connected to a F2 cable pair via a jumper cable in a serving terminal. Cross-connects allow flexibility in the manner that a specific loop is assembled.

CRSAB—Centralized Repair Service Answering Bureau—The unit that accepts customer trouble calls, performs cursory testing and passes information to Installation and Maintenance.

CSOP—Common Service Order Processor—Translates service request from SSNS into service order format and reverse.

CT—Connect-Through—A CT'd loop is a non-working loop that has continuity between the living unit (LU) and either the Central Office or a Remote Switching Unit and is designated as CT. LFACS only creates one CT per living unit and it receives preferential status for further assignment at that living unit.

Customer Contact—The business functions performed by representatives of the residence Service Centers or Residence Collection Centers to meet the needs of customers.

DD—Due Date—The date in which a customer's request is scheduled to be completed.

DIP—Dedicated Inside Plant—A DIP refers to a jumper cable which is not removed when services is disconnected. A DIP is created so that the jumper cable may be reused when service is reestablished at the same living unit, thereby saving the manual labor cost required to replace the jumper cable. The "DIP'd" jumper cable will receive a status of "left-in", or LI. COSMOS will create and break DIPs based on preset parameters.

DON—Delayed Order Notice—Message indicating that a service request will be delayed because of the lack of facilities.

DNP—Disconnect for Non-Payment.

DSDC—Distribution Services Design Center—Work group responsible for designs of the outside facilities, also responsible for entering new address and inventory data into LFACS, COSMOS and PREMIS.

DSPC—Distribution Services Planning Center—Monitors the state of the current facilities in order to plan for the creation of new facilities.

EAMI—Exchange Access Mechanized Input system—A batch process (tape) of customer accounts who have selected specific inter-exchange carriers to be their long distance provider. Data is used to update the CRIS billing systems and the switch.

ESOI—Error Service Order Image—Message sent from SOAC to the SOP if the service order fails defined edits or other conditions.

ET—Enhanced Teams—A uniform call distribution network that evenly distributes customer calls to appropriate RSCs and BSCs.

EWO—Engineering Work Order—Work request to modify network facilities, created by engineering and sent to construction for network modifications.

FA—Facility Address.

FACS—Facilities Assignment and Control System—Includes SOAC, LFACS, COSMOS, LOMS and WM.

FCC—Frame Control Center—Work group responsible for the coordination of inside network facility activities such as placing jumpers between OE and the F1 cable pair.

FCIF—Flexible Computer Interface Format—A data interface language that can be used to exchange data (messages) between two applications/processes. The FCIF language is independent of the communication protocol. It is the current Bellcore standard for defining OS-to-OS interfaces.

FID—Field IDentifier—Used on service orders that indicates more data will follow. A label on a service order that prefaces service order information. FIDs are alpha or alphanumeric codes that identify retained information on an account, indicate physical or record activity, generate or negate non-recurring charges, specify recurring charges, document work done by various departments and identify facilities used to provide service.

FIDO—Fast Input Directory Order (system)—A computer system used by Service Representatives to order secondary or foreign telephone directories (directories outside of the customer's calling area).

First Net Order—A pending service order that is in its original state, as created by the Service Representative.

FITL—Fiber in the Loop.

F1, F2, F3, etc. cable pair—The F1 cable pair is the first segment of cable which comprises the outside plant loop. The F1 originates in the central office and terminates at a distribution terminal or serving terminal. In the case where a customer is served beyond the distribution terminal this is referred to as the "feeder" pair.

The F2 cable pair is the second segment of cable in the outside plant loop facility. The F2 originates at the distribution terminal where the F1 cable pair ends and will normally terminate at the serving terminal. The F2 pair is sometimes referred to as the "distribution" pair.

There are cases where the loop may be assembled from more than two sets of facilities (F1 and F2) these would be referred to as F3, F4, etc.

FMO—Future Method of Operation—The manner in which functions and processes will be performed in the future.

FOM—FACS Operations Management—Centralized work group involved in resolving RMAs that cannot be resolved by the local centers.

FX—Foreign Exchange—Assignment of a telephone number and local calling area that differs from the customer's serving wire center.

GSG—Geographic Site Guide.

GUI—Graphical User Interface.

ICC—Installation Control Center, work center involved with the dispatch of outside technicians and the management of service requests involving outside network work or customer wiring work.

IISA—Integrated Information Systems Architecture.

I&M—Installation and Maintenance—The work group responsible for scheduling and performing installation and maintenance activities. This work can be performed anywhere from the customer premise to the central office.

IMOSS—ISDN Marketing and Operations Support System.

Interchangeable Exchange—A group of NXXs that offer identical services and calling areas within a given wire center and are available for telephone number assignment.

SCP—Service Control Point—Network element in the AIN network.

IXC—Inter-exchange Carrier—A carrier authorized by the Federal Communications Commission (FCC) to provide interLATA, interstate and/or international long distance communications services; a carrier authorized by a state Public Utility Commission (PUC) to provide long distance communications service but not local exchange service within state boundaries. Also referred to as "IC", "IEC", or "IXC".

LA—Listed Address—Appears in the LST section of the service order to identify a telephone service as appearing in the White Pages directory, with Director Assistance or on company records only. The List Address is not necessarily the physical location of the service.

LAC—Loop Assignment Center—Same as MLAC, normally referred to an MLAC after the center has been converted to FACS.

LATA—Local Access and Transport Area.

LCC—Line Class Code—Identifies to the switch a particular class of service. It can be identified by a USOC, FID, or some combination of the two. The FID would modify the USOC by qualifying the class of service with specific attributes such as 700/900 blocking.

LDM—Logical Data Model.

LEIS—Loop Engineering Information System—Operations system used by the DSDC to monitor the outside plant network for network modifications of growth.

LET—Line Equipment Transfer—The transfer of central office line equipment to support area transfers or load balancing.

LFACS—Loop Facility Assignment and Control System—A member of the FACS (Facilities and Assignment Control System) family of applications, LFACS is a Bellcore designed system that inventories and assigns all loop facilities from a customer's premises to the main distributing frame in the central office.

LI—Left-In, status given to jumpers in the central office connecting the F1 cable pair with an OE.

LMOS—Loop Maintenance Operations System—An AT&T developed system used to maintain line records and identify network troubles.

LOMS—LAC Operations Management System—Services orders that do not automatically flow through the provisioning process "fall out" of automatic processing and are managed by LOMS. LOMS assists the MLAC in management of RMAs (Requests for Manual Assistance).

LST—Line and Station Transfer—Rearrangement of outside network facilities to support service activation.

LU—Living Unit—The exact physical location of phone service (i.e., a house, business, garage, apartment, etc.). Living Unit information is stored in PREMIS.

MCRF—Mechanized Credit Reference File. A system used by C&P for credit verification. It will be discontinued and replaced with the more robust SSRDF.

MISOS/DOE—Minimal Input Service Order System/Direct Order Entry—The Service Order Processor used by New Jersey Bell.

MLAC—Mechanized Loop Assignment Center—The MLAC is responsible for the administration of service orders through the provisioning process. Service orders which cannot automatically flow through the provisioning systems are resolved at the MLAC.

MLHG—Multi-Line Hunt Group.

MSP—Multi Services Platform—Operations system used to support the Ultra-Forward service, also designed to support other new services needing switch updates.

MVP—Multi-Variety Package—Centrex service for residential and small business customers.

NAC—Network Administration Center—The NAC is responsible for monitoring and administering operations on the central office switches. This includes monitoring the availability of OE and ensuring that the switches are properly load balanced.

The NAC is also responsible for telephone number administration. This includes the management of TN inventory and the distribution of TNs to the BSC or RSC for assignment.

NID—Network Interface Device—The NID serves as the interface between outside plant facilities and the living unit (LU). This is also referred to as the "point of demarcation". This is on the customer's side of the network and protector.

NPA—Numbering Plan Area—The area code of the telephone number. For example, in the number (703) 555-1367, 703 is the NPA.

NXX—Also known as the NNX—The telephone number exchange. For example, in the number (703) 555-1367, 555 is the exchange.

OE—Office Equipment—The office equipment is the switch port that is used to connect the F1 cable pair with the switch. It is the physical hardware within the central office that provides originating and terminating call functionality. It includes line terminations, signaling (including dial-tone) and supervision and call completion.

OM—Order Manager—Operations support system that supports implementation of SDT in the current environment by modifying service order to create or disconnect the SDT line. Other implementations of the OM have created a second order to perform this function.

OSCA—Open Systems Computing Architecture—Addresses the way systems should be constructed for data independencies and optimum modularity.

OSP—Outside Plant—Include the cable pair segments, terminals and cross connects which are combined to create a complete outside loop. This outside loop connects a customer living unit with a central office serving the customer.

PCF—Partially Connected Facility—A PCF'd facility is a non-working loop that is connected to a living unit but is not connected completely back to the Central Office or a Remote Switching Unit.

PIC—Primary Interexchange Carrier—A FID in the Service and Equipment section of the service order that describes the long distance carrier selected to carry interLATA, interstate and/or international toll traffic for a customer.

PICX—The unique three character code that denotes an inter-exchange carrier selected by the customer.

POTS—Plain Old Telephone Service—Basic telephone service for the transmission of human speech.

PREMIS—Premise Information System—A Bellcore developed stand-alone component of FACS. PREMIS provides interactive support to RSCs, and BSCs, and Loop Assignment Centers. For the RSCs and BSCs, PREMIS offers: address verification, SAG and Living Unit information, negotiation aid, commitment dates, service order assistance, telephone number assignment, credit information, interexchange carrier selection.

PREMIS Maintenance Center (PMC)—The work group responsible for updating the PREMIS system.

PMO—Present Method of Operation—The manner in which functions and processes are performed today. Current Environment.

PTN—Preferred Telephone Number—A special telephone number selected by the customer; or a telephone number selected by the NAC to fulfill a customer's request for an easy number. (Easy TNs are described as those numbers that have at least two of the same number in the extension.)

PUC—Public Utility Commission—The governing body in each state that sets, changes, and removes restrictions and regulations on utility companies. The PUC is in place to protect consumer's interests.

RAO—Revenue Accounting Office—A unit that administers payment management and billing systems support.

RBOC—Regional Bell Operating Company.

RCC—Residence Collection Center—A unit that manages billing and collections activities. Collection agents work in the RCCs. Each company has multiple RSCs spread throughout its territory.

RCMAC—Recent Change Memory Administration Center—Work group responsible for memory administration changes to the central office switch.

Recap—On change orders and restorals, the process by which the service order processor will place the non-changing features and services on the service order based on information stored in the customer record in CRIS. Also, the business function performed by the Service Representative to ensure that the customer order was accurately recorded.

RFACCS—Regional Final Accounts Credit and Collections System—A system used by the RCCs to manage final account billing and collections. Used to verify credit.

RIDES—Remote Intelligent Distribution Element Support—Support system for activation of fiber network elements in the loop.

RIDS—An acronym for the SSNS process that will search for Restrictions, Incompatibilities, or Dependencies with basic, toll, and optional services selected by a customer.

RMAS—Remote Memory Administration System—Support system for creating recent change messages and interacting with the central office switch for line memory changes.

RSC—Residence Service Center—A unit that provides customers with entree to the Telco. The RSCs handle inquiries, complaints, requests for service and billing and payment assistance. Service Representatives work in the RSCs. Each company has multiple RSCs spread throughout its territory.

RTS—Ready-to-Serve—The concept in which facilities are stabilized and dedicated to living units in order to provide service to the customer when requested.

SA—Service Address—A FID in the LST section of the service order that describes the physical location of the service.

SAG—Street Address Guide—Defines parameters for defining a customer's service, including but not limited to NPA, NXX, wire center, rate zone, and terminating traffic area. SAG information is stored in PREMIS.

SalesCue—A subset of SSNS, SalesCue assists reps by recommending products and services to sell to customers based on demographics and life-style clues obtained during the contact.

SDT—Soft Dial Tone—Restricted dial tone that is placed on the customers line that provide restricted calling to the business office to place service orders and to 911 for emergencies.

Second Net Order—A pending service order that has been through the provisioning process and has facilities assigned.

Service on Demand—The concept which provides service to the customer on the date that he requests. Also referred to as "When do you Want it" service.

SOAC—Service Order Analysis and Control—The controller portion of the FACS family of systems.

SOACS—Service Order Administration and Control System—The Service Order Processor used by C&P Telephone.

SoI—Service Order Image—Orders which SOAC determines will require manual intervention in MARCH are sent as order images, including all data on the service order.

SOP—Service Order Processor (Generic)—A system for creating, editing and distributing service orders to downstream processes and systems.

SOP/DOE—Service Order Procedure/Direct Order Entry.

SSNS—SalesService Negotiation System—A graphical user interface system that presents information to service representatives from a variety of systems and platforms in a window format to assist negotiation of services and inquiries.

SSRDF—Social Security/Repetitive Debt File—A credit verification system.

TCAT—Telephone Number Category—A three character code describing the overall service that the customer will receive. Used during TN selection with PREMIS.

Third Net Order—An order that has been through the provisioning and memory administration processes. Often referred to as a "completed" order.

TN—Telephone Number—A ten digit number comprised of an area code (NPA), an exchange (NXX), and an extension.

TP—Translation Packet—SOAC creates TPs from the service order it receives from the service order processor. SOAC checks the USOCs/FIDs, determines that the order should flow through MARCH, strips the memory administration codes off the order, and formats the TPs which it send to MARCH.

TQM—Total Quality Management.

ULBB—User Layer Building Block—For example, the presentation layer of SSNS that service reps use.

USOC—Universal Service Order Code—An alphanumeric coding scheme that identifies products and services that have been ordered by a customer.

VMAP—Voice Mail Adjunct Processor. VOD—Video On Demand.

WDYWI—When Do You Want It—Service on Demand.

WFA/DO—Work and Force Administration/Dispatch Out—WFA/DO is responsible for determining the need for dispatching, scheduling the dispatch, and managing of jobs for service orders which require a dispatch. This includes both outside plant installation and customer premises work.

WM—Work Manager—Operations system that manages data traffic between SOAC and COSMOS and between SOAC and MARCH.

We claim:

1. An administration system for a communication network, comprising:

a service order processing system receiving a service request from a customer requesting service for a customer location, and determining whether the service request is provisionable responsive to the service request and predetermined criteria including whether the customer location matches a stored customer location stored by said service order processing system, when said service order processing system determines that the service request is provisionable, automatically provisioning customer facilities including at least one of a domain name, a user name, a customer network address, and an electronic mail address, to execute the service request based upon information stored by said service order processing system, the information including customer identification data and customer facility data, and the information maintained by said service order processing system without substantially altering the customer facility data, and when the service request is determined by said service order processing system not to be provisionable, said service order processing system generating a manual provisioning request;

an auxiliary database storing auxiliary data associated with the information stored by said service order processing system; and a work center interface system operatively connected to said service order processing system and said auxiliary database, said work center interface system receiving the manual provisioning request from said service order processing system and retrieving the auxiliary data from said auxiliary database, said work center interface system provisioning other facilities to execute the service request responsive to the auxiliary data and user interaction with said work center interface system.

2. In an administration system for a public switched telephone network (PSTN), a method comprising the steps of:

(a) receiving a service request from a customer requesting service for a customer location;

(b) determining whether the service request is provisionable responsive to the service request and predetermined criteria including whether the customer location matches a stored customer location stored by said service order processing system;

(c) when the service request is determined to be provisionable, automatically provisioning customer facilities including at least one of a domain name, a user name, a customer network address, and an electronic mail address, to execute the service request based upon information including customer identification data and customer facility data, and the information being maintained without substantially altering the customer facility data; and (d) when the service request is determined not to be provisionable, performing the following steps:
(d1) generating a manual provisioning request;
(d2) storing auxiliary data associated with the information being maintained without substantially altering the customer facility data;
(d3) receiving the manual provisioning request;
(d4) retrieving the auxiliary data from said auxiliary database; and
(d5) provisioning other facilities to execute the service request responsive to the auxiliary data and user interaction.

3. An administration system for a public switched telephone network (PSTN), comprising:

an auxiliary database storing auxiliary data;

a service order processing system receiving a service request from a customer requesting service for a customer location, and determining whether the service request is provisionable responsive to the service request and predetermined criteria including whether the customer location matches a stored customer location stored by said service order processing system,
when said service order processing system determines that the service request is provisionable, automatically provisioning customer facilities including at least one of a domain name, a user name, a customer network address, and an electronic mail address, to execute the service request based upon information stored by said service order processing system, the information including customer identification data and customer facility data, and the information maintained by said service order processing system without substantially altering the customer facility data, and
when the service request is determined by said service order processing system not to be provisionable, said service order processing system generating a status request for retrieving the auxiliary data associated with the information stored by said service order processing system, said service order processing system again determining whether the service request is provisionable responsive to the service request and the predetermined criteria and the auxiliary data, and provisioning other facilities to execute the service request when the service request is determined to be provisionable.

4. An administration system for a public switched telephone network (PSTN) according to claim 3, further comprising a mechanized test system responsively connected to said service order processing system, wherein when said service order processing system again determines that the service request is not provisionable, said mechanized test system automatically testing the customer facilities to determine whether the customer facilities are operative.

5. In an administration system for a public switched telephone network (PSTN), a method comprising the steps of:

(a) storing auxiliary data;

(b) receiving a service request from a customer requesting service for a customer location;

(c) determining whether the service request is provisionable responsive to the service request and predetermined criteria including whether the customer location matches a stored customer location stored by said service order processing system;

(d) when the service request is determined to be provisionable, automatically provisioning customer facilities including at least one of a domain name, a user name, a customer network address, and an electronic mail address, to execute the service request based upon information including customer identification data and customer facility data, and the information being maintained without substantially altering the customer facility data; and (e) when the service request is determined not to be provisionable, performing the following steps:
(e1) generating a status request for retrieving the auxiliary data associated with the information;
(e2) determining again whether the service request is provisionable responsive to the service request and the predetermined criteria and the auxiliary data; and
(e3) provisioning other facilities to execute the service request when the service request is determined to be provisionable.

6. In an administration system for a public switched telephone network (PSTN), a method according to claim 5, wherein when the service request is determined not provisionable, said method further comprising the step of automatically testing the customer facilities to determine whether the customer facilities are operative.

7. An administration system for a public switched telephone network (PSTN), comprising:

a service order processing system receiving a service request from a customer requesting service for a customer location, and determining whether the service request is provisionable responsive to the service request and predetermined criteria,
when said service order processing system determines that the service request is provisionable, automatically provisioning customer facilities including at least one of a domain name, a user name, a customer network address, and an electronic mail address, to execute the service request based upon information stored by said service order processing system, the information including customer identification data and customer facility data, and the information maintained by said service order processing system without substantially altering the customer facility data; and a verification system responsively connected to said service order processing system and verifying that the customer facilities provisioned by said service order processing system are correct.

8. In an administration system for a public switched telephone network (PSTN), a method comprising the steps of:

(a) receiving a service request from a customer requesting service for a customer location;

(b) determining whether the service request is provisionable responsive to the service request and predetermined criteria including whether the customer location matches a stored customer location stored by said service order processing system;

(c) when the service request is determined to be provisionable, automatically provisioning customer facilities including at least one of a domain name, a user name, a customer network address, and an electronic mail address, to execute the service request based upon information including customer identification data and customer facility data, and the information being maintained without substantially altering the customer facility data; and (d) verifying that the customer facilities provisioned by said service order processing system are correct.

9. An administration system for a public switched telephone network (PSTN), comprising:

a soft-dial order system providing limited telephone service to customer facilities that have previously been requested to be disconnected, the limited telephone service permitting the customer facilities to initiate a service connect request; and a service order processing system responsively connected to said soft-dial order system, said service order processing system receiving the service connect request from a customer requesting service for a customer location, and determining whether the service connect request is provisionable responsive to the service connect request and predetermined criteria, when said service order processing system determines that the service connect request is provisionable, automatically provisioning the customer facilities including at least one of a domain name, a user name, a customer network address, and an electronic mail address, to execute the service connect request based upon information stored by said service order processing system, the information including customer identification data and customer facility data, and the information maintained by said service order processing system without substantially altering the customer facility data.

10. In an administration system for a public switched telephone network (PSTN), a method comprising the steps of:

(a) providing limited telephone service to customer facilities that have previously been requested to be disconnected, the limited telephone service permitting the customer facilities to initiate a service connect request;

(b) receiving a service connect request from a customer requesting service for a customer location;

(b) determining whether the service connect request is provisionable responsive to the service connect request and predetermined criteria including whether the customer location matches a stored customer location stored by said service order processing system;

(c) when the service connect request is determined to be provisionable, automatically provisioning customer facilities including at least one of a domain name, a user name, a customer network address, and an electronic mail address, to execute the service connect request based upon information including customer identification data and customer facility data, and the information being maintained without substantially altering the customer facility data.

11. In an administration system for a public switched telephone network (PSTN), a method comprising the steps of:

(a) receiving a service connect request from a customer requesting service for a customer location, and determining whether the service connect request is provisionable responsive to the service connect request and predetermined criteria including whether the customer location matches a stored customer location stored by said service order processing system;

(b) when the service connect request is determined to be provisionable, automatically provisioning customer facilities including at least one of a domain name, a user name, a customer network address, and an electronic mail address, to execute the service connect request based upon information including customer identification data and customer facility data, and the information being maintained without substantially altering the customer facility data.

* * * * *